(12) United States Patent
Brey et al.

(10) Patent No.: US 8,137,750 B2
(45) Date of Patent: Mar. 20, 2012

(54) CATALYTICALLY ACTIVE GOLD SUPPORTED ON THERMALLY TREATED NANOPOROUS SUPPORTS

(75) Inventors: Larry A. Brey, Woodbury, MN (US); Thomas E. Wood, Stillwater, MN (US); Gina M. Buccellato, Eagan, MN (US); Gezahegan D. Damte, Cottage Grove, MN (US); Duane D. Fansler, Dresser, WI (US); Marvin E. Jones, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1385 days.

(21) Appl. No.: 11/674,348

(22) Filed: Feb. 13, 2007

(65) Prior Publication Data
US 2010/0273091 A1    Oct. 28, 2010

Related U.S. Application Data

(60) Provisional application No. 60/774,045, filed on Feb. 15, 2006.

(51) Int. Cl.
*C23C 16/02* (2006.01)
(52) U.S. Cl. .................. 427/250; 427/217; 427/299
(58) Field of Classification Search .............. 427/250, 427/217, 299
See application file for complete search history.

(56) References Cited

U.S. PATENT DOCUMENTS

| | | |
|---|---|---|
| 3,856,706 A | 12/1974 | Harrison et al. |
| 4,046,712 A | 9/1977 | Cairns et al. |
| 4,090,978 A | 5/1978 | Welsh et al. |
| 4,328,080 A | 5/1982 | Harris |
| 4,469,640 A | 9/1984 | Carcia et al. |
| 4,536,482 A | 8/1985 | Carcia |
| 4,608,357 A | 8/1986 | Silverman et al. |
| 4,618,525 A | 10/1986 | Chamberlain et al. |
| 4,810,381 A | 3/1989 | Hagen et al. |
| 4,839,327 A | 6/1989 | Haruta et al. |
| 5,017,357 A | 5/1991 | Kolts et al. |

(Continued)

FOREIGN PATENT DOCUMENTS

DE    10030637    1/2002

(Continued)

OTHER PUBLICATIONS

Zhu et al, Pd/CeO2-TiO2 catalyst for CO oxidation at low temperature: a TPR study with H2 and CO as reducing agents, Journal of Catalysis 225 (2004), pp. 267-277.*

(Continued)

*Primary Examiner* — Elizabeth Burkhart
(74) *Attorney, Agent, or Firm* — Kenneth B. Wood

(57) ABSTRACT

The present invention provides technology for controlling, or tuning, the catalytic activity of gold provided upon nanoporous supports such as those derived from nanoparticulate titania. It has been discovered that the nature of the surfaces of the nanoparticles used to support a nano-metal catalyst, such as catalytically active gold, has a profound effect upon the catalytic properties of the supported catalyst. The support surface may be altered as desired to control the activity of the gold. The present invention teaches how thermal treatment of nanoparticulate media incorporated into a nanoporous support prior to deposition of catalytically active gold dramatically suppresses the ability of a resultant catalyst system to oxidize hydrogen. Yet, the system still readily oxidizes CO.

15 Claims, 2 Drawing Sheets

U.S. PATENT DOCUMENTS

| | | | |
|---|---|---|---|
| 5,058,578 | A | 10/1991 | Weiss |
| 5,470,532 | A | 11/1995 | Hagen et al. |
| 5,478,534 | A | 12/1995 | Louise et al. |
| 5,492,627 | A | 2/1996 | Hagen et al. |
| 5,559,065 | A | 9/1996 | Lauth et al. |
| 5,789,337 | A * | 8/1998 | Haruta et al. ............... 502/344 |
| 5,879,828 | A | 3/1999 | Debe et al. |
| 5,910,378 | A | 6/1999 | Debe et al. |
| 5,932,750 | A | 8/1999 | Hayashi et al. |
| 6,042,959 | A | 3/2000 | Debe et al. |
| 6,093,379 | A | 7/2000 | Golden et al. |
| 6,124,505 | A * | 9/2000 | Haruta et al. ............... 568/360 |
| 6,183,668 | B1 | 2/2001 | Debe et al. |
| 6,238,534 | B1 | 5/2001 | Mao et al. |
| 6,265,341 | B1 | 7/2001 | Komatsu |
| 6,511,640 | B1 | 1/2003 | Kumar et al. |
| 6,703,068 | B2 | 3/2004 | Hintzer et al. |
| 6,749,713 | B2 | 6/2004 | Mlinar |
| 6,752,889 | B2 | 6/2004 | Insley et al. |
| 6,753,293 | B1 | 6/2004 | Kielin et al. |
| 6,756,146 | B2 | 6/2004 | Mlinar et al. |
| 7,007,872 | B2 | 3/2006 | Yadav et al. |
| 7,243,658 | B2 | 7/2007 | Deevi |
| 2003/0042226 | A1 | 3/2003 | Coll et al. |
| 2003/0134741 | A1 | 7/2003 | Weisbeck |
| 2003/0187294 | A1 | 10/2003 | Hagemeyer et al. |
| 2005/0095189 | A1 * | 5/2005 | Brey et al. ............... 423/427 |
| 2006/0024539 | A1 | 2/2006 | Dumesic et al. |
| 2006/0168924 | A1 | 8/2006 | Sun |
| 2006/0293175 | A1 * | 12/2006 | Dai et al. ............... 502/208 |
| 2007/0004134 | A1 | 1/2007 | Vora |
| 2007/0207079 | A1 | 9/2007 | Brady et al. |
| 2007/0246155 | A1 | 10/2007 | Janssen et al. |

FOREIGN PATENT DOCUMENTS

| | | |
|---|---|---|
| EP | 0 827 779 A | 3/1998 |
| EP | 1 040 869 A2 | 10/2000 |
| EP | 1044935 | 10/2000 |
| EP | 1598110 | 11/2005 |
| GB | 1038300 | 8/1966 |
| GB | 1074129 | 6/1967 |
| GB | 1 486 108 A | 9/1977 |
| JP | 1-94945 | 4/1989 |
| WO | WO 97/43042 | 11/1997 |
| WO | WO 98/00413 | 1/1998 |
| WO | WO 99/47726 | 9/1999 |
| WO | WO 00/59632 | 10/2000 |
| WO | WO 03/059507 | 7/2003 |
| WO | WO 2004/022209 | 3/2004 |
| WO | WO 2004/043591 | 5/2004 |
| WO | WO 2005/115612 | 12/2005 |
| WO | WO 2007/106664 | 9/2007 |
| WO | WO 2008/076137 A2 | 6/2008 |

OTHER PUBLICATIONS

Avgouropoulos et al., "A comparative study of Pt/γ-$Al_2O_3$, Au/α-$Fe_2O_3$ and CuO—$CeO_2$ catalysts for the selective oxidation of carbon monoxide in excess hydrogen," Catalysis Today 75, pp. 157-167 (2002).

Bae et al., "Selective catalytic oxidation of carbon monoxide with carbon dioxide, water vapor and excess hydrogen on CuO—$CeO_2$ mixed oxide catalysts," Catalysis Communications 6, pp. 507-511 (2005).

Bond et al., "Gold-Catalysed Oxidation of Carbon Monoxide," Gold Bulletin 33(2), pp. 41-51 (2000).

Chang et al., "Transient studies of the mechanisms of CO oxidation over Au/$TiO_2$ using time-resolved FTIR spectroscopy and product analysis," Journal of Catalysis 236, pp. 392-400 (2005).

Choudhary, T.V. et al, "CO Oxidation on Supported Nano-Au Catalysts Synthesized from a [$Au_6(PPh_3)_6$]($BF_4$)$_2$ Complex," Journal of Catalysis 207, pp. 247-255 (2002).

Cominos et al., "Selective oxidation of carbon monoxide in a hydrogen-rich fuel cell feed using a catalyst coated microstructured reactor," Catalysis Today 110, pp. 140-153 (2005).

Haruta, M. et al., "Low-Temperature Oxidation of CO over Gold Supported on $TiO_2$, α-$Fe_2O_3$, and $Co_3O_4$," Journal of Catalysis 144, pp. 175-192 (1993).

Hersey, "Ordered Mixing: A New Concept in Powder Mixing Practice," Powder Technology 11, pp. 41-44 (1975).

Klissurski et al., "Study of Peroxide-modified Titanium Dixoide (Anatase)," J. Chem. Soc. Faraday Trans. 86(2), pp. 385-388 (1990).

Landon et al., "Direct formation of hydrogen peroxide from $H_2/O_2$ using a gold catalyst," Chem. Commun., pp. 2058-2059 (2002).

Landon et al., "Selective oxidation of CO in the presence of $H_2$, $H_2O$, and $CO_2$ via gold for use in fuel cells," Chem. Commun., pp. 3385-3387 (2005).

Liu, J. et al., "General Rules for Predicting Where a Catalytic Reaction Should Occur on Metal Surfaces: A Density Functional Theory Study of C—H and C—O Bond Breaking/Making on Flat, Stepped, and Kinked Metal Surfaces," J. Am. Chem. Soc. 125, pp. 1958-1967 (2003).

Mallick et al., "CO oxidation over gold nanoparticles supported on $TiO_2$ and $TiO_2$—ZnO: catalytic activity effects due to surface modification of $TiO_2$ with ZnO," Applied Catalysis A: General 253, pp. 527-536 (2003).

Nijhuis, T. et al., "Mechanistic Study into the Direct Epoxidation of Propene over Gold/Titania Catalysts," J. Phys. Chem. B 109, pp. 19309-19319 (2005).

Park et al., "Selective oxidation of carbon monoxide in hydrogen-rich stream over Cu-Ce/γ-$Al_2O_3$ catalysts promoted with cobalt in a fuel processor for proton exchange membrane fuel cells," Journal of Power Sources 132, pp. 18-28 (2004).

Pfeffer et al., "Synthesis of engineered particulates with tailored properties using dry particle coating," Powder Tech. 117, pp. 40-67 (2001).

Rousset et al., "Preferential oxidation of CO in $H_2$ over highly loaded Au/$ZrO_2$ catalysts obtained by direct oxidation of bulk alloy," Chem. Comm. 3, pp. 388-390 (2005).

Schaub et al., "Oxygen-Mediated Diffusion of Oxygen Vacancies on the $TiO_2$(110) Surface," Science, 299, pp. 377-379 (2003).

Schubert, M.M. et al., "Activity, selectivity, and long-term stability of different metal oxide supported gold catalysts for the preferential CO oxidation in $H_2$-rich gas, "Catalysis Letters vol. 76, No. 3-4 (2001).

Schumacher, B. et al., "Kinetics, mechanism, and the influence of $H_2$ on the CO oxidation reaction on a Au/$TiO_2$ catalyst," Journal of Catalysis, vol. 224(2), pp. 449-462 (2004).

Wise et al., "High Dispersion Platinum Catalyst by RF Sputtering," Journal of Catalysis, vol. 83, pp. 477-479 (1983).

Wolf et al., "A systematic study of the synthesis conditions for the preparation of highly active gold catalysts," Applied Catalysis A: General, 226, 1-13 (2002).

Wu et al., "Oxygen vacancy mediated adsorption and reactions of molecular oxygen on the $TiO_2$(110) surface," Physical Review B 68, 241402(R) (2003).

Yu et al., "Preparation of Au/$TiO_2$ for catalytic preferential oxidation of CO under a hydrogen rich atmosphere at around room temperature," Chem. Comm., pp. 354-356 (2005).

Yeong-Jey Chen and Chuin-Tih Yeh, Deposition of Highly Dispersed Gold on Alumina Support, Apr. 18, 2001, vol. 200, Journal of Catalysis, Academy Press, pp. 59-68.

Arrii et al., Oxidation of CO on Gold Supported Catalysts Prepared by Laser Vaporization: Direct Evidence of Support Contribution; Journal of the American Chemical Society 2004; 126, 1199-1205.

Kobayashi et al., Thin Films of Supported Gold Catalysts for CO Detection; Sensors and Actuators B1 1990; 222-225.

Okamura et al., Preparation of supported gold catalysts by gas-phase grafting of gold acethylacetonate for low-temperature oxidation of CO and of H2; Journal of Molecular Catalysis 2003; 199, 73-84.

Veith et al., Nanoparticles of Gold on Al2O3 produced by dc magnetron sputtering; Journal of Catalysis 2004; 213, 151-158.

Haruta, M., "Size and Support Dependency in the Catalysis of Gold." Catalysis Today, 36:153-166 (1997).

Prati et al., "Gold on Carbon as a New Catalyst for Selective Liquid Phase Oxidation of Diols." Journal of Catalysis 176, 552-560 (1998).

Min, B.K., "Synthesis of a Sinter-Resistant, Mixed-Oxide Support for Au Nanoclusters", J. Phys. Chem. B, vol. 108, No. 38, (2004), pp.

14609-14615, Department of Chemistry, Texas A&M University, P.O. Box 30012, College Station, Texas 77842-3012, Published on Web May 12, 2004.

Wenfu, Yan, "Effect of Supporting Surface Layers on Catalytic Activities of Gold Nanoparticles in CO Oxidation", J. Phys. Chem. B, vol. 109, No. 32, (2005), pp. 15489-15496, Chemical Sciences Division, Oak Ridge National Laboratory, Oak Ridge, Tennessee 37831, Published on Web Jul. 15, 2005.

Rossignol, Cecile, "Selective oxidation of CO over model gold-based catalysts in the presence of H2", Journal of Catalysis 230, (2005), pp. 476-483, Institut de Recherches sur al Catalyse (CNRS), 2 Avenue Albert Einstein, F-69626 Villeurbanne, France, Published on Web Jan. 11, 2005.

* cited by examiner

CATALYTICALLY ACTIVE GOLD SUPPORTED ON THERMALLY TREATED NANOPOROUS SUPPORTS

PRIORITY CLAIM

The present non-provisional patent application claims priority under 35 USC §119(e) from United States Provisional Patent Application having Ser. No. 60/774,045, filed on Feb. 15, 2006, by Brey, and titled CATALYTICALLY ACTIVE GOLD SUPPORTED ON THERMALLY TREATED NANOPOROUS SUPPORTS, wherein the entirety of said provisional patent application is incorporated herein by reference.

The present invention relates to gold-based, nanostructured catalyst systems in which catalytically active gold is supported upon a thermally treated, nanoporous support. In one mode of use, the resultant catalyst system is useful for the selective oxidation of carbon monoxide in the presence of hydrogen. The resultant, purified streams can be used as a feed to CO sensitive devices such as fuel cells and the like.

BACKGROUND

Electrochemical cells, including proton exchange membrane fuel cells, sensors, electrolyzers, and electrochemical reactors, are known in the art. Typically, the central component of such a cell is a membrane electrode assembly (MEA), comprising two catalyzing electrodes separated by an ion-conducting membrane (ICM). Fuel cells incorporating an MEA structure offer the potential for high output density, are driveable at a reasonable temperature, and exhaust mainly $CO_2$ and water. Fuel cells are viewed as potential, clean energy sources for motor vehicles, marine craft, aircraft, portable electronic devices such as notebook computers and cell phones, toys, tools and equipment, spacecraft, buildings, components of these, and the like. When an MEA of a fuel cell incorporates a central polymeric membrane, the fuel cell may be referred to as a polymer electrolyte fuel cell (PEFC). Examples of MEA's and their use in fuel cells are further described in U.S. Pat. Nos. 6,756,146; 6,749,713; 6,238,534; 6,183,668; 6,042,959; 5,879,828; and 5,910,378.

In fuel cells, hydrogen gas, or a fuel gas including hydrogen, is fed to a fuel electrode (anode) and oxygen or a gas such as air including oxygen is fed to an oxidizer electrode (cathode). Hydrogen is oxidized as a result, generating electricity. Typically, catalysts are used at one or both of the anode and cathode to facilitate this reaction. Common electrode catalysts include platinum or platinum used in combination with one or more of palladium, rhodium, iridium, ruthenium, osmium, gold, tungsten, chromium, manganese, iron, cobalt, nickel, copper, alloys or intermetallic compositions of these, combinations thereof, or the like.

The hydrogen used by a fuel cell may be obtained by reforming one or more hydrogen-containing fuels, e.g., an alcohol or hydrocarbon. Examples of reforming processes include steam reforming, autothermal reforming, and partial-oxidation reforming. Ideally, the products of reformation would include only hydrogen and carbon dioxide. In actual practice, carbon monoxide is also a reformation by-product, and water and nitrogen often are present as well. By way of example, a typical reformed gas might include 45 to 75 volume percent hydrogen, 15 to 25 volume percent carbon dioxide, up to 3 to about 5 volume percent water, up to 3 to about 5 volume percent nitrogen, and 0.5 to 2 volume percent carbon monoxide. The carbon monoxide unfortunately has a tendency to poison the platinum catalyst used in fuel cells, significantly reducing fuel cell output.

In order to avoid catalyst poisoning, it is desirable to reduce the CO content of the reformed gas to no more than about 10 ppm to about 100 ppm. However, the low boiling point and high critical temperature of CO make its removal by physical adsorption very difficult, particularly at room temperature.

One feasible method for removing carbon monoxide from reformed gas generally has involved using a catalytic system that selectively oxidizes the CO relative to hydrogen, converting the CO to carbon dioxide [$CO+\frac{1}{2}O_2 \Rightarrow CO_2$]. After this catalytic conversion, the reformed gas may be supplied directly to a fuel cell inasmuch as the carbon dioxide formed is much less harmful to the fuel cell catalyst, e.g., platinum. The process of selectively oxidizing CO relative to hydrogen is known as selective oxidation or preferential oxidation (PROX) and is a highly active area of research. The desirable characteristics of such a catalyst have been described by Park et al [*Journal of Power Sources* 132 (2004) 18-28] as including the following:

(1) high CO oxidation activity at low temperatures;
(2) good selectivity with respect to the undesired oxidation of $H_2$;
(3) a wide temperature window for a greater than 99% conversion of CO; and
(4) tolerance towards the presence of $CO_2$ and $H_2O$ in the feed.

CO oxidation activity may be expressed as percentage CO conversion ($X_{CO}$) and is calculated as follows:

$$X_{CO} = \frac{[CO]_{in} - [CO]_{out}}{[CO]_{in}} \times 100 \text{ percent}$$

Selectivity towards CO($S_{CO}$) is defined as the ratio of the $O_2$ used for CO oxidation to total $O_2$ consumption. $S_{CO}$ is computed as a percentage as follows:

$$S_{CO} = \frac{[CO]_{in} - [CO]_{out}}{2 \times ([O_2]_{in} - [O_2]_{out})} \times 100 \text{ percent}$$

Good PROX catalysts are both highly active and highly selective. Another important parameter is the stoichiometric oxygen excess factor lambda, $\lambda$, wherein $\lambda=2*[O_2]/[CO]$. When $\lambda=1$, this means that oxygen is present in the stoichiometric amount for complete CO oxidation. When $\lambda>1$, this corresponds to an oxygen excess over that required for complete CO oxidation. It is preferable in fuel cell operation to keep $\lambda$ as low as possible while still maintaining >99.5% CO conversion. This minimizes dilution of the hydrogen fuel and usually maximizes the selectivity of the PROX catalyst.

Considerable effort has been applied in the industry to design suitable catalysts capable of this kind of selective oxidation. Many significant challenges are faced. As one challenge, many conventional CO catalysts have insufficient activity and/or selectivity under reasonable operating conditions. For instance, many CO oxidation catalysts are only active at temperatures of 150° C. or higher, where selectivity may be inadequate. This means that not only carbon monoxide but also hydrogen is oxidized [$H_2+\frac{1}{2}O_2 \Rightarrow H_2O$], wasting the hydrogen fuel. Even if some degree of selectivity is shown by a catalyst operating at such higher temperatures, the catalytically processed gas might have to be cooled before the gas is supplied to a fuel cell.

It would be much more desirable to have a selective CO catalyst that functions at lower temperatures, e.g., below about 70° C., or even below about 40° C., or even more desirably at room temperature or below. Very few CO oxidation catalysts, though, are active and/or selective at such low temperatures. This is true even though oxidation to $CO_2$ is thermodynamically favored. Additionally, some catalysts are damaged or otherwise inhibited in the presence of $CO_2$ and/or water, both typically being present in a reformed gas. Other catalysts are limited by a short service and/or shelf life.

Most of the proposed catalysts for selective oxidation of carbon monoxide in hydrogen-rich streams have been alumina supported platinum group metals (especially Pt, Rh, Ru, and Ir). Supported Pt catalysts exhibit a maximum activity for CO oxidation at around 200° C. with fair selectivities in the range from 40-60%. High conversion at lower temperatures requires more oxygen in the feed (high $\lambda$). This lowers the selectivity even further.

A report by Cominos et al. [*Catalysis Today* 110 (2005) 140-153] describes a Pt—Rh on γ-alumina catalyst that was able to reduce 1.12% CO to 10 ppm in a single stage reactor at 140-160° C. with an inlet oxygen to carbon monoxide ratio of 4 ($\lambda$=8). However, selectivity under these conditions was only 12.5% resulting in extensive loss of hydrogen fuel.

Low temperature activity can be improved by using titania, ceria or ceria-zirconia supports or by promotion with base metals like cobalt and iron; but selectivity is usually less than 50%.

In the absence of $H_2O$ and $CO_2$, base metal catalysts such as $CuO—CeO_2$ have been shown to be at least as active for PROX as the supported platinum group metals and considerably more selective. However, these catalysts are adversely affected by the presence of $CO_2$ and $H_2O$ in the reformate gas stream [Bae et al., *Catalysis Communications* 6 (2005) 507-511]. This effect is often quite large. Catalyst activity can be restored by operation at a higher temperature, but this decreases selectivity.

It has been observed that nanogold on iron oxide can be made to be active for selective CO oxidation. See, e.g., Landon et al. (2005) *Chem. Commun.*, "Selective Oxidation of CO in the presence of $H_2$, $H_2O$, and $CO_2$ Via Gold For Use In Fuel Cells," 3385-3387.

At ambient to sub-ambient temperatures, the best gold catalysts are considerably more active for CO oxidation than the most active promoted platinum group metal catalysts known. Gold is also considerably cheaper than platinum. Catalytically active gold, though, is quite different from the platinum group metal catalysts discussed above. The standard techniques used in the preparation of supported platinum group metal catalysts give inactive CO oxidation catalysts when applied to gold. Different techniques, therefore, have been developed for deposition of finely divided gold on various supports. Even so, highly active gold catalysts have been difficult to prepare reproducibly. Scaleup from small lab preparations to larger batches has also proved difficult.

These technical challenges have greatly hindered the industrial application of gold catalysts. This is unfortunate since the very high activities of gold catalysts for CO oxidation at ambient and sub-ambient temperatures and their tolerance for high water vapor concentrations make them otherwise strong candidates for use in applications in which oxidation of CO would be desired.

Because ultra-fine particles of gold generally are very mobile and possess large surface energies, ultra-fine particles of gold tend to sinter easily. This tendency to sinter makes ultrafine gold hard to handle. Sintering also is undesirable inasmuch as the catalytic activity of gold tends to fall off as its particle size increases. This problem is relatively unique to gold and is much less of an issue with other noble metals such as platinum (Pt) and palladium (Pd). Thus, it is desired to develop methods to deposit and immobilize ultra-fine gold particles on a carrier in a uniformly dispersed state.

Known methods to deposit catalytically active gold on various supports recently have been summarized by Bond and Thompson (G. C. Bond and David T. Thompson, *Gold Bulletin*, 2000, 33(2) 41) as including (i) coprecipitation, in which the support and gold precursors are brought out of solution, perhaps as hydroxides, by adding a base such as sodium carbonate; (ii) deposition-precipitation, in which the gold precursor is precipitated onto a suspension of the preformed support by raising the pH, and (iii) Iwasawa's method in which a gold-phosphine complex (e.g., $[Au(PPh_3)]NO_3$) is made to react with a freshly precipitated support precursor. Other procedures such as the use of colloids, grafting and vapor deposition, have met with varying degrees of success.

These methods, however, suffer from difficulties aptly described by Wolf and Schüth, *Applied Catalysis A: General*, 2002, 226 (1-2) 1-13 (hereinafter the Wolf et al. article). The Wolf et al. article states that "[a]lthough rarely expressed in publications, it also is well known that the reproducibility of highly active gold catalysts is typically very low." The reasons cited for this reproducibility problem with these methods include the difficulty in controlling gold particle size, the poisoning of the catalyst by ions such as Cl, the inability of these methods to control nano-sized gold particle deposition, the loss of active gold in the pores of the substrate, the necessity in some cases of thermal treatments to activate the catalysts, inactivation of certain catalytic sites by thermal treatment, the lack of control of gold oxidation state, and the inhomogeneous nature of the hydrolysis of gold solutions by the addition of a base.

In short, gold offers great potential as a catalyst, but the difficulties involved with handling catalytically active gold have severely restricted the development of commercially feasible, gold-based, catalytic systems.

German Patent Publication DE 10030637 A1 describes using PVD techniques to deposit gold onto support media. The support media described in this document, though, are merely ceramic titanates made under conditions in which the media would lack nanoporosity. Thus, this document fails to indicate the importance of using nanoporous media to support catalytically active gold deposited using PVD techniques. International PCT Patent Publications WO 99/47726 and WO 97/43042 provide lists of support media, catalytically active metals, and/or methods for depositing the catalytically active metals onto the support media. These two documents, however, also fail to appreciate the benefits of using nanoporous media as a support for catalytically active gold deposited via PVD. Indeed, WO 99/47726 lists many preferred supports that lack nanoporosity.

Relatively recently, very effective, heterogeneous catalyst systems and related methodologies using catalytically active gold have been described in assignee's co-pending United States patent application having U.S. Ser. No. 10/948,012, titled CATALYSTS, ACTIVATING AGENTS, SUPPORT MEDIA, AND RELATED METHODOLOGIES USEFUL FOR MAKING CATALYST SYSTEMS ESPECIALLY WHEN THE CATALYST IS DEPOSITED ONTO THE SUPPORT MEDIA USING PHYSICAL VAPOR DEPOSITION in the names of Larry Brey et al., and filed Sep. 23, 2004; and in U.S. Ser. No. 11/275,416, filed Dec. 30, 2005, in the names of John T. Brady et al., titled HETEROGENEOUS, COMPOSITE, CARBONACEOUS CATALYST SYSTEM AND METHODS THAT USE CATALYTICALLY ACTIVE GOLD. The respective entireties of these two co-pending patent applications are incorporated herein by reference. The catalytic systems described in these patent applications provide excellent catalytic performance with respect to CO oxidation.

Titania that is nanoporous and/or nanosized is highly desirable as a support for a number of catalytic processes, including those incorporating catalytically active gold. Nanosized titania can be easily prepared by hydrolysis of titanium alkoxides, hydrolysis of titanium salts, and by gas phase oxidation of volatile titanium compounds. Thus, nanosized titania is readily available commercially at reasonable cost. In addition, titania in nanosized form can be readily dispersed in water or other solvents for application on other substrates and carrier particles and can be provided as a coating on a variety of substrates in nanoporous form.

Besides its availability in nanoporous and nanosized form, titania has surface properties that are amenable to strong catalytic effects. Titania is well known for its ability to form partially reduced surface structures comprising defect sites such as oxygen anion vacancies. The high density of oxygen anion vacancies provides sites for oxygen adsorption and the adsorbed oxygen has been shown to be mobile on titania, allowing the oxygen to be transported to active oxidation sites on catalysts comprising metal particles supported on titania (Xueyuan Wu, Annabella Selloni, Michele Lazzeri, and Saroj K. Nayak, $Phys.$ $Rev.$ $B$ 68, 241402(R), 2003). Besides assisting in oxygen transport, the surface vacancies are known to help stabilize nanogold particles against deactivation through sintering and thus assist in enabling the generation of highly dispersed, catalytically active gold on titania catalysts. Titania has been found to be an excellent support for nanogold in highly active CO oxidation catalysts and for catalysts used for the direct epoxidation of propene (T. Alexander Nijhuis, Tom Visser, and Bert M. Weckhuysen, $J.$ $Phys.$ $Chem.$ $B$ 2005, 109, 19309-19319).

Nanogold on various substrates, including titania, has been proposed for use as a PROX catalyst. Although a number of methods have been examined, successful commercialization of a PROX catalyst using this approach has not occurred. An analysis of the situation is provided by Yu et al. (Wen-Yueh Yu, Chien-Pang Yang, Jiunn-Nan Lin, Chien-Nan Kuo and Ben-Zu Wan, $Chem.$ $Commun.$, 2005, 354-356):

Several reports in the literature have described the preferential oxidation of CO in a $H_2$ rich stream over gold supported on $TiO_2$. Among them, Haruta et al used a deposition-precipitation (DP) method, Choudhary et al used a grafting method, Schubert et at and Schumacher et al used impregnation and DP methods for the preparation of gold on the support. It was shown from their data that only a portion of CO in the feed stream was selectively oxidized to $CO_2$ and none of the catalyst systems can achieve close to the expected 100% conversion.

PROX catalysts comprising gold on nanoparticulate titania are described by Yu et al in the above referenced paper. But this work did not reveal a method by which the titania can be modified to show excellent PROX activity. As a result, the materials of Yu et al showed a strong sensitivity to carbon dioxide and moisture. The selectivity was very sensitive to changes in temperature and oxygen content and the challenge velocity had to be lowered in order to achieve modest PROX characteristics.

Mallick and Scurrell (Kaushik Mallick and Mike S. Scurrell, $Applied$ $Catalysis$ $A$, General 253 (2003) 527-536) reported that modifying titania nanoparticle substrates used for nanogold supports by hydrolyzing zinc onto the titania nanoparticles to form zinc oxide-coated titania nanoparticles caused a reduced catalytic activity for CO oxidation. The amount of zinc oxide introduced in this work, however, was excessive as compared to the required levels as shown herein. The work also did not reveal the improved PROX materials that could be prepared as shown herein.

Nanogold on nanoporous titania particles, however, has been found to be a potent catalyst for the reaction of hydrogen with oxygen. For example, Landon et al (Philip Landon, Paul J. Collier, Adam J. Papworth, Christopher J. Kiely, and Graham J. Hutchings, $Chem.$ $Commun.$ 2002, 2058-2059) have shown that catalytically active gold on titania could be used for the direct synthesis of hydrogen peroxide from $H_2$ and $O_2$. This high activity for hydrogen oxidation seemingly would make systems incorporating catalytically active gold deposited on nanoporous titania supports unsuitable for PROX applications. In the PROX applications, the catalyst system desirably oxidizes CO while avoiding hydrogen oxidation. Thus, while gold on titania has been examined as a PROX catalyst, commercial success for this application has been elusive.

Consequently, improvements are still desired for PROX catalysis. Notably, it is desirable to provide catalyst systems that show improved activity and selectivity for CO oxidation in the presence of hydrogen. It would also be desirable to provide catalyst systems that are relatively insensitive to the presence of carbon dioxide and water. Such catalyst systems would be very useful for removing CO from reformed hydrogen.

SUMMARY OF THE INVENTION

The present invention provides technology for controlling, or tuning, the catalytic activity of gold provided upon nanoporous supports such as those derived from nanoparticulate titania. It has been discovered that the nature of the surfaces of the nanoparticles used to support a nano-metal catalyst, such as catalytically active gold, has a profound effect upon the catalytic properties of the supported catalyst. The support surface may be altered as desired to control the activity of the gold. The present invention teaches how thermal treatment of nanoparticulate media incorporated into a nanoporous support prior to deposition of catalytically active gold dramatically suppresses the ability of a resultant catalyst system to oxidize hydrogen. Yet, the system still readily oxidizes CO.

In other words, by thermally altering the nanoparticulate surface via the principles of the present invention prior to gold deposition, PROX catalysts are readily made from materials including catalytically active gold and nanoparticulate media. In addition to such thermal modifications, the nanoparticulate support also may be optionally chemically modified to further enhance selectivity for CO oxidation with respect to hydrogen. Such chemical modifications may occur before or after thermal modification, but desirably also occur prior to depositing catalytically active gold onto the support incorporating the nanoparticles.

The present invention desirably uses physical vapor deposition (PVD) techniques to deposit the gold onto the support incorporating the nanoparticles, as PVD techniques make it easier to maintain the surface characteristics of the support onto which the gold is deposited. We also have observed that a catalytically active metal such as gold is active right away when deposited via PVD. There is no need to heat treat the system after gold deposition as is the case with some other methodologies, although such heat treating may be practiced if desired. Additionally, the gold is highly active catalytically for relatively long periods with respect to CO oxidation, even though it tends to be deposited only proximal to the support media surface when using PVD to deposit the gold.

For PROX applications, the catalytic system of the present invention has high CO oxidation activity relative to hydrogen. For instance, in one embodiment the catalytic system has effectively removed CO from a gas having the composition of a reformed hydrogen gas, i.e., a gas rich in hydrogen but also containing about 1 to 2 percent CO. The CO content was reduced to levels below the detection level of monitoring instrumentation, i.e., below 10 ppm and even below 1 ppm, while de minimis hydrogen was consumed.

The PROX catalyst system performs over a wide range of temperatures, including lower temperatures than have been associated with other, previously known catalysts proposed for selective CO oxidation. For instance, illustrative embodiments of the present invention show oxidation activity for CO at relatively low temperatures, e.g., temperatures below about 70° C., and even below about 40° C. to 50° C. Some embodiments can function at ambient temperature or below ambient temperature with excellent selectivity for oxidizing CO with respect to hydrogen, including temperatures in the range from about 22° C. to about 27° C. and even much cooler (e.g., less than 5° C.).

The PROX catalyst systems also can perform at elevated temperatures. For instance, illustrative embodiments of the present invention show high selectivity, for example greater than 65 volume %, for CO oxidation in hydrogen containing gases at temperatures higher than 60° C. and even higher than 85° C.

Representative embodiments of the PROX catalyst system are relatively insensitive to both moisture and $CO_2$. This allows the present invention to be used to oxidize CO in reformed hydrogen, which often contains $CO_2$ and water. The catalytic system is very stable, has long shelf life, and provides high levels of catalytic activity for extended time periods. Consequently, the present invention is quite useful in PROX reactions for removing CO from reformed hydrogen to be used in the operation of a fuel cell or other CO sensitive device. The catalyst systems also are effective in humid environments and work over a wide temperature range, including room temperature (e.g., about 22° C. to about 27° C.) and much cooler (e.g., less than 5° C.).

The PROX catalyst system of the present invention also shows outstanding activity even when challenged with high flow rates of CO-contaminated gas. Challenges of CO at levels of 1 volume % CO or even 2 volume % CO or higher are removed by the PROX catalyst system to levels below 10 ppm and even below 1 ppm CO at $CO/H_2$ selectivities above 90% and even selectivities above 95% tested at high flow rates above 2,600,000 ml $h^{-1}g$-$Au^{-1}$, even above 5,000,000 ml $h^{-1}g$-$Au.^{-1}$ and even above 10,000,000 ml $h^{-1}g$-$Au.^{-1}$ in the presence of 20 volume % $CO_2$, 30 volume % $CO_2$ or even higher as measured at ambient temperature and pressure.

One specific embodiment of a nanoporous support incorporates thermally treated nanoparticulate titania that desirably further incorporates one or more additional kinds of metal-oxo content proximal to the particle surfaces. Making effective PROX catalysts from gold and titania had been a difficult goal to achieve. It is believed that much of the work to date in this area has failed due to the inability of many conventional processes to allow a controlled study of the effect of changes in the nature of the nanoparticle surfaces upon the catalytic properties of the gold supported thereon. This inability results at least in part because many conventional processes used to form catalytically active gold catalysts have not used PVD techniques to deposit the gold. Rather, such processes have involved, for instance, hydrolyzing solutions comprising auric chloride or the like in such a fashion that the gold deposits on particles either supplied in the process or formed therein. Such deposition often was followed by a thermal treatment to try to change both the gold and the gold-support interaction. Because of the changing conditions of deposition and the fickle results of such a process, systematic changes in the substrate surface and in the substrate-gold interaction have proven to be essentially impossible.

By using the physical vapor deposition techniques to deposit catalytically active gold onto titania, the impact of modifying the surface of the titania support upon catalytic activity is readily assessed. The use of PVD techniques to deposit catalytically active gold onto a variety of supports, including titania, is described in Assignee's co-pending United States patent application having U.S. Ser. No. 10/948,012, titled CATALYSTS, ACTIVATING AGENTS, SUPPORT MEDIA, AND RELATED METHODOLOGIES USEFUL FOR MAKING CATALYST SYSTEMS ESPECIALLY WHEN THE CATALYST IS DEPOSITED ONTO THE SUPPORT MEDIA USING PHYSICAL VAPOR DEPOSITION in the names of Brey et al. and filed Sep. 23, 2004, the entirety of which is incorporated herein by reference for all purposes.

For the PROX and other aspects of the invention, the gold is deposited onto nanostructured support particles after the desired surface modification is present. In some instances, the principles of the invention may be used to select commercially available nanoparticulate supports having the desired surface characteristics. In other instances, the principles of the invention may be used to appropriately tune a support so that the resultant catalyst has the desired activity. These nanostructured support particles in turn may be further supported upon, or otherwise integrated into, a wide variety of relatively larger host structures and materials.

In one aspect, the present invention relates to a system for generating electricity, comprising:

a catalyst vessel holding a catalyst system comprising catalytically active gold deposited onto a support, said support comprising a plurality of nanoparticles, wherein the nanoparticles are present as clusters of aggregated nanoparticles onto which the catalytically active gold is deposited, wherein the nanoparticles have been thermally treated prior to gold deposition in a manner such that the catalyst system selectively oxidizes CO relative to hydrogen to a greater degree than an otherwise identical catalyst system without such thermal treatment;

a supply of a gas feed fluidly coupled to an inlet of the catalyst vessel, said gas feed comprising CO and hydrogen; and an electrochemical cell downstream from and fluidly coupled to an outlet of the catalyst vessel.

In another aspect, the present invention relates to a method for selectively oxidizing CO relative to hydrogen, comprising:

providing a catalyst vessel holding a catalyst system, said catalyst system comprising catalytically active gold deposited onto a support, said support comprising a plurality of nanoparticles that are present as clusters of aggregated nanoparticles onto which the catalytically active gold is deposited, wherein the nanoparticles have been thermally treated prior to gold deposition in a manner such that the catalyst system selectively oxidizes CO relative to hydrogen to a greater degree than an otherwise identical catalyst system without such thermal treatment; and causing a supply of a gas feed comprising CO and hydrogen to contact the catalyst system under conditions such that the CO is selectively oxidized with respect to the hydrogen.

In another aspect, the present invention relates to a catalyst system for selectively oxidizing CO relative to hydrogen, comprising catalytically active gold deposited onto a support, said support comprising a plurality of nanoparticles that are present as clusters of aggregated nanoparticles onto which the catalytically active gold is deposited, wherein the nanoparticles have been thermally treated prior to gold deposition in a manner such that the catalyst system selectively oxidizes CO relative to hydrogen to a greater degree than an otherwise identical catalyst system without such thermal treatment.

In another aspect, the present invention relates to method of making a catalyst system, comprising the steps of:
providing a plurality of nanoparticles;
incorporating the nanoparticles into a support, wherein the nanoparticles are present as clusters of aggregated nanoparticles; and
using physical vapor deposition techniques to deposit catalytically active gold onto the support, wherein the nanoparticles have been subjected to a thermal treatment.

In another aspect, the present invention relates to a method of generating electricity, comprising the steps of:
causing a fluid admixture comprising CO and hydrogen gases to contact a catalyst system comprising catalytically active gold deposited onto a support, said support comprising a plurality of nanoparticles, wherein the nanoparticles are present as clusters of aggregated nanoparticles onto which the catalytically active gold is deposited; and
after causing the gas to contact the catalyst system, using the gas to create electricity.

In another aspect, the present invention relates to a method of making a catalyst system, comprising the steps of:
providing information indicative of how a thermal treatment of a support comprising a plurality of nanoparticles that are present as clusters of aggregated nanoparticles impacts a characteristic of a catalyst system for oxidizing CO relative to hydrogen; and
using the information to make a catalyst system that selectively oxidizes CO relative to hydrogen.

In another aspect, the present invention relates to a method of preparing a catalyst, comprising the steps of:
providing metal oxide nanoparticles;
thermally treating the nanoparticles;
incorporating the nanoparticles onto a host to provide a catalyst support in a manner such that the nanoparticles are present on a host surface as aggregates of the nanoparticles; and
depositing catalytically active gold onto the catalyst support that incorporates said thermally treated nanoparticles.

In another aspect, the present invention relates to a method of preparing a catalyst, comprising the steps of:
providing a support comprising a surface having crystalline and amorphous surface regions;
thermally treating the support; and
physical vapor depositing catalytically active gold onto the thermally treated support.

DETAILED DESCRIPTION

Figure 2:
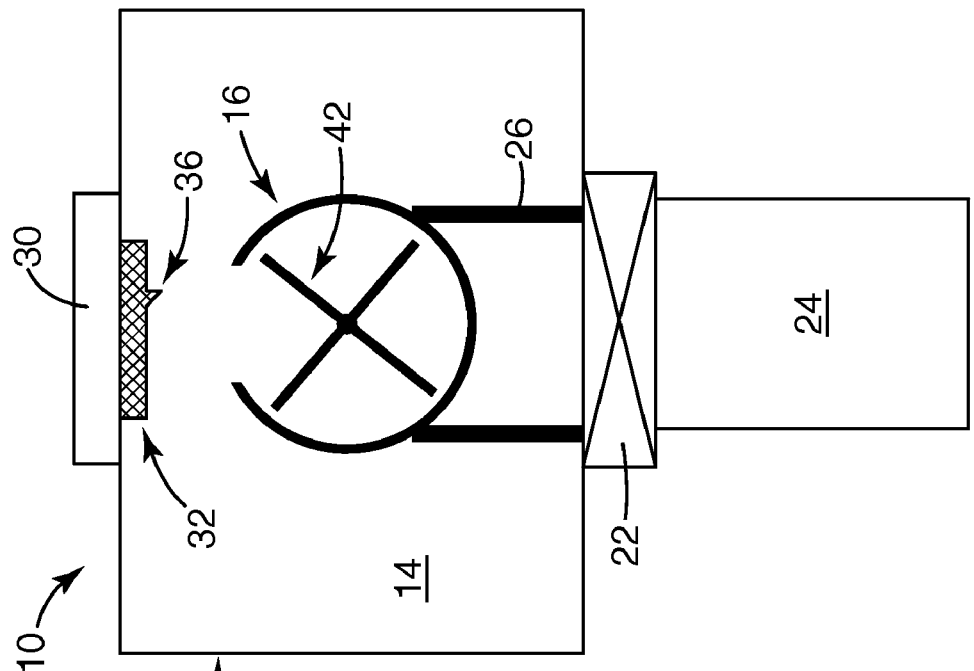
FIG. 2 is a schematic side view of the apparatus of FIG. 1.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. All patents, published applications, other publications, and pending patent applications cited herein are incorporated herein by reference in their respective entireties for all purposes.

We have discovered that the nature of the surfaces of the nanoporous support used for catalytically active materials such as gold has a profound effect on the catalytic properties of the supported catalytically active material. We further discovered that we could selectively alter the nature of the support surface in such a way as to tune catalytic selectivity for oxidizing CO relative to hydrogen.

The PROX catalysts of the present invention are comprised of catalytically active gold provided on one or more nanoporous, thermally treated support material(s). Preferably, the nanoporous, thermally treated support material is derived from ingredients including thermally treated nanoparticulate media optionally further supported upon larger host material(s). Optionally, the support material may also be compositionally multi-domain. We have found that surface deposition/coating of catalytically active metal onto the nanoscale topography of supports formed from such nanoparticulate media provides PROX catalyst systems with excellent performance. In the case of gold, for example, it appears that these nanoscale features help to immobilize the gold, preventing gold accumulation that might otherwise result in a loss of performance.

The nanoparticulate media used as at least one of the ingredients to form the nanoporous, multi-domain support material generally are in the form of nanosized particles having a particle size on the order of about 100 nm or less, although aggregates of these particles as used in the present invention may be larger than this. As used herein, particle size refers to the greatest width dimension of a particle unless otherwise expressly noted. The preferred nanoparticulate media comprises very fine particles whose greatest width desirably is less than 50 nanometers, preferably less than 25 nanometers and most preferably less than 10 nanometers.

In representative embodiments, the nanoparticles may or may not themselves include nanoporosity, but they may aggregate to form a larger nanoporous aggregate structures, which may further form still larger aggregate clusters. In these aggregate structures and aggregate clusters, nanopores can be formed at least by the interstitial spaces between the nanoparticles forming the aggregates. Clusters of these aggregates generally may have a particle size in the range of 0.2 micron to 3 micron in size, more preferably in the range of 0.2 micron to 1.5 micron in size and most preferably in the range of 0.2 micron to 1.0 micron in size. In representative embodiments, the clusters of aggregated particles are further supported on a host material as described below. A particularly useful construction of the present materials is one involving the use of agglomerates of the treated nanoparticles wherein the nanoparticle agglomerates are packed to form layers possessing multi-modal, e.g., bi-modal or tri-modal, distributions of pores.

Nanoporous aggregate structures and aggregate clusters useful in the present invention can be formed for example by controlled aggregation of nanoparticle sols and dispersions. Controlled aggregation can be accomplished by mechanical dispersion of the nanoparticles at or near, e.g., within about 2 pH units, of the isoelectric point of the nanoparticles being used. Controlled aggregation can also be induced through raising of the ionic strength of the dispersion medium or by addition of flocculating agents as is known in the art.

Particle size in the various aspects of the present invention may be measured in any appropriate manner in accordance with conventional practices now or hereafter practiced. According to one approach, particle size may be determined by inspection of TEM information. The nanoparticles and the nanoporous support media derived therefrom preferably have a high surface area as measured by BET. The surface area of each is preferably greater than about 35 m$^2$/g, more preferably greater than about 100 m$^2$/g. and most preferably greater than about 250 m$^2$/g, respectively.

Nanoporosity generally means that the support (optionally the particles) includes pores having a width of about 100 nm or less, more typically a width in the range of about 1 nm to about 30 nm. Nanopores can be observed in the support material, and corresponding nanopore size can be measured, via transmission electron microscopy (TEM) analysis. It is important to note that the support materials only need be nanoporous in the exterior surface region of the support, particularly when gold is deposited via line of sight, PVD techniques. Preferably, nanoporosity extends to a depth equal to or greater than the penetration depth of the gold atoms deposited via such PVD techniques.

The nanoporous nature of a support, such as a support comprising nanoporous agglomerates of titania nanoparticles (wherein the nanoparticles per se may or may not comprise nanoporosity), may also be characterized by a technique such as described in ASTM Standard Practice D 4641-94 in which nitrogen desorption isotherms are used to calculate the pore size distribution of catalysts and catalyst supports in the range from about 1.5 to 100 nm. When using this ASTM technique, nanoporous, preferably titania-based support materials typically possess pores in the 1 to 100 nm size range at or proximal to the surface of the support. More typically, such support materials may have a total nanoporous capacity for pores in the size range of 1 to 10 nm that is greater than 20% (i.e., greater than about 0.20 using the formula below) more preferably greater than 40% and most preferably greater than 60% of the total pore volume of the preferably titania-based support material in the range from 1 to 100 nm as calculated using the following formula with data obtained from ASTM D4641-94, the entirety of which is incorporated herein by reference:

$$NPC = \frac{CPv_1 - CPv_{10}}{CPv_1 - CPv_{100}}$$

wherein NPC refers to the nanoporous capacity; $CPv_n$ refers to the cumulative pore volume at pore width n in cm$^3$/g; and n is the pore width in nanometers.

In addition to nanoporosity, the support material derived from ingredients including the nanoparticulate media may further have microporous, mesoporous, and/or macroporous characteristics such as are defined in applicable provisions of IUPAC Compendium of Chemical Technology, 2d edition (1997).

In preferred embodiments in which the nanoparticles include titania particles, the titania nanoparticles preferably have a particle size in the range of 3 nm to 35 nm, more preferably in the size range of 3 nm to 15 nm and most preferably in the size range of 3 nm to 8 nm. The titania nanoparticles may themselves contain some nanopores in the range of 1 nm to 5 nm. Representative agglomerates of titania nanoparticles may include nanopores that are very fine and in the range of 1 to 10 nm. The aggregate structures will also tend to further include additional pores that are larger, i.e., in the range of 10 to 30 nm. Still larger pores in the range of 30 to 100 nm are formed by the packing of the nanoparticle aggregates into larger clusters. Structures formed from these aggregates may also tend to include even larger pores having a size in the range of 0.1 micron to 2 micron, more preferably in the range of 0.1 micron to 1.0 micron and most preferably in the range of 0.1 micron to 0.5 micron.

The support material formed from these agglomerates advantageously has the larger pores present at a level of 20 to 70% of the volume of the nanoparticulate media, preferably at a level of 30 to 60% of the volume of the nanoparticulate media, and most preferably at a level of 35 to 50% of the volume of the nanoparticulate media. The percent by volume of the larger pores can be measured by SEM and mercury porosimetry as is know to those skilled in the art.

By having pores on several levels of size, very active catalysts can be made that both support very fine particles of gold while also allowing facile access to the active gold sites by the challenge gas. The larger pores in these structures are also particularly important in allowing the deposition of gold into the depth of the porous titania matrix via the PVD method.

In certain applications of use in high humidity, it may be preferable to optimize the pore size so as to limit the inhibitory effects of capillary condensation of water. In this case it may be preferable to grow the very small pores by heat treatment so as to maintain high surface area while lowering the percentage of very small pores, i.e., those in the range of 2 nm or less. In the treatments of the present invention used to alter the nature of the surfaces of the titania particles, the specific surface area of the titania may increase, remain the same or be somewhat lowered. Preferably, these treatments accomplish this surface alteration advantageously without significantly decreasing the surface area of the particles.

The nanoparticulate ingredients used to form the support material of the present invention may be nanoporous per se. Alternatively, the nanoparticles may be nonporous as supplied, but can be made to possess exterior surfaces characterized by nanoporosity via aggregation, coating, chemical or thermal treatment, and/or the like. For instance, representative methodologies include adsorption of nanoparticulate material such as gels and nanoparticle size colloids on the surface of a larger, host material to form a composite with the desired nanoporosity; hydrolysis of metal alkoxides or metal salts on the surface of a material to form the nanoporous materials; and oxidation of a thin coating of metal, e.g., aluminum, titanium, tin, antimony or the like, on the surface of a material to form a nanoporous material. In the latter case, the thin metal films can be deposited by physical vapor methods and the oxidation can be carried out by dry or moist air to produce a nanoparticle film on the substrate.

A wide variety of nanoparticulate media may be incorporated into nanoporous supports in the practice of the present invention. Representative examples of suitable nanoparticles include nanoporous titania, alumina, silica, chromia, magnesium oxide, zinc oxide, iron oxides, ceria, zirconia and other oxides that can be generated or obtained in the nanometer size range. Nanosized titania is preferred. The nanoparticulate titania useful in the present invention preferably is in the anatase and/or the rutile form.

The thermal treatment of the nanoparticulate component advantageously allows the creation of a nanoporous support structure having carefully engineered surface properties. Certain supports such as nanoparticulate titanium oxide function very well as a support for catalytically active gold particles as these possess high catalytic activity for CO oxidation. Yet, these materials might not be sufficiently selective at a convenient temperature to be able to controllably oxidize CO in the presence of hydrogen, water and carbon dioxide. The nanoparticle titanium oxide materials are, however, very desirable with respect to their phase stability and availability as particulate materials having primary dimensions in an exceedingly fine size range. Thus, one thrust of the present invention is to provide a method of tailoring the activity of supports incorporating material such as nanoparticulate titania so as to provide an excellent substrate to bear catalytically active gold for the selective oxidation of CO in the presence of hydrogen and, in some applications, in the presence of carbon dioxide gas and water vapor. Thus, the catalysts of the present invention are very useful for the selective removal of carbon monoxide in gas streams containing hydrogen such as in relatively inexpensive, reformed fuel cell gas feed stocks.

Without being thermally treated and/or provided in a multi-domain form in accordance with the present invention, it has been observed that there are properties inherent in the surface features of nanoparticulate titania and certain other nanoparticulate metal oxides that tend to catalyze the oxidation of hydrogen after the deposition of catalytically active gold. While not wishing to be bound by theory, these surface features may include active sites comprising oxygen anion vacancy clusters, dislocations, surface steps, edges, amorphous and disordered domains and other defects that provide active sites for hydrogen adsorption and partial reduction of the titania surface. These sites may also activate the catalytically active gold particles towards the oxidation of hydrogen. Since these sites can also enhance the oxidation of CO in the absence of hydrogen, supports for catalytically active gold that incorporate nanoparticulate titania can be very useful for the removal of CO from gases not containing hydrogen as described in Assignee's co-pending applications cited above. But, for PROX applications, the catalytic oxidation of hydrogen is very undesirable.

We have discovered that the undesirable oxidation of hydrogen by catalytically active gold can be profoundly suppressed by thermally treating the nanoparticulate media incorporated into nanoporous supports prior to gold deposition. It is further preferred that such nanoparticulate media also incorporate surfaces characterized by multiple compositional domains, preferably nanoscale compositional domains. It is believed that the present invention works at least in part because thermal treatment of the nanoparticles may tend to mask, unmask, or otherwise regulate the amount and/or reactivity of various active sites on the particle surface, and the nature of these active sites impacts catalytic activity of gold supported thereon.

In the case of titania, for instance, the nature of a titania surface generally is characterized by the chemical identity of the surface sites and regions, the coordination of the surface atoms, the capability of the surface to bind or react with certain molecules, and related surface characteristics. Certain common surfaces of titania are known to be terminated with two-fold coordinated $O^{2-}$ anions and 5-fold coordinated $Ti^{4+}$ cations (Renald Schaub, Erik Wahlström, Anders Rønnau, Erik Lægsgaard, Ivan Stensgaard, and Flemming Besenbacher, *Science*, 299, 377-379 (2003)). Partial reduction of the surface produces single oxygen vacancies and stronger surface reduction produces oxygen vacancy clusters and troughs.

These surface features are very important in the immobilization and activation of the catalytically active gold particles and clusters in the present catalysts. We have discovered that certain of these surface features may be blocked or otherwise modified to suppress the ability of the subsequently deposited gold to oxidize hydrogen at low temperature and thereby provide a highly selective PROX catalyst system. In particular, and without wishing to be bound, it is believed that the ability of the gold to oxidize hydrogen is generally associated at least in part with disordered or amorphous titanium oxo-domains that exist on or proximal to the nanoparticulate titania surfaces. It has been observed that gold deposited onto titania including relatively more of such domains would tend to more readily oxidize both carbon monoxide and hydrogen without much selectivity and therefore may be less suitable for PROX work.

In contrast, thermal treatment of the titania surface may block or otherwise reduce the ability of these titanium-oxo domains to oxidize hydrogen. It has been observed that gold deposited onto thermally treated titania will tend to readily oxidize carbon monoxide but have less ability to oxidize hydrogen. Therefore, catalyst systems in which the titania incorporates a reduced amount of such domains will tend to be more suitable for PROX work.

A wide variety of thermal conditions may be used to thermally treat nanoparticulate media in accordance with the practice of the present invention. Preferably, thermal treatment conditions are used that at least partially reduce the amorphous domain content that may be present proximal to the particle surfaces. This content may be assessed using TEM analysis. Generally, the modified nanoparticles can be thermally treated by heating above about 200° C. for a suitable period of time to achieve the desired degree of selectivity. More desirably, the thermal treatment is accomplished by heating between about 200° C. and 600° C. for a period of many seconds to several hours more typically from about 3 to about 5 minutes to about 10 to 15 hours. Even without being used in combination with an optional chemical modification, such thermal treatment has been observed to significantly improve the selectivity by which the resultant catalyst oxidizes CO with respect to hydrogen.

When a higher temperature is used, e.g., 550° C., the thermal treatment may be of shorter duration, e.g., 30 seconds to 30 minutes and yet be very effective for helping to suppress hydrogen oxidation activity. When lower temperature is used, e.g., 275° C., the treatment may be of longer duration to be effective. The thermal treatments can be carried out in a variety of atmospheric conditions, including ambient, inert, oxidizing and/or reducing atmospheres. The treatment may occur in more than one kind of atmosphere in sequence, such as wherein the samples are calcined in an oxidizing atmosphere initially to remove surface carbon species and then in a reducing atmosphere to introduce additional oxygen anion vacancies.

It is desirable for the treatments to be carried out so as not to significantly reduce the surface area of the particles. Since higher temperature treatments may cause the particles to sinter and the surface area to fall, it is preferable to use temperatures as low as possible to affect the required decrease in hydrogen oxidation activity. By using the peroxide assessment described herein to screen thermal treatment conditions in combination with surface area measurements, very effective conditions for preparing supports for catalytically active gold PROX catalysts can be identified.

For example, a TEM examination of the effect of the thermal treatments on titania support particles corroborates that thermal treatment reduces the amorphous content proximal to the surfaces of the treated particles. To carry out this examination, sample titania particles are mounted on a TEM grid and examined at 200-450 kx magnification. The stage is adjusted so as to allow clear viewing of an edge of a titania particle and the stage is tilted to a zone axis to develop clear viewing of the titania lattice lines. The focus of the microscope is adjusted so as to provide sharp focus on the particle edge. The examination desirably provides a clear, unobstructed view of the particle edge. The edge should not overlay other particles or debris or be obscured by having other particles or materials superimposed above it. If the observed lattice lines terminate prior to the edge, the region from the edge to the beginning of the lattice lines is defined as an amorphous surface region.

This TEM examination further inspects the details of this surface region under these observation conditions (e.g., is it stepped and jagged, or is it rounded and amorphous in appearance, etc.). To carry out this examination at least 20 or more particles from each sample are inspected. In the untreated titania samples, it is observed that many of the crystallite surfaces are characterized by disordered surface domains extending about 0.5 to 1 nm into the particle surface. In some cases these regions were observed to follow the outline of the crystalline region as defined by the area displaying the lattice lines. In many cases these regions were irregular and included rounded, amorphous-appearing material having a lower density (as evidenced by a lower contrast in the electron beam) than the crystalline portion. In some cases the amorphous domains were greater than 5 nm in size and comprised a significant portion of the nanoparticle.

The thermal treatments of the samples result in the modification of a majority of the amorphous, titanium-containing surface material and cause a sharpening of the observed titania crystallite surface boundaries. Thus in the thermally treated particles according to the present invention, for most particles, the lattice lines of the titania crystallites are observed to extend to the very edge of the particle. Although some amorphous, titanium-oxo surface regions can be noted, the density of such domains and the size of these domains in the thermally-treated samples were much lower. In the samples examined in this manner, the incidence of observance of amorphous, titanium-oxo surface domains greater than about 2 nm in size decreased by a factor of at least 4 after thermal treatment.

Optionally, the thermally treated nanoparticles of the present invention further have a multi-domain surface onto which catalytically active gold is deposited. Multi-domain means that the support surface incorporates two or more compositionally different domains at least proximal to the surface onto which the gold is deposited. Our data show that selective catalytic activity for CO oxidation relative to hydrogen is enhanced when gold is deposited onto a multi-domain surface. While not wishing to be bound, it is believed that the resultant domain boundaries on the surface appear not only to help stabilize gold but also to block sites that, when activated with nanogold, participate in low temperature oxidation of hydrogen. It also is believed that these domain boundaries are very finely dispersed at the nanoscale, helping to make the boundaries effective for immobilizing the nanoscale, catalytically active gold.

Domains may be crystalline and/or amorphous and preferably are as small as possible. Preferably, the domains are nanosized, having dimensions in the direction generally perpendicular to the particle surface (e.g., a thickness) of less than about 5 nm, preferably less than about 2 nm, more preferably less than about 1 nm. The domains can have dimensions in the direction generally parallel to the particle surface (e.g., a width) approaching the diameter of the particle. Preferably this dimension is less than 10 nm, more preferably less than 5 nm and most preferably less than 2 nm.

The domains generally may be distinguished using TEM analysis, XPS analysis, IR analysis, or other suitable techniques. Since these domains are exceedingly small, often combinations of analytical techniques are used. X-ray analysis can be used to examine alterations in the nanoparticle material that is being modified by the present methods but it oftentimes cannot detect the nano-domains that are provided by the present methods.

To assess multi-domain character, TEM analysis of the treated nanoparticles may be carried out in the following manner. Samples for TEM investigation are prepared by dispersing the nanoparticles into ethanol. One drop of the resulting dilute particle suspension is placed onto a lacey carbon/formvar support film supported by a standard 200 mesh, 3 mm diameter Cu grid. The sample is allowed to dry for a few minutes before it is placed into the TEM apparatus. Imaging is performed on a Hitachi H9000 transmission electron microscope operating at 300 kV. Images are acquired digitally with a GATAN Ultrascan 894 CCD camera.

To carry out this examination, the particles mounted on a TEM grid as described above are examined at 200-500 kx magnification. The stage is adjusted so as to allow clear viewing of a nanoparticle and the stage is tilted to a zone axis to develop clear viewing of the particle lattice lines. The focus of the microscope is adjusted so as to provide sharp focus at different regions of the particle for a thorough examination. The examination must provide a clear, unobstructed view of the portions of the particle being viewed. In the case of examining the edge for domain structures, the edge cannot be overlaying other particles or debris or be obscured by having other particles or materials superimposed above it.

The domains are observed as aberrations of the lattice lines as well as discontinuities in these lines or changes in the transparency of the oriented crystal to the electron beam. When treatments as described herein are used to provide multi-domain characteristics, it is very helpful to compare the images of the treated particles with those of untreated particles to be able to differentiate between observed domains and disordered regions normally found on these particles.

Additionally, in analyzing the domains using TEM, the crystalline portion of a selected particle can be illuminated while viewing in dark field mode by sampling the diffracted electrons of the crystalline domain. Such techniques as known to those skilled in the art of TEM, can be used to provide additional differentiation of the surface domains so as to enable observation and characterization.

Further, energy dispersive, X-ray microanalysis may be carried out on the specimens with very high spatial resolution in order to compositionally assess respective domains. By adjusting the resolution down to about the size of the dimensions of the domains, the elemental composition of a particular domain region can be verified.

These kinds of analyses show that the domains present on the surface of the nanoparticles can vary from being very small, less than 1 nm in width, to conformal surface domains 5 nm in width or larger. The majority of the domains are very thin, for example less than 1 nm in thickness. When observed, the thickness of these larger domains may be 1 to 3 nm. It is undesirable to have larger domains that begin to form continuous coatings on the particles as the benefits of the multi-domain character and the nanoparticulate nature of the particles may be unduly reduced and/or lost. In the case of treatments involving the hydrolysis and oxidation of ferrous precursors in the presence of the nanoparticles, in addition to the domains on the surface particles, acicular particles of iron oxide or iron oxy-hydroxide were occasionally observed.

XPS studies may also be used to confirm the presence of the metal elements comprising the multiple domains on the surfaces of nanoparticles and also to provide information as to the oxidation state of the surface metal cations. Additionally, diffuse reflectance IR analysis of samples dried to remove surface water can be used to show changes in the absorptions due to surface hydroxyl species as compared to the absorptions characteristic of the parent nanoparticles indicating the presence of new, hydroxyl-functional domains on the surface of the particles.

With respect to those embodiments in which titania nanoparticles are chemically and/or thermally treated as described herein, XRD analysis of the thermally or chemically treated nanoparticles provides information on the identity and the crystalline size of the major crystalline materials present. The only major crystalline phase present is observed to be either anatase or rutile titania. By x-ray line-broadening analysis the approximate size of the titania is determined. The size of the crystalline titania is observed to grow somewhat with the thermal or chemical treatment. The growth of the titania is preferred to be less than 50% and more preferably less than 20% as determined by x-ray line broadening analysis because excessive growth is normally accompanied by an undesirably large decrease in surface area. Surprisingly, samples that showed very little titania crystal growth by x-ray line broadening analysis did not necessarily make superior PROX catalyst supports after treatment with gold. Similarly, samples that had showed larger titania crystal growth did not necessarily perform more poorly as PROX catalyst supports. With respect to performance of the materials as a PROX catalyst after treatment with gold, if the surface area was sufficiently high, the nature of the titania surface was a greater determinant as to PROX performance than titania crystallite growth.

Each such domain may be derived from one or more constituents that are intermixed. For example, a first domain may include a combination of ingredients A and optionally B, but be rich in A throughout. A second domain may include a combination of ingredients B and optionally A, but be rich in B throughout. In other instances, a first domain may include a combination of ingredients A and B (being rich in A or B throughout as the case may be), while a second domain may include a combination of ingredients C and D (being rich in C or D throughout as the case may be). In still other instances, a first domain may include a combination of ingredients A and B (being rich in A or B throughout as the case may be), while a second domain may include a combination of ingredients B and C (being rich in B or C throughout as the case may be).

In some embodiments, the domains may be physically or chemically bonded together at least at domain boundaries. For example, an embodiment described below includes titanium-oxo particles that are surface treated with zinc-oxo material to form a multi-domain composite having at least titanium rich domains and zinc rich domains. It is believed that the domains of these embodiments may be chemically bonded together via oxide and hydroxide linkages in some instances and physically bonded via van der Waals forces or the like in others.

The multi-domain particles conveniently are formed by depositing one or more additional kinds of metal-containing materials, e.g., metal-oxo materials, onto nanoparticles such as titania nanoparticles. From one perspective, the nanoparticles are surface treated with the additional metal containing material(s). It is our belief that the deposition of the additional compositional domains on the surface of the nanoparticles helps to block the reducible surface sites on the resulting nanoporous support derived from the nanoparticles and, in addition, helps to block sites that allow the adsorption of hydrogen and catalysis of the oxidation of hydrogen. In representative embodiments, the surface structure that is generated by the deposition of the hetero (i.e., comprising metals other than titanium) metal-oxo domains on a nanoporous support, such as titania particles, possesses domain sizes that are in the nanometer size range. It is believed that these compositionally distinct domains and/or the boundaries between these domains also help to stabilize the catalytically active gold that is desirable for high CO oxidation activity.

Preferred materials for modifying the nano-sized support particles include a wide range of metal-oxo species. Generally, the metal-oxo species of the present invention may be selected from metal-oxo-materials that are not reduced by hydrogen under the conditions of use of the PROX catalyst. Examples of useful metals include $M^{2+}$ and $M^{3+}$ (where M designates one or more metals) compounds and combinations of these metals wherein the metals are present in combination with oxygen. In the resultant metal-oxo domains, the oxygen typically is at least in the $O^{2-}$, $OH^-$, and/or $H_2O$ form. Other anions that do not unduly inhibit the catalysis of the CO oxidation can be present in minor amounts, e.g., up to about 15 mole percent of the domain. Examples of other anions that may be present include phosphate, nitrate, fluoride, acetate, combinations of these, and the like.

The $M^{2+}$ and the $M^{3+}$ metals can be selected from the main group metals, transition series metals, the alkaline earth metals and the rare earth metals that are not reduced by hydrogen under the conditions of use of the catalyst. Suitable metals include one or more of $Mg^{2+}$, $Ca^{2+}$, $Sr^{2+}$, $Zn^{2+}$, $Co^{2+}$, $Mn^{2+}$, $La^{3+}$, $Nd^{3+}$, $Al^{3+}$, $Fe^{3+}$, $Cr^{3+}$ and other low valent metal ions that form stable oxo-species on the surface of the nanoparticles after deposition. Alkali metals such as $Na^+$, $K^+$, $Rb^+$, $Li^+$ can also be present in the additional metal-oxo material with beneficial effect.

In addition to the $M^{2+}$ and $M^{3+}$ compounds, effective metal systems include those containing tin and tungsten. In these cases, higher oxidation state tin and tungsten compounds can be effectively used as precursors to form the metal-oxo domains on the nanoparticles, but to obtain effective PROX catalysts using these systems at least a partial reduction of the tin- or the tungsten-treated nanoparticles should be carried out. This can conveniently be accomplished by calcining in an inert or reducing atmosphere such as in a nitrogen or a nitrogen-hydrogen atmosphere. In the case where a reduction step is not included, the resulting catalysts of the invention may be more sensitive to the addition of carbon dioxide in the feed gas than might be desired.

A similar effect is observed when the modifying domains comprise cerium-based oxides. Cerium oxide domain materials that are modified so as to allow facile oxidation-reduction chemistry, for example ceria domains modified with rare earth oxides and mixtures of zirconium oxide and rare earth oxides, are better used as effective domains in the present PROX catalysts after being calcined in a reducing or non-oxidizing atmosphere (see examples 28-33). In the case of modifying oxo domains comprising ceria in a more difficult to reduce form, such as those comprising undoped ceria or ceria zirconia, the reducing step is not necessary to have beneficial effect from the addition of these cerium-containing oxo domains on the surface of the titania. The reducibility of such ceria-modified oxides can be measured by temperature programmed reduction (TPR) as is known in the art.

Metal oxides comprising zinc, alkaline earths, iron, aluminum, reduced tin, reduced tungsten, molybdenum, and cerium, and iron in combination with alkaline earth metals are preferred as materials for the modifying domains. Nanoparticles with surface domains comprising these materials have been shown to provide high selectivity, high activity and low sensitivity to carbon dioxide when used as a support for nano-gold.

While mixed metal systems are effectively used in the present invention, care must be taken to not deposit the metals in a form that might unduly catalyze the oxidation of hydrogen. Thus, while $Co^{2+}$ and $Mn^{2+}$ can be effectively used to form the metal-oxo domains on nanoparticulate supports that produce very efficient PROX catalysts after treatment with catalytically active gold, cobalt and manganese can be combined with other transition metals in other instances to produce certain mixed oxides that are easily reduced by hydrogen and that, consequently, can be efficient catalysts for the oxidation of hydrogen. Empirical testing can be used to determine whether a particular recipe has the desired selectivity with respect to hydrogen.

Most fuel cell feed stocks contain appreciable amounts of carbon dioxide. An important advantage of the composite PROX catalysts of the present invention, therefore, is the insensitivity of the inventive catalysts to the presence of carbon dioxide. The insensitivity of the catalysts of the present invention to the presence of carbon dioxide is due, at least in part, to the presence of an appropriate multi-domain surface. $CO_2$ insensitivity is further enhanced in some embodiments by the careful exclusion of detrimental anions from the catalyst support bearing the gold, such as the chloride, bromide, and/or iodide anions. It is also desirable to exclude amines from the final catalyst support bearing the catalytically active gold. In contrast, it is well known that carbon dioxide can substantially inhibit CO oxidation by conventional catalysts, including catalytically active gold. (Bong-Kyu Chang, Ben W. hug, Sheng Dai, and Steven H. Overbury, *J. Catal.*, 236 (2005) 392-400).

When the catalyst system is used to process feed stocks containing carbon dioxide, it may be desirable to limit and/or exclude metal cations that have been shown to have a negative affect on the activity of the catalysts to the presence of carbon dioxide. Examples of such metal cations include $Cu^{2+}$, $Ba^{2+}$, and certain forms of cerium as discussed above.

Multi-domain, nanoporous support media of the present invention preferably are formed by the deposition of at least one surface-modifying metal-oxo domain onto a nanoparticulate support. This deposition can be carried out in a number of ways. Illustrative processes for these depositions include 1) solution deposition, 2) chemical vapor deposition, or 3) physical vapor deposition.

Solution deposition involves reacting a dispersion of nanoparticles with precursor(s) of the additional metal-oxo domain(s) so as to adhere the metal-oxo domain precursor on the surface of the nanoparticles to form the additional domain(s) in situ. Initial adhesion can occur through simple adsorption of the metal-oxo domain precursor on the surface or through a chemical reaction that alters the metal-oxo domain precursor resulting in bonding of the resultant metal-oxo domain on the surface of the nanoparticles. This chemical reaction can involve hydrolysis, precipitation, complexation, oxidation or reduction of the metal in the metal-oxo domain precursor or a combination of these reactions.

In the case of hydrolysis, a metal salt or complex that is to form the metal-oxo domain is reacted with water in such a manner as to form an amorphous oxide or hydroxide on the surface of the nanoparticulate or nanoporous support. Examples of this include the base-induced hydrolysis of an acid soluble metal cation, e.g., cations such as the aquo complexes of $Al^{3+}$, $Fe^{3+}$, $Fe^{2+}$, $Zn^{2+}$, $Ca^{2+}$, $Co^{2+}$, and the like. The base-induced hydrolysis can be carried out by simultaneous or sequential addition of a solution of the metal complex or salt and the base solution to the dispersion of the nanoparticulate support. In this case, the deposition of the metal-oxo species occurs as a result of the base-induced formation of metal hydroxide species in the presence of the nanoparticulate and/or nanoporous media. In general, the metal hydroxide species that are formed are characterized by lower solubility with the result that they precipitate out on the surface of the nanoparticulate substrate materials. In general the dispersion of the nanoparticulate support is kept highly agitated during this addition so as to ensure the uniform deposition of the metal-oxo domain on the nanoporous support.

Examples of acid-induced hydrolysis of base stable metal anions include the acid induced hydrolysis of basic solutions containing silicates, aluminates, stannates, vanadates, and the like. In this case, the deposition of the metal-oxo domains on the substrate nanoparticles is carried out through the introduction of the basic metal anion solution to the dispersion of the substrate nanoparticles along with either simultaneous or sequential addition of the acid solution to maintain the pH at a point where controlled precipitation of the metal-oxo domains on the nanoparticles is achieved. In these reactions, the addition of an acid solution results in the polymerization of the metal hydroxyl-anions and precipitation of the nascent polyanionic species on the nanoporous support.

Whether using the addition of an acid to a base soluble metal anion or the base addition to a acid soluble metal cation to induce hydrolysis of the metal complex and deposition of the metal-oxo domain on the nanoparticle support materials, the pH that is chosen for the controlled precipitation will depend on the nature of the oxide or hydroxide of the metal to be deposited ($M_xO_y$) and the concentrations that are used. In general, the pH will be chosen to be at the point where the $\Delta$solubility $M_xO_y/\Delta pH$, i.e., the change in solubility of the oxide of the metal (M) used to form the metal-oxo domain precursor versus the change in pH is high. Very rapid changes in the conditions of the deposition solution that result in rapid decreases in the solubility of the metal-oxo precursors used to form the metal-oxo domains on the nanoparticle supports result in the deposition of very fine domain sizes of the surface modifying materials.

These hydrolyses can be carried out either at room temperature, at reduced temperatures or at elevated temperatures. In certain cases, e.g., in the case of $Fe^{3+}$ salts, the hydrolysis can be driven by raising the temperature of the metal salt-nanoparticle mixture. In this case the metal salt can be mixed prior to raising the temperature of the mixture to induce the hydrolysis or the metal salt solution can be added gradually to the hot dispersion over a period of time so as to ensure uniform distribution of the resulting metal-oxo domains on the nanoparticle support.

The additional metal-oxo domains can also be formed via hydrolysis of a metal complex such as a metal alkoxide. This type of hydrolysis generally involves the reaction of water with a metal alkoxide to form a hydroxide or hydroxyl-functional, partially hydrolyzed alkoxide that can form an oxide or hydroxide through further thermal treatment. These hydrolyses can be carried out either by the adsorption of a vapor of the metal alkoxide onto the nanoparticle and/or nanoporous support followed by the introduction of water vapor or liquid, or through hydrolysis of a solution of the alkoxide in the presence of a dispersion of the nanoparticles of the substrate material.

In the case of chemical vapor deposition of the metal-oxo domains on the nanoparticle and/or nanoporous supports, the materials constituting the support are agitated during the adsorption and decomposition of the volatile precursor to the metal-oxo domains. For example, gaseous metal alkyls such as trimethyl aluminum can be adsorbed onto the substrate nanoparticles and oxidized to form nano-domains of aluminum oxide, oxy-hydroxide or hydroxide. In this case, the metal complexes used as precursors to the metal-oxo domain materials must have sufficient volatility to allow introduction of these materials via the gas phase. Thus, in general these precursors include volatile metal oxide precursors such as metal alkoxides, metal halides such as chlorides, and organic complexes such as metal alkyls and acetylacetonates and the like.

Physical vapor methods can also be used to deposit the additional metal-oxo domains on the nanoparticles. These methods include sputtering, plasma arc methods, and vaporization methods.

The amount of modifying oxide that is required to exert a beneficial effect in the PROX behavior after deposition on a nanoparticulate titania depends on the nature of the oxide material and the method of deposition. The optimum amount of the modifying agent will naturally scale with the surface area of the nanoparticulate titania that is used. Too high a level of the modifying oxide(s) could unduly mask the beneficial effects of having small regions of exposed titania surface and could unduly cover the metal-oxo domain-titania interfaces. For example, in the case of a lower surface area nanoparticle titania, e.g., one exhibiting a surface area of about 55 $m^2/g$ or less as determined by standard BET measurements, the upper amount of modifying oxide should not exceed about 15 mole percent based on the total moles of the modifying material and the nanoparticles being modified. It is preferable that less than 10 mole percent be used as calculated based on the total moles of the nanoparticles being modified plus the modifying oxides. In the case of a higher surface area nanoparticle titania, e.g., one having a surface area of about 250 $m^2/g$, a higher amount of the modifying additive, above 15 mole percent and even up to 20 mole percent can be advantageously employed. In general the amount of metal in the modifying oxide material is greater than about 0.2 mole percent and less than about 10 mole percent based on the total moles of the titania plus modifying oxides. Higher percentages can be used, for example up to about 30 mole percent, but care must be exercised to achieve deposition of the modifying oxide without excessive loss of surface area after drying. Preferably the amount of modifying oxide material is between about 1 and 7 mole percent.

The resultant additional metal-oxo domains on the surface of the nanoparticulate titania are typically not crystalline. They have been observed to be amorphous to both x-rays when examined using x-ray powder diffraction and to electrons when observed via TEM.

After deposition of the modifying oxide material on the nanoparticulate titania, the treated particles are optionally dried to remove extraneous materials. In the case of deposition of the modifying oxide phase by hydrolysis techniques, the treated materials are also usually washed to remove the major portion of the byproducts of the hydrolysis reaction prior to drying. In general the drying of the modified nanoparticles can be accomplished by heating at 60° C. to 250° C. in either a static or a forced air furnace, a rotating oven or by spray-drying or any other suitable drying technique. During drying and/or the thermal treatment, the modified nanoparticles can be in the form of a static bed or filter cake, a loose powder or a fluidized or agitated bed.

In those embodiments in which the nanoparticles are modified to have a multi-domain character, thermal treatment may precede or follow the modification. Preferably, the thermal treatment is carried out after the modified nanoparticles are dried. In those instances in which the nanoparticles are further incorporated into and/or onto host material, the thermal treatment can occur before or after forming the guest/host structure.

Nanoparticles with a suitable compositionally multi-domain character are commercially available as well, and these may be thermally treated and used in the practice of the present invention. On example is the titania commercially available under the trade designation ST-31 from Ishihara Sangyo Kaisha Ltd., Osaka, Japan. These titania particles include zinc-oxo content proximal to their surfaces, and thermally treated embodiments of these particles provide excellent supports for PROX catalyst systems. The multi-domain particles also may be conveniently formed by depositing one or more additional kinds of metal-containing materials, e.g., metal-oxo materials, onto nanoparticles such as titania particles that may or may not be compositionally multi-domain as supplied.

It also has been found that the PROX capabilities of a nanoporous support after activation with nanogold tend to inversely correlate to the ability of the support to react with and bind with a peroxide such as hydrogen peroxide. For example, titania particles that tend to be more suitable for PROX work tend to react with and bind hydrogen peroxide to a lesser degree than titania particles that are more reactive with hydrogen peroxide. Hydrogen peroxide is known to react with a certain type of site that can be present on titania surfaces in a very specific manner to produce a yellow-colored surface complex that is characterized by UV-VIS diffuse reflectance absorptions at 400 nm and 455 nm (Dimitar Klissurski, Konstantin Hadjiivanov, Margarita Kantcheva, and Lalka Gyurova, *J. Chem. Soc. Faraday Trans.*, 1990, 86(2), 385-388). In addition, the amount of bound hydrogen peroxide can be quantitatively measured by reaction with potassium permanganate using the method of Klissurski et at (*J. Chem. Soc. Faraday Trans.*, 1990, 86(2), 385-388). Thus, the peroxide-bonding sites on the precursor titania can be determined qualitatively and/or quantitatively by measuring the intensity of the yellow color formed upon reaction with hydrogen peroxide.

Thus, titania that turns a relatively stronger yellow color (i.e., is more reactive with hydrogen peroxide) after activation with nanogold tends to oxidize both carbon monoxide and hydrogen with less selectivity than a titania that turns a more pale yellow, or does not change color, when reacted with hydrogen peroxide. Accordingly, one useful way to assess the suitability of a titania material for use as a gold support for PROX work involves utilizing hydrogen peroxide as a surface probe by determining the degree to which the titania particles react and bind hydrogen peroxide. For PROX applications, it is preferable that the titania of the present invention show as little reaction with hydrogen peroxide as possible.

To assess the degree of the reaction of the nanoparticulate titania with hydrogen peroxide, the nanoparticulate titania is reacted with a specified amount of hydrogen peroxide and the resulting materials are analyzed using colorimetric methods (vide infra). A screening test that works well involves a visual examination of the degree of yellow color introduced during the reaction with the hydrogen peroxide. A quantitative test involves analyzing the sample both before and after reaction with the hydrogen peroxide using a UV-VIS spectrometer in a diffuse reflectance mode. From these measurements a surface peroxide activity value is determined (method defined herein). It is desirable for the surface peroxide activity of the modified titania nanoparticles to be less than about 0.17, more preferably less than about 0.12 and most preferably less than 0.09.

To further validate the correlation between titania reactivity with hydrogen peroxide and PROX capabilities, we have observed that treatments (e.g., thermal treatment and/or incorporation of additional metal-oxo domains into the titania surfaces) that weaken the reaction of the titania surface with hydrogen peroxide also enhance the ability of the resulting gold-treated titanias to function as PROX catalysts. While not wishing to be bound by theory, it is likely that the sites that react very strongly with hydrogen peroxide are also sites that facilitate the low temperature oxidation of hydrogen. It is believed that the reaction of the titania nanoparticles with hydrogen peroxide results in a species that is similar to those formed by reaction of hydrogen peroxide with $Ti^{4+}$ complexes in solution—it consists of a titanium cation bound in bidentate fashion to both oxygens in the O—O portion of hydrogen peroxide. For this to be the case, this site must have two labile bonding sites on a single titanium surface cation. Thus, this is indicative of an amorphous or disordered titanium site or region. While the presence of these amorphous, hydrogen peroxide-reactive domains may improve the usefulness of gold on titania catalysts for other catalytic oxidations, for example the oxidation of CO in gases not containing hydrogen, the synthesis of hydrogen peroxide, the epoxidation of olefins and for other organic oxidations, they are detrimental when found on gold on titania catalysts for PROX applications. The titania treatments (thermal and/or chemical) that are described herein alter the nature of the surface of the nanoparticulate titania as evidenced by the diminishing of the strong interaction with hydrogen peroxide and enhanced PROX capability.

Surprisingly, the modifications of the nanoparticle titania as described herein do not adversely affect the size of the gold nanoparticles that are deposited thereon by the PVD method. For example, after PVD deposition of gold on nanoparticle titania (Hombikat UV100 available from Sachtleben Chemie GmbH, DE), under a specific set of conditions the nanogold particle size was determined to be 2.2 nm (standard deviation 0.82 nm, 375 nanogold particles measured). Treatment of the same titania that had been thermally modified by calcining at 450° C. in air with nanogold under the same PVD conditions produced a catalyst that had nanogold with an average size of 1.6 nm (standard deviation 0.95, average of 541 nanogold particles measured). Treatment of the same titania that had been thermally modified by calcining at 450° C. in nitrogen with nanogold under the same PVD conditions produced a catalyst that had nanogold with an average size of 1.8 nm (standard deviation 0.87, average of 162 nanogold particles measured).

After modification of the nanoparticulate support particles such as by chemical and/or thermal modification, catalytically active gold is deposited on the multi-domain, nanoporous nanoparticles. Optionally, as described further below, the nanoparticles may first be further incorporated into and/or onto a variety of host materials (described below) prior to gold deposition. The gold preferably is deposited on the nanoparticulate support materials of the present invention via physical vapor deposition methods. While active gold nanoparticles can be deposited via the more conventional solution hydrolysis routes or the chemical vapor methods, the physical vapor methods are less expensive and allow the deposition of gold without the inclusion of deleterious anions such as the halide ion. In addition, the physical vapor deposition methods enable the use of surface-modified nanoparticulate materials that cannot be coated without alteration using gold deposition from solution.

For example, nanoparticulate titania can be surface modified with an acid soluble surface species, e.g., a zinc-oxo species, and catalytically active nano-particulate gold can be deposited on this support using the physical vapor deposition method without introducing any degradation of the surface-modified, nanoparticulate titania. In the commonly-used solution routes, gold is introduced onto the support as an acidic solution comprising auric chloride. Such a solution not only washes away the zinc oxide from the nanoparticulate titania, but also introduces the undesirable chloride anion. In this fashion the solution route is limited in its application to certain aspects of the present invention.

Physical vapor deposition refers to the physical transfer of gold from a gold-containing source or target to the support. Physical vapor deposition may be viewed as involving atom-by-atom deposition although in actual practice, the gold may be transferred as extremely fine bodies constituting more than one atom per body. Once at the surface, the gold may interact with the surface physically, chemically, ionically, and/or otherwise. Using physical vapor deposition methodologies to deposit nanoscale gold on activating, nano-porous support media makes the synthesis of catalytically active gold dramatically easier and opens the door to significant improvements associated with developing, making, and using gold-based, catalytic systems.

The physical vapor deposition process is very clean in the sense that there are no impurities introduced into the system as in the case of the solution state processes. In particular, the process may be chloride-free and thus there is no need for washing steps to remove chloride or other undesirable ions, molecules or reaction by-products, as is the case in most solution state deposition processes.

By using this process, very low levels of catalytic metal are required for high activity. While most research in this area uses at least 1% by weight gold (based upon the total weight of the deposited gold plus the nanoparticles and host material, if any) to achieve activity, and often times much more than 1 weight % gold to achieve high activity, in this work we have achieved very high activity at 0.15% by weight gold or lower. This reduction in the amount of precious metal required for high activity provides a very substantial cost savings. Yet, other embodiments of the present invention, such as guest/host composite systems, provide high performance using higher levels of gold, e.g., 0.3% to 5% by weight gold.

This process results in a very uniform product with respect to precious metal concentration per particle and metal nanoparticle size and size distribution. TEM studies have shown that our process can deposit gold in a form including discrete nanoparticles and small clusters or in a more continuous thin film depending on what is desired. In general, it is desired to include gold in nanoparticle/small gold cluster form.

This catalyst preparation method can deposit catalytic metals uniformly on non-uniform or non-homogeneous surfaces. This is not true for the solution state deposition processes that tend to favor deposition on surfaces having a charge opposite to the depositing metal ion, leaving other surfaces uncoated or at best weakly coated.

In addition to gold, the PVD process can be used to deposit other metals simultaneously or sequentially or to deposit mixtures of metals by using poly-phasic targets so that catalyst particles can be formed that comprise polyphasic nanoparticles, e.g., nanoparticles comprising atomic mixtures of say $M_1$ and $M_2$ (where $M_1$ and $M_2$ represent different metals), or that have combinations of metal nanoparticles for multi-function catalysts, e.g., nanoparticle mixtures comprising mixtures of discrete $M_1$ particles and discrete $M_2$ particles. In this fashion, catalyst particles can be prepared that can catalyze more than one reaction and these functions can be carried out simultaneously in practice. Thus, for instance, a catalyst particle can be prepared that will oxidize CO while at the same time oxidize $SO_2$ efficiently.

The PVD approach allows catalytically active gold to be easily deposited onto supports containing carbon as well as onto other oxidatively sensitive substrates. In the processes known in the art that require a heating step to affix and activate the catalyst particles, carbon in the presence of an oxidizing environment cannot adequately withstand the elevated temperatures that are often used. Thus, the carbon particles have to be treated in a reducing atmosphere since they would be attacked by oxygen during this heating step. Such a reducing step may undesirably reduce other catalyst constituents (e.g., as in the case of iron oxide supported on carbon or in porous carbon). In the instant invention, carbon particles and other non-oxide particles can be coated with catalyst nanoparticles and no heating step or post reduction is required. In this manner, high surface area carbon can be rendered catalytic for CO oxidation without losing the adsorptive properties of the porous carbon for the removal of other impurities from a gas stream.

The PVD approach can be used to coat very fine particles with catalyst wherein the fine particles are already coated on a larger host material. Alternatively, the PVD approach can be used to coat catalyst onto very fine particles before the fine particles are coated onto a second granular phase or other host or are thereafter formed into a porous granule. With either approach, the resultant composite provides high CO oxidation activity with low back pressure during use.

Physical vapor deposition preferably occurs under temperature and vacuum conditions in which the gold is very mobile. Consequently, the gold will tend to migrate on the surface of the substrate until immobilized in some fashion, e.g., by adhering to a site on or very near the support surface. It is believed that sites of adhering can include defects such as surface vacancies, structural discontinuities such as steps and dislocations, interfacial boundaries between phases or crystals or other gold species such as small gold clusters. It is a distinct advantage of the invention that the deposited gold is immobilized effectively in a manner in which the gold retains a high level of catalytic activity. This is contrasted to those conventional methodologies in which the gold accumulates into such large bodies that catalytic activity is unduly compromised or even lost.

There are different approaches for carrying out physical vapor deposition. Representative approaches include sputter deposition, evaporation, and cathodic arc deposition. Any of these or other PVD approaches may be used, although the nature of the PVD technique used can impact catalytic activity. For instance, the energy of the physical vapor deposition technique used can impact the mobility, and hence tendency to accumulate, of the deposited gold. Higher energy tends to correspond to an increased tendency of the gold to accumulate. Increased accumulation, in turn, tends to reduce catalytic activity. Generally, the energy of the depositing species is lowest for evaporation, higher for sputter deposition (which may include some ion content in which a small fraction of the impinging metal species are ionized), and highest for cathodic arc (which may be several tens of percents of ion content). Accordingly, if a particular PVD technique yields deposited gold that is more mobile than might be desired, it may be useful to use a PVD technique of lesser energy instead.

Physical vapor deposition generally is a line of sight surface coating technique between the gold source and the support. This means that only the exposed, outer surfaces of the support, but not the inner pores well within the substrate, are directly coated Inner surfaces not in a direct line of sight with the source will tend not to be directly coated with gold. However, we have found by TEM analysis that after deposition on the surface of a porous substrate, the gold atoms can migrate by diffusion or other mechanism some moderate distance into the catalyst surface to provide nanoparticles and gold clusters in the substrate pores in the region immediately adjacent to the surface before being immobilized. The average penetration into the porous substrates can be up to 50 nanometers in depth or sometimes greater, such as up to about 70 to about 90 nm in depth. In general though, the penetration depth is less than 50 nm and can be less than 15 nm. The gold penetration is very shallow compared to the typical support size.

The total thickness of the gold, or $C_t$, is equal to the gold penetration depth plus the thickness of the gold that is deposited on the surface of the substrate and that has not penetrated by diffusion. This total thickness is in general less than 50 nm and can often be less than 30 nm or even less than 10 nm. On materials having surface pores whose depth is greater than about 10 nm to 20 nm, the total gold thickness can appear to be greater than 50 nm since the gold layer follows the contours of the surface and the actual surface contour is reflected by the pore structure that it possesses. It is most preferred that the active gold species be collected on the outermost portion of the catalyst particle since this is the surface of the catalyst that interacts most readily with gaseous reactants.

The thickness of the gold shell region relative to the catalyst support particle size is quantified by the formula $$PDR = C_t/UST$$

wherein PDR is the penetration depth ratio, UST is the underlying support thickness or particle size and $C_t$ is the total thickness of the gold, as defined above. The underlying support thickness represents the size of the support as measured perpendicular to the catalyst surface and is usually indicative of particle size. The underlying support thickness may be determined by microscopic methods including optical microscopy or scanning electron microscopy. The value for $C_t$ may be determined by transmission electron microscopy in the case of thin films and high resolution scanning electron microscopy in the case of thicker films. The total thickness $C_t$ is very easily discerned from visual inspection of TEM data. In practice, a sample may be effectively characterized via examination of a number of TEM pictures of catalyst surface cross-sections (vida infra). In preferred embodiments, PDR is in the range of from about $1 \times 10^{-9}$ to 0.1, preferably $1 \times 10^{-6}$ to $1 \times 10^{-4}$, indicating that the gold shell region is very thin indeed relative to total support thickness. As noted above, this generally corresponds to a penetration depth on the order of up to about 50 nm, preferably about 30 nm on preferred supports.

Characterization of the surface region and the gold bodies is accomplished using transmission electron microscopy as is well-known in the catalyst art. One method suitable for characterizing the catalytic surfaces for fine particles supported on granules or for larger porous particles is as follows: the catalyst particles are embedded in 3M Scotchcast™ Electrical Resin #5 (epoxy; 3M Company, St. Paul, Minn.) in disposable embedding capsules; resin is allowed to cure at room temperature for 24 hours.

For each sample, a random, embedded granule is trimmed (with a stainless steel razor blade previously cleaned with isopropyl alcohol) down to the middle surface region of the granule such that most of the granule is cut away on one side, leaving epoxy on the other side. A small trapezoid-shaped face (less than a half millimeter on a side) is selected and trimmed such that the epoxy/granule interface is left intact. The long direction of this interface is also the cutting direction. A Leica Ultracut UCT microtome (Leica Microsystems Inc., Bannockburn, Ill.) is used to cross-section the face. The face is first aligned such that the granule surface is perpendicular to the knife edge. Sections approximately 70 nm thick are cut at a speed of 0.08 mm/second. These sections are separated by floating onto deionized water and collected using a microtomy hair tool and picked up using a "Perfect Loop" (loop distributed by Electron Microscopy Sciences, Fort Washington, Pa.). Samples are transferred via this loop to a 3 mm diameter, 300 mesh copper TEM grid with carbon/formvar lacey substrate. The regions of interest (intact, cleanly cut specimens showing the interfacial region) that lie over the holes in the substrate are imaged and analyzed.

Images are taken at various magnifications (50,000× and 100,000×) in a Hitachi H-9000 transmission electron microscope (TEM; Hitachi High Technologies America, Pleasanton, Calif.) at 300 KV accelerating voltage using a Gatan CCD camera (Gatan Inc., Warrenton, Pa.) and Digital Micrograph software. Representative regions (regions selected wherein the interface of the catalytic surface is clearly examined in a fashion perpendicular to the surface of the sample) are imaged. Calibrated markers and sample identifications are placed on each image. Numerous (>10) interfacial regions are examined.

As a consequence of line of sight coating, the resultant catalytically active material of the invention from one perspective may be viewed as nanoporous catalytic supports having relatively thin shells of discontinuous, catalytic gold on and proximal to their outer surfaces. That is, a resultant catalytically active material comprises a gold-rich shell region proximal to the surface and an interior region comprising negligible gold. In preferred embodiments, this gold-rich shell region comprises small (generally less than 10 nm, most preferably less than 5 nm), discrete gold bodies.

The inventive approach of forming a catalytically active shell region only on the surface of a nanoporous support is contrary to conventional wisdom when developing new catalytic material, and, therefore, the fact that the resultant material is so catalytically active is quite surprising. Specifically, the present invention puts catalytic functionality only near the surface of a highly porous support. Interior porosity is purposely unused. From a conventional perspective, it seems pointless to underutilize a nanoporous support in this manner. Knowing that catalytically active metal is to be deposited only at the support surface, the conventional bias might have been to use a nonporous substrate when depositing catalytically active gold onto a support. This is especially the case when PVD is not able to access the interior of the porous support in any event. The present invention overcomes this bias through the combined appreciation that (1) gold mobility is highly restricted on the surface of nanoporous supports, and (2) gold is still catalytically active even at very low weight loadings resulting from the surface coating approach.

Consequently, using such supports is highly and uniquely beneficial in the context of depositing gold onto the surface region of a nanoporous support even though full catalytic capacity of the support is not utilized. For this reason, catalytically active gold is readily formed on composite supports (described further below) in which nanoporous "guest" particles are deposited onto "host" material, which itself may or may not be nanoporous.

Generally, physical vapor deposition preferably is performed while the support to be treated is being well-mixed (e.g., tumbled, fluidized, or the like) to help ensure that particle surfaces are adequately treated. Methods of tumbling particles for deposition by PVD are summarized in U.S. Pat. No. 4,618,525. For methods specifically directed at catalysts see Wise: "High Dispersion Platinum Catalyst by RF Sputtering," *Journal of Catalysis*, Vol. 83, pages 477-479 (1983) and Cairns et al. U.S. Pat. No. 4,046,712.

Physical vapor deposition may be carried out at any desired temperature(s) over a very wide range. However, the deposited gold may be more catalytically active if the gold is deposited at relatively low temperatures, e.g., at a temperature below about 150° C., preferably below about 50° C., more preferably at ambient temperature (e.g., about 20° C. to about 27° C.) or less. Operating under ambient conditions is preferred as being effective and economical since no heating or chilling requirements are involved during the deposition.

While not wishing to be bound by theory, it is believed that the deposition at lower temperatures yields more catalytically active gold for at least two reasons. First, lower temperatures yield gold with more defects in terms of geometrical size and/or shape (angularities, kinks, steps, etc.). Such defects are believed to play a role in many catalytic processes (see Z. P. Liu and P. Hu, *J. Am. Chem. Soc.*, 2003, 125, 1958). On the other hand, deposition at higher temperatures tends to yield gold that has a more organized and defect-free crystal structure and hence is less active. Additionally, deposition temperature can also impact gold mobility. Gold tends to be more mobile at higher temperatures and hence more likely to accumulate and lose catalytic activity.

The present invention provides catalytically active gold on the desired support(s) to form heterogeneous catalytic systems of the present invention. Gold is widely known as a noble, relatively inert metal with a yellowish color. However, the characteristics of gold change dramatically in nanoscale regimes, where gold becomes highly catalytically active. The high reactivity of gold catalysts in comparison with other metal catalysts is illustrated by reactions such as oxidation of CO under ambient conditions and reduction of NO, as well as epoxidation and hydrochlorination of unsaturated hydrocarbons.

In preferred embodiments, catalytically active gold may be identified by one or more requisite characteristics including size, color, and/or electrical characteristics. Generally, if a gold sample has one or more of these requisite characteristics, and preferably two or more of these characteristics, it will be deemed to be catalytically active in the practice of the present invention. Nanoscale size is a key requisite associated with catalytically active gold in that the catalytic activity of gold to a large degree is a function of whether the gold sample has a thickness dimension in the nanoscale regime (e.g., particle diameter, fiber diameter, film thickness, or the like). Bodies (also referred to as clusters in the literature) having smaller dimensions tend to be more catalytically active. As size increases, catalytic characteristics fall off rapidly. Accordingly, preferred embodiments of catalytically active gold may have a nanoscale size over a wide range, with smaller sizes more preferred when higher activity is desired. As general guidelines, catalytically active gold has particle or cluster dimensions in the range of from about 0.5 nm to about 50 nm, preferably about 1 nm to about 10 nm. Preferably, the gold has a size of no more than about 2 nm to about 5 nm in any dimension.

The technical literature reports that catalytic activity may be a maximum at sizes in the range of from about 2 nm to about 3 nm. The size of the individual gold nanoparticles can be determined by TEM analysis as is well known in the art and as is described herein.

In terms of color, gold in larger scale size regimes has a yellowish color. However, in the nanoscale size regimes in which gold is catalytically active, the color of gold becomes a reddish pink and then purplish-blue when viewed under white light with the unaided eye, although very small clusters of gold and gold surface species can be colorless. Such colorless species can be quite catalytic, and the presence of such colorless species is usually accompanied by some colored nanoparticles of gold. Consequently, determining if the color of a gold sample includes a noticeable reddish pink to purplish-blue component and/or is colorless indicates that it is possible that the sample is catalytically active.

The catalysts incorporating generally white-colored titania nanoparticles after gold deposition are desirably of a blue hue. Of course, in the case of catalyst supports that are colored by virtue of the modifying metal-oxo domains, the resulting color is a combination of the blue color of the nanogold with the color of the underlying substrate. In our experience, the blue nanogold catalysts comprising titania are much more active than the pinker or redder analogs.

The amount of catalytically active gold provided on a support can vary over a wide range. However, from a practical perspective, it is helpful to consider and balance a number of factors when choosing a desired weight loading. For instance, catalytically active gold is highly active when provided on nanoporous supports in accordance with the practice of the present invention. Thus, only very low weight loadings are needed to achieve good catalytic performance. This is fortunate, because gold is expensive. For economic reasons, therefore, it would be desirable not to use more gold than is reasonably needed to achieve the desired degree of catalytic activity. Additionally, because nanoscale gold is highly mobile when deposited using PVD, catalytic activity may be compromised if too much gold is used due to accumulation of the gold into large bodies. With such factors in mind, and as general guidelines, the weight loading of gold on the support preferably is in the range of 0.005 to 5 weight %, preferably 0.005 to 2 weight %, and most preferably from 0.005 to 1.5 weight % based upon the total weight of the support and the gold. When the support is a composite of 2 or more constituents, e.g., a composite formed by providing a plurality of one or more kinds of guest particles on one or more kinds of host particles, the total weight of the support refers to the total weight of the resultant composite.

Depositing catalytically active gold onto a support is very compatible with PVD techniques. Gold naturally sputters to form catalytically active, nanoscale particles and clusters onto the nanoporous support surface. It is believed that the gold is deposited mainly in elemental form, although other oxidation states may be present. Although gold is mobile and will tend to accumulate on sites on the surface which produce an overall lowering of the energy of the system, the nanoporous characteristics of the support and the preferred use of inclusion of metal-oxo boundaries in the practice of the present invention help to immobilize the gold, helping to keep the deposited gold clusters isolated and preferably discontinuous. This helps to preserve catalytic activity that might be otherwise compromised if the gold were to accumulate into larger sized bodies. As an alternative, very thin, gold films of nanoscale thickness may also be formed over some or all of the support surface if desired, keeping in mind that catalytic activity decreases with increasing film thickness. Even though such films may be formed with catalytic activity, discontinuous, isolated gold clusters tend to be much more catalytically active and are preferred in most applications.

It is also believed that low-coordination gold in catalytic nanoparticles is beneficial. Low coordination gold refers to $Au_n$ for which n on average is in the range of 1 to 100, preferably about 2 to 20. Without wishing to be bound by theory, we propose that the catalytic activity of very small clusters of gold is associated at least to some degree with low-coordination defects, and that these defects are able to provide sites for storing charges which may be transferred from underlying supports and/or other sources. Accordingly, with such defects and mechanism in mind, it is preferred that heterogeneous catalysts of the invention include one or more of the following features: (a) the gold and hence the defects are located mainly on the surface of the underlying support; (b) the average value for n is greater than about 2; and (c) as much as is practically possible, gold clusters are isolated but nonetheless close to each other (within a distance of about 1 nm to about 2 nm or less). While such features may be associated with smaller sized gold clusters, it is possible that such characteristics may be found mainly at steps or edges of larger clusters.

In addition to gold, one or more other catalysts could also be provided on the same supports and/or on other supports intermixed with the gold-containing supports. Examples include one or more of silver, palladium, platinum, rhodium, ruthenium, osmium, copper, iridium, or the like. If used, these may be co-deposited onto the support from a target source that is the same or different than the gold source target. Alternatively, such catalysts may be provided on the support either before or after the gold. Other catalysts requiring a thermal treatment for activation advantageously may be applied onto the support and heat treated before the gold is deposited. In certain cases catalysts such as Rh, Pd and Pt can be deposited according to the present invention and utilized as catalysts without the presence of gold.

Optionally, the heterogeneous catalyst system may be thermally treated after gold deposition if desired. Some conventional methods may require such thermal treatment in order to render the gold catalytically active. However, gold deposited in accordance with the present invention is highly active as deposited without any need for a thermal treatment. Indeed, such gold can very effectively catalytically oxidize CO to form $CO_2$ at room temperature or even much lower temperatures. Additionally, depending upon factors such as the nature of the support, the activating agents, the amount of gold, or the like, catalytic activity can be compromised to some degree if thermally treated at too high a temperature. Yet, carrying out a thermal treatment after gold deposition remains an option. For instance, for some modes of practice in which the heterogeneous catalyst system is intended to be used in a heated environment, e.g., an environment having a temperature higher than about 200° C., the catalytic activity of the system should be confirmed at those temperatures.

The resultant thermally treated, optionally multi-domain, nanoporous, catalytically active catalyst of the present invention is advantageously used in connection with CO sensitive devices, e.g., fuel cell power systems, to purify CO-contaminated hydrogen feedstock via catalytic oxidation of CO to $CO_2$. The catalyst may be integrated into such systems in a variety of different ways. As options, the multi-domain, nanoporous, catalytically active composite catalyst may be incorporated as a so-called "guest" material on and/or in a larger "host" medium. The catalytically active gold of the catalyst can be deposited onto the guest material before or after the guest/host structure is formed. In these guest/host structures the guest material may be present in the form of nanoporous aggregates of nanoparticles. These may be aggregated to some degree.

This guest/host composite structure provides high total exterior surface area while retaining the desirable low pressure drop of structures having larger interparticle spacings. In addition, by using nanoporous, smaller particles in constructing these guest/host structures, inexpensive, non-nanoporous, coarser media can be used. Thus, very inexpensive, highly active catalyst particles can be prepared since the bulk of the volume of a catalyst bed is taken up by the inexpensive, underlying, media.

A wide range of materials and structures may be used as host media to support the guest particles. Examples of host structures include powders, particles, pellets, granules, extrudates, fibers, shells, honeycombs, plates, membranes, or the like. Because the guest/host structure incorporates the nanoporous guest material, the host material need not be, but can be if desired, nanoporous.

One preferred embodiment of host support media comprises one or more kinds of particles. The host particles can be regular in shape, irregular, dendritic, dendrite-free, or the like. The host particles generally are relatively large compared to the finer guest particles and typically independently may have a median particle size in the range of from 3 micrometers to about 2000 micrometers, more preferably in the range of about 5 micrometers to about 1000 micrometers. However, larger host particles may be used in some applications. Within such ranges, it is also desirable that the relative sizes of the host and guest particles are suitable for forming an ordered mixture. Thus, it is preferred that the ratio of the volume average particle size of the host particles to the guest particles is greater than about 3:1, more preferably greater than about 10:1, and more preferably greater than about 20:1.

In some modes of practice, the particle size of host particles conveniently may be expressed in terms of a mesh size. A typical expression for mesh size is given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Support particles characterized by a mesh size of 12×30 would include a population of particles having a diameter in the range from about 0.5 mm to about 1.5 mm.

Selecting an appropriate mesh size for the substrate particles involves balancing catalytic rate against air flow resistance. Generally, a finer mesh size (i.e., smaller particles) tends to provide not only greater catalytic rate, but also higher air flow resistance. Balancing these concerns, "a" is typically in the range of 8 to 12 and "b" is typically 20 to about 40 with the proviso that the difference between a and b is generally in the range from about 8 to about 30. Specific mesh sizes that would be suitable in the practice of the present invention include 12×20, 12×30, and 12×40. Particles as small as 40×140 or 80×325 mesh or even smaller particles may be used in fibrous structures where the particles are held within the structure by entanglement with the fibers or by other means.

A wide variety of materials may serve as suitable host particles in the practice of the present invention. Representative examples include carbonaceous materials, polymer materials, wood, paper, cotton, quartz, silica, molecular sieves, xerogels, metals, metal alloys, intermetallic metal compositions, amorphous metals, metal compounds such as metal oxides, nitrides or sulfides, combinations of these, and the like. Representative metal oxides (or sulfides) include oxides (or sulfides) of one or more of magnesium, aluminum, titanium, vanadium, chromium, manganese, cobalt, nickel, copper, zinc, gallium, germanium, strontium, yttrium, zirconium, niobium, molybdenum, technetium, ruthenium, rhodium, palladium, silver, cadmium, indium, iron, tin, antimony, barium, lanthanum, hafnium, thallium, tungsten, rhenium, osmium, iridium, platinum, titania-alumina, binary oxides such as hopcalite ($CuMn_2O_4$), combinations of these, and the like.

Examples of carbonaceous substances include activated carbon and graphite. Suitable activated carbon particles may be derived from a wide variety of source(s) including coal, coconut, peat, any activated carbon(s) from any source(s), combinations of at least two of these, and/or the like. A preferred embodiment of carbonaceous host particles includes an activated carbon commercially available under the trade designation "Kuraray GG" from Kuraray Chemical Co., Ltd. (Japan). This carbon is predominately microporous but also contains mesopores and macropores ("feeder pores") necessary for fast mass transfer throughout the carbon particle. It contains potassium carbonate but is low in halide content. The material is derived from coconuts.

A variety of methods generally may be used to construct guest/host structures from guest and host particles. In one method, nanoporous guest particles are admixed with one or more adhesion agents in solution and then this mixture is combined with coarser host particles. If the coarser particle is porous, the small particle-adhesion agent solution mixture can be introduced by incipient wetting of the porous larger particle. If the larger particle is not porous, the small particle-adhesion agent solution mixture can be admixed with the coarser particles and the solution liquid can be removed either concurrently with the mixing or subsequently to the mixing. In either case, after combining the nanoporous, small particle size material, the adhesion agent and the coarser particles and removing the liquid from the solution, the mixture is dried and optionally calcined or otherwise heat treated to provide a composite particle having the smaller, nanoporous particles adhered on the surface of a coarser particle.

The calcining temperature is selected to be below the temperature at which the nanoporous particles lose porosity. Generally the calcining temperature will be in the range of about 200° C. to about 800° C. In general, a low temperature is preferred. The sample is heated sufficiently to generate a bond between the adhesion agent and the particles but not high enough to significantly alter the nanoporous nature of the coating.

The adhesion agent generally is included at an amount of 0.1 to about 50 parts by weight based upon 100 parts by weight of the guest material. Examples of adhesion agents include basic metal salts, partially hydrolyzed metal complexes such as partially hydrolyzed alkoxides, hydrous metal-oxo-hydroxide nanoparticles, and other metal salts. Samples containing carbon, though, generally are heated at more moderate temperatures, e.g., 120° C. to 140° C. As another construction method for making composite support media, guest particles can be adhered to the host particles using partially hydrolyzed alkoxide solutions, basic metal salt solutions, or nanoparticle sized colloidal metal oxides and oxy-hydroxides as an adhesion agent. Partially hydrolyzed alkoxide solutions are prepared as is well known in the sol-gel art. Useful metal alkoxides include alkoxides of titanium, aluminum, silicon, tin, vanadium and admixtures of these alkoxides. Basic metal salts include nitrate and carboxylate salts of titanium and aluminum. Nanoparticle size colloidal materials include colloids of oxides and oxy-hydroxides of aluminum, titanium and oxides of silicon, tin, and vanadium.

As an alternative construction method, guest-host composites can be prepared by physically mixing guest and host materials. This can occur by techniques involving mechanical and/or electrostatic mixing. As a consequence of this mixing, the guest and host components tend to become associated into desired ordered mixtures in which guest material substantially uniformly coats or is otherwise associated with the surfaces of the host material. Optionally, one or more liquid ingredients may be included in the ingredients used to make an ordered mixture, although dry blending with little or no solvent can provide suitable composites. Although not wishing to be bound, it is believed that the guest material may physically, chemically, and/or electrostatically interact with the host material to form the ordered mixture. Ordered mixtures and methods of making such mixtures have been described in Pfeffer et al., "Synthesis of engineered Particulates with Tailored Properties Using Dry Particle Coating", *Powder Technology* 117 (2001) 40-67; and Hersey, "Ordered Mixing: A New Concept in Powder Mixing Practice", *Powder Technology*, 11 (1975) 41-44, each of which is incorporated herein by reference.

In other representative embodiments, multi-domain, nanosized composite catalyst particles and particle agglomerates containing catalytically active gold are coated onto at least a portion of the surfaces of filtration media arrays such as those described in U.S. Pat. No. 6,752,889 (the entirety of which is incorporated herein by reference) or as commercially available under the trade designation 3M High Air Flow (HAF) filters from 3M Company, St. Paul, Minn. These media generally include a plurality of open pathways, or flow channels, extending from one side of the media to the other. Even though the composite catalyst particles might only coat the surfaces of these channels, leaving large open volumes through the channels for air streams to pass, it has been found that substantially all CO in air streams passing through the media nonetheless is catalytically oxidized with virtually no pressure drop.

Still another illustrative manner of packaging the composite, multi-domain, nanoporous, catalytically active composite catalyst involves integrating the catalyst into a filled membrane structure. Catalyst filled membranes have been described in the art, such as in U.S. Pat. Nos. 4,810,381 and 5,470,532. However, integration of such filled membranes into a PROX system using the composite, multi-domain, nanoporous, catalytically active composite catalyst of the present invention would be particularly advantageous because these materials can be made in a form that is both extremely active while exhibiting only low back pressure.

Catalyst systems comprising nanogold on modified titania as described herein function as excellent PROX catalysts. Through application of these PROX catalysts, highly efficient fuel cells powered by reformate gases can be created. These catalysts remove CO from fuel feedstocks comprising hydrogen, carbon monoxide, $CO_2$ and $H_2O$ so that little loss of efficiency is observed when the fuel cell runs on a reformate gas as compared to running on a purified hydrogen gas mixture containing no carbon monoxide and having the same hydrogen content.

In these PROX applications the amount of oxygen can be varied so as to fit the needs of the particular device. The molar ratio of oxygen to CO can be stoichiometric, that is, 0.5:1 and can be higher, for example 1:1, 2:1 or even higher.

It may be desirable to control the temperature of the catalyst bed during use of the materials as PROX catalysts. Examples of such thermal maintenance devices include the following: air circulation fans wherein air is circulated around or over the catalyst container during use through application of a mechanical fan or through passive air flow; cooling fins and cooling structures such as heat sinks and heat drains attached to the catalyst container to remove excess heat generated during catalyst operation; dilution of the catalyst bed itself with inactive particles to lower the density of the heat generating sites in the catalyst bed; combination of the catalyst particles with high thermal conductivity structures such as metal fabrics, foils, fibers, foams and the like to provide enhanced thermal transport from the interior of the catalyst particle bed to the exterior of the catalyst bed. Such approaches enable the temperature of the catalyst bed to be maintained in the temperature zone of highest CO oxidation activity while also maintaining very high CO selectivity.

The present invention will now be further described in the context of the following illustrative examples.

Figure 1:
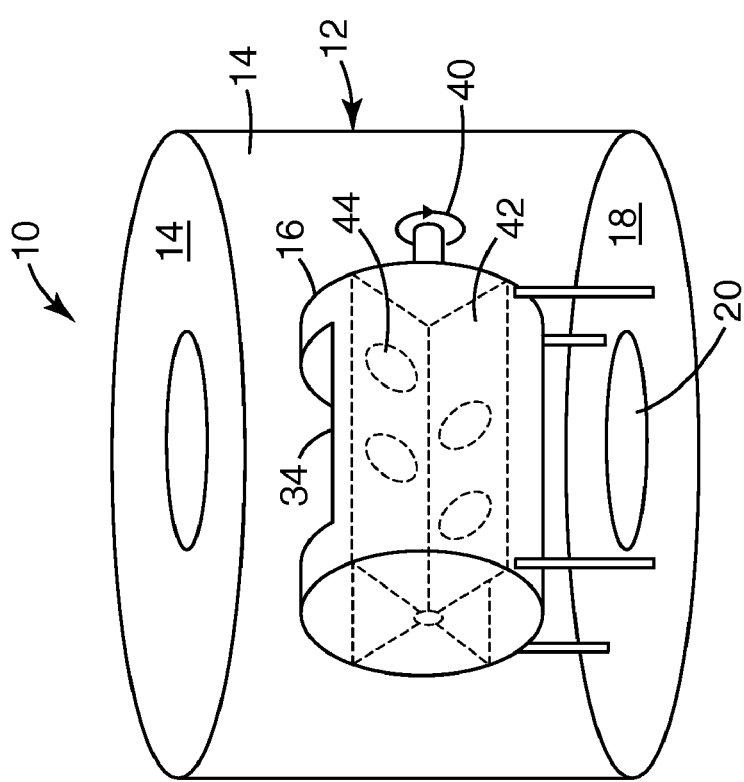
FIG. 1 is a schematic perspective view of an apparatus for carrying out a PVD process for depositing catalytically active gold onto a support.

Gold Application Method: Process for Deposition of Gold Nanoparticles onto Substrate Particles:

An apparatus 10 for depositing catalytically active gold using PVD techniques is shown in FIGS. 1 and 2. The apparatus 10 includes a housing 12 defining a vacuum chamber 14 containing a particle agitator 16. The housing 12, which may be made from an aluminum alloy if desired, is a vertically oriented hollow cylinder (45 cm high and 50 cm in diameter). The base 18 contains a port 20 for a high vacuum gate valve 22 followed by a six-inch diffusion pump 24 as well as a support 26 for the particle agitator 16. The chamber 14 is capable of being evacuated to background pressures in the range of $10^{-6}$ torr.

The top of the housing 12 includes a demountable, rubber L-gasket sealed plate 28 that is fitted with an external mount three-inch diameter dc magnetron sputter deposition source 30 (a US Gun II, US, INC., San Jose, Calif.). Into the source 30 is fastened a gold sputter target 32 (7.6 cm (3.0 inch) diameter×0.48 cm (3/16 inch) thick). The sputter source 30 is powered by an MDX-10 Magnetron Drive (Advanced Energy Industries, Inc, Fort Collins, Colo.) fitted with an arc suppressing Sparc-le 20 (Advanced Energy Industries, Inc, Fort Collins, Colo.).

The particle agitator 16 is a hollow cylinder (12 cm long× 9.5 cm diameter horizontal) with a rectangular opening 34 (6.5 cm×7.5 cm) in the top 36. The opening 34 is positioned 7 cm directly below the surface 36 of the gold sputter target 32 so that sputtered gold atoms can enter the agitator volume 38. The agitator 16 is fitted with a shaft 40 aligned with its axis. The shaft 40 has a rectangular cross section (1 cm×1 cm) to which are bolted four rectangular blades 42 which form an agitation mechanism or paddle wheel for the support particles being tumbled. The blades 42 each contain two holes 44 (2 cm diameter) to promote communication between the particle volumes contained in each of the four quadrants formed by the blades 42 and agitator cylinder 16. The dimensions of the blades 42 are selected to give side and end gap distances of either 2.7 mm or 1.7 mm with the agitator walls 48. Preferred modes of use of this apparatus are described below in the examples.

This apparatus is used as follows to prepare catalytic materials according to the following procedure, unless expressly noted otherwise. 300 cc of substrate particles are first heated to about 150° C. in air overnight to remove residual water. They are then placed into the particle agitator apparatus 10 while hot, and the chamber 14 is then evacuated. Once the chamber pressure is in the $10^{-5}$ ton range (base pressure), the argon sputtering gas is admitted to the chamber 14 at a pressure of about 10 millitorr. The gold deposition process is then started by applying a pre-set power to the cathode. The particle agitator shaft 40 is rotated at about 4 rpm during the gold deposition process. The power is stopped after the pre-set time. The chamber 14 is backfilled with air and the gold coated particles are removed from the apparatus 10. The gold sputter target 32 is weighed before and after coating to determine the amount of gold deposited. In general, about 20% of the weight loss of the target represents gold deposited on the sample.

During the deposition process the gap between the blades 42 and the chamber wall was set to a pre-set value of 2.7 mm. For sputter condition 1, the sputter power is 0.12 kW and the deposition time is 1 hour. For sputter condition 2, the sputter power is 0.24 kW and the deposition time is 1 hour.

Test Procedure 1: Test for CO Oxidation Activity

FIG. 4b of Assignee's co-pending application having U.S. Ser. No. 11/275,416, filed Dec. 30, 2005, in the names of John T. Brady et. al., titled HETEROGENEOUS, COMPOSITE, CARBONACEOUS CATALYST SYSTEM AND METHODS THAT USE CATALYTICALLY ACTIVE GOLD and shows a test system 250 used to quickly screen small quantities of new catalyst formulations for activity. The contents of this co-pending application are incorporated herein by reference for all purposes. The reference numerals used in the following procedure are the same reference numerals as used in FIG. 4b of the co-pending application. A 3600 ppm CO/air mixture flows into box 280 via line 285 typically at 64 L/min and >90% RH. 9.6 L/min of this flow is pulled through a tube 289 containing the catalyst sample 290 while the excess is vented outside the box 280 via a vent (not shown) on the side of the box 280.

A 5 mL sample of catalyst is prepared by loading it into a 10 mL graduated cylinder using the method described in ASTM D2854-96 Standard Method for Apparent Density of Activated Carbon. Using the same method, the catalyst sample 290 is loaded into tube 289 (a ⅝ inch ID (¾ inch OD) copper tube about 3.5 inches in length sealed at one end by a cotton plug (not shown).

The tube 289 containing the catalyst sample 290 is introduced up through the 29/42 inner fitting at the bottom of the polycarbonate box 287 so that the open end extends into the box. The other end of the tube is equipped with a ¾ inch Swagelok® nut and ferrule (not shown) for easy connection and disconnection to/from the test system 250. The nut engages a female fitting (not shown) in a ½ inch OD tube 295 connected via a branch 296 to a vacuum source (not shown) through a rotameter 293 and needle valve 294. The tube 295 also connects to the inlet of the diaphragm pump (not shown) via branch 297 which draws sample to the sampling valve of a gas chromatography instrument and CO detector used as CO detection system 284. The small flow to the gas chromatography instrument (approximately 50 mL/min) is negligible in comparison to the total flow through the catalyst bed. The rotameter 293 is calibrated by placing a Gilibrator soap bubble flow meter (not shown) at the entrance to the copper tube containing the catalyst.

To start the test, a steady 64 L/min flow of a 3600 ppm CO/air mixture at >90% RH is introduced into the polycarbonate box 280. The needle valve 294 is then adjusted to give a flow of 9.6 L/min through the catalyst sample 290. The CO concentration in the air exiting the catalyst sample 290 is analyzed by the CO detection system 284. The results are processed via computer 286. CO detector system 284 includes an SR18610C gas chromatograph (SRI Instruments, Torrance, Calif.) equipped with a 10 port gas sampling valve. A diaphragm pump (KNF Neuberger UNMP830 KNI) continuously draws approximately 50 mL/min of sample from the test outlet through the gas sampling valve of the GC. Periodically the valve injects a sample onto a 3 ft 13× molecular sieve column. The CO is separated from air and its concentration is measured by a methanizer/FID detector (minimum detectable CO concentration less than 1 ppm). The GC is calibrated using certified standard CO in air or nitrogen mixtures in the range from 100 to 5000 ppm CO (Quality Standards, Pasadena, Tex.). Each CO analysis takes about 3 minutes. After completion of the analysis, another sample is injected onto the column and the analysis repeated.

Test Procedure 2: Test for PROX Catalyst Evaluation

The purpose of this test is to quickly evaluate new catalysts for activity and selectivity in PROX. A stoichiometric excess of oxygen (humidified air at 60 mL/min; $\lambda=4$) is mixed with a humidified gas mixture of 300 mL/min CO in hydrogen and passed through the catalyst bed at room temperature. The relatively high $\lambda$ value of 4 was chosen to more clearly distinguish between highly selective PROX catalysts and less selective ones.

In carrying out the PROX reaction, the temperature of the catalyst bed increases proportionally to the amount of energy released during the oxidation reactions. If the oxidation reaction involves only the CO that is flowing through the catalyst bed, the temperature rise is equal to the temperature rise that would be expected for the heat of reaction for the complete oxidation of the CO. If, in the course of the PROX test, the catalyst begins to oxidize not only CO but also hydrogen, the temperature will rise proportionally to the amount of hydrogen that is oxidized. Thus, by measuring both the amount of carbon monoxide that is not oxidized in the PROX test and the temperature of the catalyst bed, the capability of the material as a PROX catalyst is determined. The catalyst that catalytically oxidizes the highest amount of CO while having the lowest temperature of the reaction tube is the superior PROX catalyst for use under these conditions.

The bed quickly heats up as CO is oxidized to $CO_2$ by the catalyst. The outside temperature of the test fixture is measured at a point corresponding to the top of the catalyst bed. The concentration of CO at the outlet of the catalyst bed is also measured. About 35 minutes after the start of the test, humidified $CO_2$ at 150 mL/min is added to the feed in order to evaluate the effect on CO conversion and selectivity.

A good PROX catalyst will exhibit close to 100% conversion of CO both before and after addition of $CO_2$ to the feed. As discussed above, CO concentrations greater than about 10 ppm can poison the anode catalyst of a PEFC.

The temperature attained by the catalyst bed is a measure of the selectivity of the catalyst. When this test was performed using the equivalent amount of pure CO (6 mL/min) in helium at a $\lambda$ value of 4 and a total flow of 360 mL/min, the steady-state temperature measured by the thermocouple reader was about 40° C. This temperature corresponds to complete oxidation of CO alone (no hydrogen). A temperature higher than about 40° C. indicates that the catalyst is also oxidizing $H_2$, i.e., selectivity is low.

Figure 3:
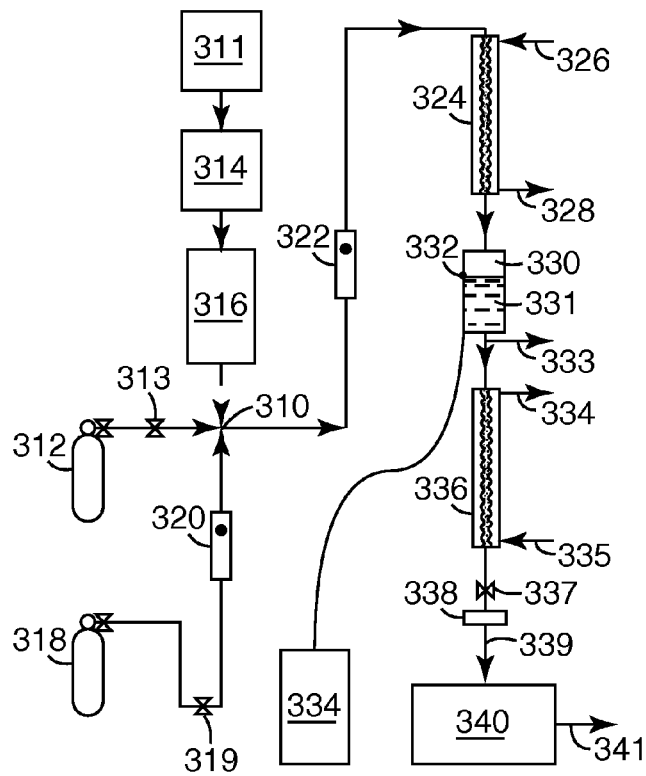
FIG. 3 schematically shows a test system used to test catalyst samples for PROX activity and selectivity.

FIG. 3 shows the test system used to test catalyst samples for PROX activity and selectivity. The gas mixture used in this test procedure is made by combining three different gas flows in a Swagelok® ⅛ inch stainless union cross fitting 310 (a Swagelok® ⅛ inch stainless union cross fitting, Swagelok Company, Solon, Ohio, part number SS-200-4). Each gas flow can be separately connected and disconnected from the fitting. Plugs are used to close off unused ports.

The three gases used to create the test mixture are as follows:

(1) A high pressure mixture of 2% (v/v) CO in hydrogen (Quality Standards, Pasadena, Tex.) stored in tank 312 equipped with a pressure regulator and fine needle valve 313 (Whitey SS-21RS2). (2) Building compressed air 311—the air is filtered and regulated by a 3M W-2806 compressed air filter regulator panel 314 and metered into the test system by a mass flow controller 316 (Sierra Instruments model 810C-DR-13, Monterey, Calif.). (3) A tank 318 of industrial grade $CO_2$ equipped with a pressure regulator and fine needle valve 319 (Whitey SS-21RS2, Swagelok Company, Solon, Ohio). The $CO_2$ flow passes through a rotameter 320 (Alphagaz 3502 flowtube, Air Liquide, Morrisville, Pa.) before entering the union cross fitting 310.

The above gases mix in the union cross fitting 310 and pass through rotameter 322 (Aalborg Instruments 112-02 flowtube, Orangeburg, N.Y.). This rotameter measures the total flow of the gas mixture used in the test procedure.

The gas mixture is then humidified to >90% RH at room temperature (~2.7% water vapor) by passing it through the inner tube of a tube in shell Nafion® humidifier 324 as shown (Perma Pure MH-050-12P-2, Toms River, N.J.). Liquid water is introduced to the humidifier through line 326 and exits via line 328.

The humidified gas mixture then passes into a 0.5 inch OD/0.42 inch ID stainless tube 330 about 3 inches in length that contains the catalyst sample 331 to be tested. The tube is equipped with Swagelok® reducing union compression fittings (½ inch to ¼ inch; not shown) for easy attachment to/removal from the test system. The catalyst is held in the tube on a layer of glass wool supported on the bottom reducing union fitting. A type K thermocouple 332 is attached to the outside of the tube with 3M type 5413 polyimide film tape (3M Company, St. Paul, Minn.) at the position corresponding to the top of the catalyst bed. The thermocouple is kept from direct contact with the metal surface of the tube by a layer of the tape. A thermocouple reader 334 (model HH509R, Omega Engineering, Stamford, Conn.) is used to read the temperature of the thermocouple junction.

After exiting the catalyst bed, most of the gas flow is vented into a fume hood through vent 333, but about 50 mL/min is dried by passing through a tube in shell Nafion® dryer 336 (Perma Pure MD-050-12P, Toms River, N.J.) and passed to a GC for measurement of CO concentration. The dryer removes the large quantities of water that result from $H_2$ oxidation by low selectivity PROX catalysts. This water would otherwise condense in the transfer lines and could enter the gas sampling valve of the GC. A stream of dry nitrogen flows through the dryer shell to carry away this water ($N_2$ inlet 335; $N_2$ outlet 334). A UNMP830 KNI diaphragm pump 338 (KNF Neuberger, Trenton, N.J.) is used to transfer the dried gas stream 339 to the GC gas sampling valve (not shown). The flow is regulated by a stainless steel metering valve 337 (part number SS-SS2, Swagelok Company, Solon, Ohio). The stream 339 passes through the gas sampling valve and exits the GC as stream 341.

The CO content of the gas stream is determined by gas chromatography using a SRI 8610C gas chromatograph 340 (SRI Instruments, Torrance, Calif.) equipped with a 10 port gas sampling valve and methanizer/hydrogen flame ionization and helium ionization (HID) detectors. Periodically the gas sampling valve injects a 0.5 mL sample from stream 339 onto a 5 ft×⅛ inch silica gel column at 125° C. This column is located in the main oven compartment of the GC. $CO_2$ and water vapor are held up on the silica gel column while the other components (CO, $O_2$, $N_2$, and $H_2$) pass through to a 3 ft×⅛ inch molecular sieve 5 A column at 125° C. located in the valve oven compartment of the GC. This column separates these components and the gas stream passes through to the methanizer/FID. Hydrogen is added to the gas stream before it enters the methanizer.

The 380° C. nickel catalyst in the methanizer converts CO to $CH_4$ which is detected by the FID. CO levels down to about 0.2-0.5 ppm can be measured. After the CO is eluted, the gas sampling valve switches (at 4 minutes into the run) and reverses the orientation of the two columns with respect to the detector (flow direction through the columns remains unchanged). Effluent from the silica gel column now passes directly into the detector. The temperature of the silica gel column is ramped to 215° C. until the $CO_2$ and water vapor elute. $CO_2$ is also converted into methane by the methanizer and detected by the FID. $CO_2$ levels in these experiments are so high that the detector electronics saturate before all of the $CO_2$ peak elutes. A single measurement requires 9.25 minutes. The gas sampling valve switches back and the process then repeats for the next sample. An additional 2 minutes is required to lower the main oven temperature back down to 125° C. in preparation for the next run.

The two column arrangement described above ensures that $CO_2$ never enters the molecular sieve column. This is necessary to prevent fast saturation of the column by the very high $CO_2$ concentrations in this test. Subsequent leakage of $CO_2$ out of the column into the methanizer would make low level CO measurements impossible.

The methanizer/flame ionization detector was used in this PROX test since it is selective to CO and $CO_2$, extremely sensitive (detection limits <1 ppm), stable, and exhibits a linear response from ~1 ppm to >7000 ppm CO (amplifier saturation). The GC is calibrated using CO in air or nitrogen mixtures in the range from 50 to 6500 ppm (Quality Standards, Pasadena, Tex.).

The mass flow controller for air 316, the $CO_2$ rotameter 320, and rotameter 322 for the CO/$H_2$ mixture were calibrated in lab ambient mL/min for each gas using a Gilibrator® bubble flow meter (Sensidyne, Clearwater, Fla.) (not shown) placed at the position of the catalyst bed. At this point, the gases contain about 2.7% (v/v) water vapor.

Catalyst samples are sieved to remove particles finer than 25 mesh using ASTM E11 U.S. Standard Sieves prior to testing. A 5 mL catalyst sample is measured out in a 10 mL graduated cylinder using the method described in ASTM D2854-96 Standard Method for Apparent Density of Activated Carbon. The 5 mL sample is then loaded into the ½ inch OD catalyst holder 330 using the same method. Catalyst mass is typically about 2 grams.

The catalyst holder 330 is mounted in the test system and $CO_2$ is passed through the test apparatus for about a minute. This prevents the formation of a possibly explosive mixture in the catalyst bed when the CO/$H_2$ flow is started. The temperature indicated by the thermocouple reader 334 rises several degrees during this procedure as the water vapor/$CO_2$ mixture is adsorbed on the dry activated carbon catalyst support.

300 mL/min of humidified 2% CO in $H_2$ is now passed through the catalyst bed. The $CO_2$ flow is disconnected from the union cross fitting 310 and the port is plugged. Humidified air at 60 mL/min is now added. The oxygen content of humid air is assumed to be 20.4%. The feed to the catalyst is 1.63% CO, 79.8% $H_2$, 3.32% $O_2$, 12.9% $N_2$, and 2.7% $H_2O$ at a flow rate of 360 mL/min. The ratio of $O_2$ to CO is 2 which corresponds to a λ value of 4.

After about 1 minute, the GC 340 is started and the first gas sample injected for analysis. The temperature displayed by the thermocouple reader 334 is recorded as is the CO concentration measured by the GC 340. This is repeated every 11.25 minutes as a new sample is injected for analysis.

After about 35 minutes, humidified $CO_2$ at 150 mL/min is added to the feed. The test is then continued for approximately another 30 minutes. This is done to observe the effect of $CO_2$ on the activity and selectivity of the catalyst. After addition of $CO_2$, the feed is 1.15% CO, 56.3% $H_2$, 2.35% $O_2$, 9.1% $N_2$, 28.7% $CO_2$, and 2.7% $H_2O$ at a flow rate of 510 mL/min. λ remains at 4.

Test Procedure 3: Test for $H_2$ Oxidation Activity

The purpose of this test is to evaluate catalysts for activity in hydrogen oxidation with no CO present. The effect of chemical modification of the titania surface on $H_2$ oxidation activity of a gold catalyst is of interest. It should be noted that the presence of CO may modify the activity of the catalyst towards hydrogen.

This test procedure uses the same basic test system shown in FIG. 3 with a few changes. The cylinder of 2% CO in hydrogen is replaced with a cylinder of ultrahigh purity hydrogen and an in-line Gilibrator® soap bubble flowmeter is used to measure $H_2$ flow instead of the rotameter 322 shown in FIG. 3. The GC detector is switched from the methanizer/FID to the HID and the temperature of the molecular sieve 5 A column lowered to 65° C.

The HID is a universal detector so it can detect $H_2$, $O_2$, $N_2$, and $H_2O$ as well as CO and $CO_2$. A large excess of hydrogen over oxygen is used in this test so the difference in $H_2$ concentration before and after the catalyst is small. It is more practical to measure the change in $O_2$ concentration and use % conversion of $O_2$ ($X_{O2}$) as a measure of the $H_2$ oxidation activity of the catalyst.

$$X_{O2} = \frac{[O_2]_{in} - [O_2]_{out}}{[O_2]_{in}} \times 100$$

The HID is calibrated for oxygen by mixing metered flows of air and hydrogen in the test system to give oxygen concentrations in the range 0.2 to 1.4% by volume. The oxygen content of humid air is assumed to be 20.4%.

Humidified hydrogen at 420 mL/min is mixed with humidified air at 30 mL/min and passed through the catalyst bed at room temperature. The composition of the feed is 91% $H_2$, 1.3% $O_2$, 5.2% $N_2$, and 2.7% $H_2O$ at 450 mL/min. $CO_2$ is passed through the system before starting the $H_2$ flow just as in test procedure 2.

After about 1 minute, the GC 340 is started and the first gas sample injected for analysis. The $O_2$ concentration measured by the GC 340 is recorded. This is repeated every 4.25 minutes as a new sample is injected for analysis.

Hydrogen Peroxide Color Test 1

This test is to estimate the extent of removal or inhibition of the peroxide-binding sites on a given type of nanoparticulate titania after modification using the processes of the present invention.

A 2.0 g sample of the un-modified, precursor nanoparticulate material and a 2.0 g sample of the modified nanoparticulate material are placed in separate 30 ml (interior volume) clear glass vials and 5.0 g of deionized water is added to each. A 1.0 ml sample of fresh 30% hydrogen peroxide (Mallinckrodt, Paris, Ky.) is added to each of the vials using a Pasteur pipette. The vials are loosely capped and mixed using a MaxiMix II mixer (Barnstead/Thermolyne Inc., Dubuque, Iowa). After allowing the particles to settle, the difference in the intensity of the yellow-orange color generated by the addition of the peroxide is estimated by visual, side by side comparison of the two treated materials. The rating is as follows: if the yellow/yellow-orange color of the particle sediments appears to be identical or close to identical, the color test is rated as "negative".

If the intensity of the yellow/yellow-orange color of the sediment of the un-modified particles appears somewhat stronger in intensity than that of the modified particles, the color test is rated as "positive." If the intensity of the yellow/yellow-orange color of the sediment of the un-modified particles appears much stronger in intensity than that of the modified particles, the color test is rated as "strongly positive."

While this test works best for non-colored samples, it can be used to advantage in colored samples if the color of the sample is not excessively intense. In this case an additional sample of the modified particles is prepared by dispersing 2.0 g of the modified sample in 6 g of water and, after settling this sample, is also compared with the modified sample that is reacted with hydrogen peroxide. By comparing in this manner, it can be determined visually the magnitude of the increase in intensity of the yellow component of the color as compared with the increase that is observed for the un-modified reference. If the color of the sample is so intense as to mask the change in the yellow-orange component of the color as a result of the peroxide reaction, then color test 2 should be used.

Certain metals such as iron and manganese that are useful in the present invention also are capable of catalyzing the decomposition of hydrogen peroxide. In general the decomposition of the peroxide as induced by the nanoparticulate catalyst supports of the present invention is not sufficiently energetic to disturb the examinations of the materials. Regardless, care should be exercised in using hydrogen peroxide in all examinations. Cerium containing domains are also capable of reacting with hydrogen peroxide to form an orange complex. While nanoparticle samples containing cerium that are not strongly colored can be examined using color test 1, color test 2 is necessary for an accurate estimate of the interaction of the hydrogen peroxide with the titania particles treated with cerium.

Hydrogen Peroxide Color Test 2

This test involves the spectroscopic comparison of a sample of the titania material to be examined with a sample of that same material that has been treated with hydrogen peroxide. The height of the absorbtance due to the formation of the hydrogen peroxide-surface complex calculated as shown below is defined as the surface peroxide activity value.

To prepare these samples, two separate 30 ml (interior volume) clear glass vials are charged with a 2.0 g sample of the material to be examined. To the vial containing the sample that is to be the control material, 6.0 g of deionized water is added. To the sample that is to be the peroxide-treated sample, 5.0 g of deionized water is added along with 1.0 ml of 30% hydrogen peroxide (Mallinckrodt, Paris, Ky.). The vials are loosely capped and mixed using a MaxiMix II mixer (Barnstead/Thermolyne Inc., Dubuque, Iowa). The samples are separated by filtration, washed with 5 ml of de-ionized water, air dried overnight at room temperature followed by drying at 80° C. for 5 minutes. After drying, the samples are examined using diffuse reflectance UV-VIS spectroscopy described as follows:

Total Luminous Reflectance (TLR) is measured at eight degrees incidence to the sample packed into a quartz powder cell using a Perkin Elmer Lambda 950 (#BV900ND0, Perkin Elmer Incorporated, Wellesley, Mass.) fitted with a 150 mm integrating sphere accessory (Perkin Elmer Inc.). This integrating sphere accessory complies with ASTM methods E903, D1003, E308, et al. as published in "ASTM Standards on Color and Appearance Measurement," Third Edition, ASTM, 1991. This instrument is fitted with a common beam depolarizer, which was turned on for these measurements. The conditions for data collection are as follows:

| Scan Speed: | 350 nm/min |
|---|---|
| UV-Vis Integration: | .24 s/pt |
| NIR Integration: | .24 s/pt |
| Data Interval: | 1 nm |
| Slit Width: | 5 nm |
| Mode: | % Reflectance |

Data is recorded from 830 nm to 250 nm.

To prepare the materials for analysis, the samples are loaded into the quartz cell to a semi-infinite depth—judged by eye. The average thickness is approximately 2.5 mm. The samples are held in place by a black Delrin™ plug (E.I. DuPont de Nemours and Co., Wilmington, Del.). The sample preparation for the control sample and the peroxide-treated sample are identical and the samples are packed into the cells identically.

Data is collected digitally for both the control nanoparticulate material and for the nanoparticulate material that had been reacted with the hydrogen peroxide. To determine the surface peroxide activity, the reflectance for the control sample, A (the nanoparticulate material prior to reaction with the peroxide) is divided into the reflectance for the matching peroxide-treated sample, B (material identical to the control sample with the exception that it had been reacted with hydrogen peroxide), and this ratio was converted to an absorbance-type value by taking the negative base ten logarithm.

Thus, for each pair of catalyst nano-particle samples (control sample and peroxide-treated sample) the absorptance calculation for the $i^{th}$ data point of the hydrogen peroxide-treated sample B is:

Absorptance for wavelength $i = -\log(B_i/A_i)$

This corresponds to the usual calculation of absorptance$=-\log(I_s/I_0)$ where $I_s$ is sample transmitted intensity and $I_0$ is the original incident light intensity. The resulting curve provides an absorptance-type spectra for all wavelengths i.

From these results the surface peroxide activity is defined as the height of the maximum of the absorptance-type curve in the 390-410 nm region generated as described above. As reference points for commercial titanias, Hombikat UV100 (Sachtleben Chemie GmbH, Duisburg, Germany) exhibits a surface peroxide activity of 0.1883 and Nanoactive Titania (Nanoscale Materials Inc., Manhattan, Kans.) exhibits a surface peroxide activity of 0.3905. The modifying methods described herein lower the surface peroxide activity of the nanoparticle titanias. It is desirable for the surface peroxide activity of the modified titania nanoparticles to be less than 0.17, more preferably less than 0.12 and most preferably less than 0.09.

Comparative Example 1

Untreated Nanoparticulate Titania

An 18" RCD Rotocone rotary mixer-drier (Paul O. Abbe Co. Newark, N.J.) was charged with 5.00 kg of 12×20 Kuraray GG carbon (Kuraray Chemical Company, Ltd., Osaka, Japan) and 681. g of Hombikat UV100 nanoparticle titania (Sachtleben Chemie, DE). The combination was mixed in the Rotocone mixer-drier for 30 seconds at 12 revolutions per minute. Mixing continued while 5.0 kg of distilled water was sprayed onto the mixture of carbon and Hombikat over a period of 10 minutes via a peristaltic pump through an 8 mil nozzle with a 110° fan. Vacuum (−425 kPa) and heat (140° C. Sterlco model F6016-MX heater (Sterling Inc., New Berlin, Wis.) set point) were applied to the rotocone to dry the mixture. Agitation of the mixture was reduced to 0.5 revolutions per minute during drying with the rotocone. Drying was completed after 7.5 hours.

A 300 ml portion of the resulting Hombikat UV100-coated 12×20 Kuraray GG carbon was used as a support material and was treated with gold according to sputter condition 1. The sample weight was 151 g, the base pressure was 0.0000076 Ton, and the target weight loss was 3.59 g.

After gold treatment, the sample was tested as a CO oxidation catalyst according to test procedure 1. The average of the CO conversion (%) and the average concentration of CO (ppm) in the outlet stream measured from 4.25 minutes to 30.5 minutes is indicated in Table 1.

TABLE 1

| | Average CO Conversion (%) | Average CO Concentration (ppm) |
|---|---|---|
| Comparative Example 1 | 97.5 | 91 |

A gold-coated sample was tested according to test procedure 2. $CO_{avg}$ and $T_{avg}$, the average concentration of CO (ppm) in the outlet stream and the average bed temperature (° C.), respectively, were calculated by summing the CO concentration or bed temperature for each measurement and dividing by the number of measurements during the time periods before and after $CO_2$ addition. $CO_{max}$ and $T_{max}$ are the maximum CO concentration and bed temperature recorded before and after $CO_2$ addition. The minimum detectable concentration for CO was 0.5 ppm CO. Results of the testing are included in Table 2.

TABLE 2

| | Before $CO_2$ Addition | | | | After $CO_2$ Addition | | | |
|---|---|---|---|---|---|---|---|---|
| | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Comparative Example 1 | <0.5 | 66.8 | <0.5 | 82.1 | <0.5 | 74.6 | <0.5 | 77.3 |

Example 1-5 and Comparative Examples 2 and 3

Metal-Oxo Domains on Titania Through Acid Hydrolysis of a Base Soluble Metal-Oxo-Anion

TABLE 3

|  | Solution A Contents | Solution B Contents | Firing atmosphere |
|---|---|---|---|
| Example 1 | 5.0 g $Na_2WO_4 \cdot 2H_2O$ | 30.2 ml 1 M Acetic Acid | air |
| Example 2 | 5.0 g $Na_2WO_4 \cdot 2H_2O$ | 30.2 ml 1 M Acetic Acid | 50% $N_2$/50% $H_2$ |
| Example 3 | 5.0 g $K_2SnO_3 \cdot 3H_2O$ | 30.2 ml 1 M Acetic Acid | air |
| Example 4 | 5.0 g $K_2SnO_3 \cdot 3H_2O$ | 30.2 ml 1 M Acetic Acid | 50% $N_2$/50% $H_2$ |
| Example 5 | 3.0 g Sodium Silicate solution | 33.5 ml 1 M Acetic Acid | 50% $N_2$/50% $H_2$ |
| Comparative Example 2 | 3.0 g Sodium Silicate solution | 33.5 ml 1 M Acetic Acid | air |
| Comparative Example 3 | 3.7 g $Na_2MoO_4 \cdot 2H_2O$ | 33.5 ml 1 M Acetic Acid | 50% $N_2$/50% $H_2$ |

($Na_2WO_4 \cdot 2H_2O$ and $Na_2MoO_4 \cdot 2H_2O$: Mallinckrodt, Inc., Phillipsburg, New Jersey; $K_2SnO_3 \cdot 3H_2O$: Aldrich Chemical Company, St. Louis, Missouri; Sodium Silicate solution: 40% by weight $Na_2O(SiO_2)_{2.75}$, PQ Corporation, Valley Forge, Pennsylvania)

A metal salt solution was prepared by dissolving the requisite amount of metal salt (Solution A Contents, Table 3) in 100 ml of deionized water to form "solution A". An acetic acid solution was prepared by mixing 28.5 ml of concentrated acetic acid with water to a final volume of 0.5 liter. The requisite amount of this acetic acid solution (Solution B Contents, Table 3) was further diluted with 70 ml of deionized water to form "solution B." A nanoparticle titania dispersion was prepared by mixing 30.0 g of Hombikat UV100 titania (Sachtleben Chemie GmbH, Duisburg, Germany) in 300 g of deionized water using an IKA T18 high energy mixer (IKA Works, Inc., Wilmington, N.C.) fitted with a 19 mm dispersing tool. While rapidly mixing the Hombikat titania, Solution A and Solution B were added dropwise into the nanoparticle titania dispersion at the same rate. The addition was complete over a period of about 30 minutes. After the addition, the dispersion was allowed to settle and was filtered to yield a filter cake that was washed repeatedly with deionized water. The washed sample was dried in an oven at 130° C. overnight. The dried samples were calcined according to the following schedules.

Samples calcined in air were fired by heating the sample in air in a furnace from room temperature to 300° C. over a period of 3 hours. The sample was held at 300° C. for 1 hour and was then allowed to cool with the furnace. Samples calcined in nitrogen/hydrogen were fired by heating the sample in 50% $N_2$/50% $H_2$ in a furnace from room temperature to 400° C. over a period of 3 hours. The sample was then held at 400° C. for 1 hour, the hydrogen gas was turned off, and the sample was allowed to cool with the furnace while under nitrogen.

Portions of the samples of examples 1-4 and comparative example 2 and 3 were separated and tested according to peroxide color test 1. The modified nanoparticulate materials of Examples 1 and 4, and comparative example 2 and 3 were rated as positive. The modified nanoparticulate materials of examples 3 and 4 were rated as strongly positive.

11.0 g of each of the thermally treated samples was dispersed in 70.0 g of deionized water using the IKA high energy mixer. Each dispersion was sprayed onto a bed of 300 ml (about 124 g) 12×20 Kuraray GG carbon particles (Kuraray Chemical Company, Ltd., Osaka, Japan) using a finger-actuated, sprayer set to provide a fine mist of the dispersion. Each bed of carbon particles was turned using a spatula after every two sprays to ensure a uniform coating of the dispersion on the carbon particles. After the particles were coated onto the larger carbon particles, the coated dispersions were dried at 130° C. in air.

300 ml of the carbon particles carrying the modified nanoparticulate titania were sputter coated with gold under condition 2. Sample weight, base pressure, and gold target weight loss are given in Table 4.

TABLE 4

|  | Sample Weight (g) | Base Pressure (Torr) | Gold Target Weight Loss (g) |
|---|---|---|---|
| Example 1 | 128 | 0.000053 | 6.73 |
| Example 2 | 127.93 | 0.000039 | 6.68 |
| Example 3 | 130 | 0.00008 | 6.67 |
| Example 4 | 128.19 | 0.00017 | 6.6 |
| Example 5 | 128.29 | 0.00014 | 6.62 |
| Comparative Example 2 | 128 | 0.00011 | 6.58 |
| Comparative Example 3 | 125.58 | 0.000017 | 6.53 |

After gold treatment, the samples were tested as a CO oxidation catalyst according to test procedure 1. The results of this test are included in Table 5.

TABLE 5

|  | Average CO Conversion (%) | Average CO Concentration (ppm) |
|---|---|---|
| Example 1 | 96.6 | 122 |
| Example 2 | 96.5 | 127 |
| Example 3 | 97.7 | 82 |
| Example 4 | 97.4 | 92.2 |
| Example 5 | 94.9 | 182 |
| Comparative Example 2 | 94.5 | 198 |
| Comparative Example 3 | 83.7 | 586 |

Gold-coated samples of Examples 1 to 5 and comparative examples 2 and 3 were tested according to test procedure 2. Results of the testing are included in table 6. The minimum sampling time before $CO_2$ addition was 36 minutes. The minimum sampling time following $CO_2$ addition was 28 minutes.

TABLE 6

| | Before $CO_2$ Addition | | | | After $CO_2$ Addition | | | |
|---|---|---|---|---|---|---|---|---|
| | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 1 | 0.5 | 45.2 | 1.3 | 49.1 | 132.8 | 42.7 | 181 | 43 |
| Example 2 | <0.5 | 39.7 | <0.5 | 45 | 73 | 40.3 | 81 | 41 |
| Example 3 | <0.5 | 39.1 | <0.5 | 40.9 | 141 | 35.6 | 250.4 | 36.7 |
| Example 4 | <0.5 | 42 | <0.5 | 48 | 28.6 | 45.3 | 32.6 | 46 |
| Example 5 | <0.5 | 40 | <0.5 | 42.9 | 873 | 34.4 | 1120 | 36.2 |
| Comparative Example 2 | <0.5 | 43.3 | <0.5 | 47.5 | 1922 | 35.3 | 2569 | 39.8 |
| Comparative Example 3 | <0.5 | 39.1 | <0.5 | 39.6 | 2301 | 31.7 | 3144 | 32 |

Examples 6-13 and Comparative Example 4

Metal-Oxo Domains Derived from $M^{2+}$ Cations on Nanoparticulate Titania

TABLE 7

| | Solution A | Solution B | $TiO_2$ Dispersion | Firing Atmosphere/ Temperature |
|---|---|---|---|---|
| Example 6 | 1.47 g $Ca(CH_3CO_2)_2 \cdot H_2O$ 20. g $H_2O$ | 0.75 g NaOH 20. g $H_2O$ | 25.0 g $TiO_2$ 100. g $H_2O$ | Air/300° C. |
| Example 7 | 2.32 g $Co(CH_3CO_2)_2 \cdot 4H_2O$ 20. g $H_2O$ | 0.75 g NaOH 20. g $H_2O$ | 25.0 g $TiO_2$ 100. g $H_2O$ | Air/400° C. |
| Example 8 | 4.73 g $Co(CH_3CO_2)_2 \cdot 4H_2O$ 100. g $H_2O$ | 4.03 g $Na_2CO_3$ 100. g $H_2O$ | 30.0 g $TiO_2$ 200. g $H_2O$ | Air/400° C. |
| Example 9 | 2.0 g $Mn(CH_3CO_2)_2 \cdot 4H_2O$ 20. g $H_2O$ | 0.75 g NaOH 20. g $H_2O$ | 25.0 g $TiO_2$ 100. g $H_2O$ | Air/300° C. |
| Example 10 | 4.65 g $Mn(CH_3CO_2)_2 \cdot 4H_2O$ 100. g $H_2O$ | 4.03 g $Na_2CO_3$ 100. g $H_2O$ | 25.0 g $TiO_2$ 200. g $H_2O$ | Air/300° C. |
| Example 11 | 2.05 g $Zn(CH_3CO_2)_2 \cdot 2H_2O$ 20. g $H_2O$ | 0.75 g NaOH 20. g $H_2O$ | 25.0 g $TiO_2$ 100. g $H_2O$ | Air/300° C. |
| Example 12 | 4.41 g $Zn(CH_3CO_2)_2 \cdot 2H_2O$ 100. g $H_2O$ | 2.13 g NaOH 100. g $H_2O$ | 65.0 g $TiO_2$ 500. g $H_2O$ | Air/400° C. |
| Example 13 | 2.50 g $Ca(CH_3CO_2)_2 \cdot H_2O$ 100. g $H_2O$ | 1.13 g NaOH 100. g $H_2O$ | 65.0 g $TiO_2$ 500. g $H_2O$ | Air/400° C. |
| Comparative Example 4 | 3.0 g $Cu(CH_3CO_2)_2 \cdot H_2O$ 100. g $H_2O$ | 4.03 g $Na_2CO_3$ 100. g $H_2O$ | 30.0 g $TiO_2$ 200. g $H_2O$ | Air/400° C. |

($Ca(CH_3CO_2)_2 \cdot H_2O$: MP Biomedicals, Aurora, Illinois; $Co(CH_3CO_2)_2 \cdot 4H_2O$: Aldrich Chemical Co., Milwaukee, Wisconsin; $Mn(CH_3CO_2)_2 \cdot 4H_2O$: Fisher Scientific Company, Fair Lawn, New Jersey; $Zn(CH_3CO_2)_2 \cdot 2H_2O$: Mallinckrodt Inc., Paris, Kentucky; $TiO_2$: Hombikat UV100, Sachtleben Chemie GmbH, Duisburg, Germany)

Solution A and Solution B were prepared by mixing the reagents as shown in the table above. The solutions were stirred until the solids completely dissolved. A nanoparticle titania dispersion was prepared by mixing the $TiO_2$ dispersion ingredients as shown in the table above using an IKA T18 high energy mixer (IKA Works, Inc., Wilmington, N.C.) fitted with a 19 mm dispersing tool. Solution A and Solution B were added dropwise to the stirred dispersion of titania over about 30 minutes. The rate of addition of these two solutions was adjusted so as to add both solutions slowly and at the same rate. After the addition, the dispersion was allowed to settle and the treated particles were removed by filtration. The materials were washed with about 500 ml deionized water and in the case of examples 6-11 and comparative example 4, the materials were dried in an oven at 100° C. The materials of examples 12 and 13 were dried at 130° C. in an oven. The treated particles were calcined by raising the temperature from room temperature to the firing temperature over 3 hours, holding at the designated temperature (see table above) for 1 hour, then cooling with the furnace.

A portion of the modified nanoparticles of example 13 was separated and tested according to peroxide color test 1 and this material was rated as strongly positive. A sample of the modified nanoparticulate titania material of comparative example 4 was tested for hydrogen peroxide reaction according to peroxide color test 1. The sample was observed to turn brick red upon addition of the hydrogen peroxide and the color slowly reverted back to the original light blue upon standing in air. No conclusion was made for this test.

The crystallite size of the calcined, surface-modified nanoparticulate titania for a portion of the sample of example 8 was determined by x-ray line broadening analysis and the crystallite size was found to be 16.0 nm. The only crystalline phase observed by XRD was anatase.

11.0 g of each of the thermally treated samples was dispersed in 70.0 g of deionized water using the IKA high energy mixer. These dispersions were sprayed onto individual beds of 300 ml (about 124 g) 12×20 Kuraray GG carbon particles (Kuraray Chemical Company, Ltd., Osaka, Japan) using a finger-actuated, sprayer set to provide a fine mist of the dispersion. Each bed of carbon particles was turned using a spatula after every two sprays to ensure a uniform coating of the dispersion on the carbon particles. After the particles were coated onto the larger carbon particles, the coated dispersions were dried at 130° C. in air.

Comparative Example 5

Effect of Acid Washing on Catalytic Activity of Catalyst Comprising Cobalt-Oxo Domains on Nanoparticulate Titania A 15 g sample of the calcined and cooled material of example 8 was mixed with 50 ml 0.5 M $HNO_3$ in deionized water. This was allowed to stir for about 1 hour after which the pH was slowly raised to 7 by the addition of 0.25 N NaOH. The washed solid was separated by filtration, washed with deionized water and dried at 130° C.

300 ml of the calcined support materials of example 6-13 and comparative example 4 and 200 ml of comparative example 5 were treated with gold under the conditions described in Table 8. The drying time for all samples except for example 10 was 24 hours. The drying time for example 10 was 20 hours.

TABLE 8

|  | Sputter Conditions | Sample Weight (g) | Base Pressure (Torr) | Gold Target Weight Loss (g) |
| --- | --- | --- | --- | --- |
| Example 6 | 1 | 128.81 | 0.000029 | 3.57 |
| Example 7 | 1 | 131.51 | 0.000005 | 3.61 |
| Example 8 | 2 | 128.9 | 0.000044 | 6.94 |
| Example 9 | 1 | 128.69 | 0.00012 | 3.47 |
| Example 10 | 2 | 126.61 | 0.000038 | 7 |
| Example 11 | 1 | 128.4 | 0.000017 | 3.58 |
| Example 12 | 1 | 128.51 | 0.00021 | 3.57 |
| Example 13 | 1 | 125.03 | 0.00024 | 3.46 |
| Comparative Example 4 | 2 | 128.03 | 0.00018 | 6.59 |
| Comparative Example 5 | 1 | 87.22 | 0.0024 | 3.47 |

After gold treatment, the samples were tested as a CO oxidation catalyst according to test procedure 1. The results of this test are included in Table 9.

TABLE 9

|  | Average CO Conversion (%) | Average CO Concentration (ppm) |
| --- | --- | --- |
| Example 6 | 97.0 | 108 |
| Example 7 | 96.3 | 133 |
| Example 8 | 96.0 | 143 |
| Example 9 | 96.9 | 112 |
| Example 10 | 97.7 | 84 |
| Example 11 | 96.9 | 113 |
| Example 12 | 96.6 | 121 |
| Example 13 | 95.6 | 158 |
| Comparative Example 4 | 95.3 | 170 |
| Comparative Example 5 | 93.2 | 245 |

Gold-coated samples of examples 6 and 8 through 13 and comparative examples 4 and 5 were tested according to test procedure 2. Results of the testing are included in table 10. The minimum sampling time before $CO_2$ addition was 36 minutes. The minimum sampling time following $CO_2$ addition was 27 minutes.

TABLE 10

|  | Before $CO_2$ Addition | | | | After $CO_2$ Addition | | | |
| --- | --- | --- | --- | --- | --- | --- | --- | --- |
|  | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 6 | <0.5 | 34 | <0.5 | 39 | 1.5 | 36.5 | 1.96 | 37 |
| Example 8 | <0.5 | 42.2 | <0.5 | 43.5 | <0.5 | 40.1 | <0.5 | 40.3 |
| Example 9 | <0.5 | 37.8 | <0.5 | 42 | 5 | 39 | 5.8 | 39 |
| Example 10 | <0.5 | 38.2 | <0.5 | 39.6 | <0.5 | 39.28 | <0.5 | 39.7 |
| Example 11 | <0.5 | 37.8 | 0.5 | 47 | <0.5 | 42.3 | 0.92 | 43 |
| Example 12 | <0.5 | 37 | <0.5 | 38.8 | <0.5 | 35.3 | <0.5 | 36.5 |
| Example 13 | <0.5 | 39.8 | <0.5 | 41.8 | <0.5 | 40 | <0.5 | 41 |
| Comparative Example 4 | <0.5 | 40.6 | <0.5 | 43.5 | 7391 | 29.1 | 7792 | 30.7 |
| Comparative Example 5 | <0.5 | 40.4 | <0.5 | 42.5 | 346 | 33.8 | 365 | 34 |

Example 14-16

Iron-Oxo Domains on Nanoparticulate Titania via Hydrolysis and Oxidation of an $Fe^{2+}$-Containing Precursor

TABLE 11

|  | Solution A | Solution B | Reaction Conditions | Oxidation Conditions |
| --- | --- | --- | --- | --- |
| Example 14 | 15.0 g Ferrous Sulfate in 250. g deionized water | 4.53 g of NaOH in 250. g deionized water | Reaction carried out under nitrogen | 3 ml 30% $H_2O_2$ after addition of solutions A and B |

TABLE 11-continued

|  | Solution A | Solution B | Reaction Conditions | Oxidation Conditions |
|---|---|---|---|---|
| Example 15 | 15.0 g Ferrous Sulfate in 250. g deionized water | 4.53 g of NaOH in 250. g deionized water | Reaction carried out under nitrogen | No additional oxidizing agent added |
| Example 16 | 15.0 g Ferrous Sulfate in 250. g deionized water | 4.53 g of NaOH in 250. g deionized water | Reaction carried out in air | No additional oxidizing agent added |

(Ferrous sulfate heptahydrate: J. T. Baker, Phillipsburg, New Jersey; $H_2O_2$: Mallinckrodt Inc., Phillipsburg, New Jersey)

For examples 14-16, the hydrolysis conditions and reagent amounts are summarized in table 11. In each case a nanoparticle titania dispersion was prepared by mixing 65.0 g of Hombikat UV100 titania (Sachtleben Chemie GmbH, Duisburg, Germany) in 500 g of deionized water using an IKA T18 high energy mixer (IKA Works, Inc., Wilmington, N.C.) fitted with a 19 mm dispersing tool. Solution A and Solution B were added drop-wise to this stirred dispersion of titania over about 40 minutes. The rate of the addition of these two solutions was adjusted so as to add both solutions slowly and at the same rate. In examples 14 and 15 solutions A and B were deoxygenated prior to reaction by bubbling nitrogen through the solution for 20 minutes prior to use and the hydrolysis of the iron solution by the addition of the base was carried out under a blanket of nitrogen. In the case of example 14, after the addition of solutions A and B, 3 ml of 30% hydrogen peroxide was added and the dispersion was observed to change color to a light yellowish-tan. In all three cases the dispersions were allowed to settle and the treated particles were removed by filtration. The materials was washed with about 600 ml deionized water and dried in an oven at 100° C.

The treated particles were calcined by raising the temperature from room temperature to 400° C. over 3 hours, holding at 400° C. for 1 hour, then cooling with the furnace.

A portion of the treated nanoparticles of example 14 was separated and tested according to peroxide color test 1. Although the samples were light tan in color, color test 1 could be carried out. The modified nanoparticulate material of Example 14 was rated as positive.

The crystallite size of the calcined, surface-modified nanoparticulate titania for a portion of the example 14 sample was determined by x-ray line broadening analysis and the crystallite size was found to be 15.5 nm. The only crystalline phase observed by XRD was anatase.

11.0 g of the thermally treated samples were each dispersed in 70.0 g of deionized water using the IKA high energy mixer. The dispersions were sprayed onto separate beds of 300 ml (about 121 g) 12×20 Kuraray GG carbon particles (Kuraray Chemical Company, Ltd., Osaka, Japan) using a finger-actuated, sprayer set to provide a fine mist of the dispersions. The beds of carbon particles were turned using a spatula after every two sprays to ensure a uniform coating of the dispersion on the carbon particles. After the particles were coated onto the larger carbon particles, the coated dispersions were dried at 130° C. in air.

The treated titania on carbon samples were further treated with gold under sputter condition 1. Sample weight, base pressure, and gold target weight loss are given in Table 12.

TABLE 12

|  | Sample Weight (g) | Base Pressure (Torr) | Gold Target Weight Loss (g) |
|---|---|---|---|
| Example 14 | 129.18 | 0.000081 | 3.41 |
| Example 15 | 130.26 | 0.0002 | 3.37 |
| Example 16 | 129.2 | 0.00024 | 3.39 |

SEM examination of a portion of the gold treated particles of examples 14 and 15 revealed that the carbon granules were coated with a semi-continuous coating of the surface modified, nanoparticulate titania. The titania was observed to be present mostly (greater than 60%) by volume) in the form of 0.1 to 3 micron aggregates that were agglomerated to form a porous coating on the carbon. The coatings were estimated to contain 0.2 to about 1 micron pores at a volume percent of 35 to 65% of the coating. Larger surface pores, 3 to 8 microns in diameter, were present in both samples that provided a rough texture to the outer portion of the coating.

After gold treatment, the samples were tested as a CO oxidation catalyst according to test procedure 1. The results of this test are included in Table 13.

TABLE 13

|  | Average CO Conversion (%) | Average CO Concentration (ppm) |
|---|---|---|
| Example 14 | 95.1 | 176 |
| Example 15 | 94.5 | 197 |
| Example 16 | 95.4 | 166 |

Gold-coated samples of examples 14 through 16 were tested according to test procedure 2. Results of the testing are included in table 14. The sampling time before $CO_2$ addition was 36 minutes. The sampling time following $CO_2$ addition was 47 minutes.

TABLE 14

|  | Before $CO_2$ Addition | | | | After $CO_2$ Addition | | | |
|---|---|---|---|---|---|---|---|---|
|  | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 14 | <0.5 | 43.9 | <0.5 | 45.1 | <0.5 | 42.1 | <0.5 | 42.6 |
| Example 15 | <0.5 | 43.3 | <0.5 | 45.3 | <0.5 | 40.75 | <0.5 | 41.4 |
| Example 16 | <0.5 | 43 | <0.5 | 44.7 | <0.5 | 40 | <0.5 | 40.4 |

Examples 17-20

Mixed Metal-Oxo Domains on Nanoparticulate Titania

TABLE 15

|  | Solution A | Solution B | Oxidation Agent |
|---|---|---|---|
| Example 17 | 3.95 g Zinc Acetate dihydrate<br>10.0 g Ferrous Sulfate Heptahydrate<br>250.0 g deionized water | 4.95 g NaOH<br>250.0 g deionized water | Air |
| Example 18 | 3.95 g Calcium Acetate monohydrate<br>10.0 g Ferrous Sulfate Heptahydrate<br>250.0 g deionized water | 4.65 g NaOH<br>250.0 g deionized water | Air |
| Example 19 | 3.95 g Zinc Acetate dihydrate<br>10.0 g Ferrous Sulfate Heptahydrate<br>250.0 g deionized water | 4.56 g NaOH<br>250.0 g deionized water | 10 ml 30% $H_2O_2$ |
| Example 20 | 3.56 g Magnesium Chloride hexahydrate<br>10.0 g Ferrous Sulfate Heptahydrate<br>250.0 g deionized water | 4.53 g NaOH<br>250.0 g deionized water | Air |

(Ferrous sulfate heptahydrate: J. T. Baker, Phillipsburg, New Jersey; $H_2O_2$: Mallinckrodt Inc., Phillipsburg, New Jersey; $Zn(CH_3CO_2)_2 \cdot 2H_2O$: Mallinckrodt Inc., Paris, Kentucky; $Ca(CH_3CO_2)_2 \cdot H_2O$: MP Biomedicals, Aurora, Illinois; $MgCl_2 \cdot 6H_2O$: EMD Chemicals, Inc., Gibbstown, New Jersey)

A solution providing iron and a second metal cation designated "Solution A" was prepared by dissolving the requisite amount of the metal compounds in water (see Table 15). A sodium hydroxide solution ("Solution B") was prepared by dissolving the requisite amount of sodium hydroxide in 250 g deionized water (see Table 15). A nanoparticle titania dispersion was prepared by mixing 65.0 g of Hombikat UV100 titania (Sachtleben Chemie GmbH, Duisburg, Germany) in 500 g of deionized water using an IKA T18 high energy mixer (IKA Works, Inc., Wilmington, N.C.) fitted with a 19 mm dispersing tool. Solution A and Solution B were added dropwise to this stirred dispersion of titania over about 40 minutes. The rate of the addition of these two solutions was adjusted so as to add both solutions slowly and at the same rate. After the addition, in the case of the examples wherein the oxidation agent for the iron was air, the dispersion was allowed to settle and the treated particles were removed by filtration. In the case of example 19, 10 ml of 30% hydrogen peroxide was added to the treated dispersion as an oxidizing agent after the addition of Solution A and B. This material was then treated identically to the other samples and was separated by filtration. Each of the materials were washed with about 600 ml deionized water and dried in an oven at 100° C.

Each of the samples of the treated particles were calcined by raising the temperature from room temperature to 400° C. over 3 hours, holding at 400° C. for 1 hour, then cooling with the furnace.

Portions of the samples of examples 19 and 20 were separated and tested according to peroxide color test 1. Although the samples were light tan in color, color test 1 could be carried out. The modified nanoparticulate materials of Examples 19 and 20 were rated as positive in this color test. The samples were observed to induce slow decomposition of the excess peroxide as evidenced by the slow formation of gas bubbles after the addition of the hydrogen peroxide.

The crystallite size of the calcined, surface-modified nanoparticulate titania for a portion of the sample of example 21 was determined by x-ray line broadening analysis and the crystallite size was found to be 16.0 nm. The only crystalline phase observed by XRD was anatase.

For each example 11.0 g of the thermally treated sample was dispersed in 70.0 g of deionized water using the IKA high energy mixer. Each of these dispersions were sprayed onto beds of 300 ml (about 121 g) 12×20 Kuraray GG carbon particles (Kuraray Chemical Company, Ltd., Osaka, Japan) using a finger-actuated, sprayer set to provide a fine mist of the dispersion. Each of the beds of carbon particles were turned using a spatula after every two sprays to ensure a uniform coating of the dispersion on the carbon particles. After the particles were coated onto the larger carbon particles, the coated dispersions were dried at 130° C. in air.

The calcined support materials were treated with gold under sputter condition 1. Sample weight, base pressure, and gold target weight loss are given in Table 16.

TABLE 16

|  | Sample Weight (g) | Base Pressure (Torr) | Gold Target Weight Loss (g) |
|---|---|---|---|
| Example 17 | 124.79 | 0.00024 | 3.44 |
| Example 18 | 127.12 | 0.00025 | 3.44 |
| Example 19 | 130.49 | 0.00019 | 3.54 |
| Example 20 | 130.16 | 0.00023 | 3.43 |

Comparative Example 6

Effect of Acid Washing on Catalytic Activity of Catalyst Comprising Iron and Zinc-Oxo Domains on Nanoparticulate Titania The material of example 17 was washed with 0.5 M nitric acid to remove a portion of the metal-oxo domains that had been deposited on the particles via the hydrolysis process. A 15 g sample of the calcined and cooled material of example 17 was mixed with 50 ml 0.5 M $HNO_3$ in deionized water. This was allowed to stir for about 1 hour after which the pH was slowly raised to 7 by the addition of 0.25 M NaOH. The washed solid was separated by filtration, washed with deionized water and dried at 130° C.

After acid washing the catalyst was supported on carbon exactly as in example 17 and coated with catalytically active gold as in example 17. The sample weight was 126.61 g, the base pressure was 0.000045 Torr, and the target weight loss was 3.5 g.

Comparative Example 7

Effect of Acid Washing on Catalytic Activity of Catalyst comprising Iron and Magnesium-Oxo Domains on Nanoparticulate Titania A portion of the treated particles of example 20 was washed with 0.5 M nitric acid to remove a portion of the metal-oxo domains that had been deposited on the particles via the hydrolysis process. A 15 g sample of the calcined and cooled material of example 20 was mixed with 50 ml 0.5 M $HNO_3$ in deionized water. This was allowed to stir for about 1 hour after which the pH was slowly raised to 7 by the addition of 0.25 M NaOH. The washed solid was separated by filtration, washed with deionized water and dried at 130° C.

After acid washing the catalyst was supported on carbon exactly as in example 20 and coated with catalytically active gold as in example 20. The sample weight was 126.04 g, the base pressure was 0.00023 Torr, and the target weight loss was 3.44 g.

After gold treatment, Examples 17-20 and Comparative Examples 6 and 7 were tested as a CO oxidation catalyst according to test procedure 1. The results of this test are included in Table 17.

TABLE 17

|  | Average CO Conversion (%) | Average CO Concentration (ppm) |
|---|---|---|
| Example 17 | 95.7 | 156 |
| Example 18 | 96.3 | 133 |
| Example 19 | 95.6 | 160 |
| Example 20 | 91.5 | 306 |
| Comparative Example 6 | 95.4 | 165 |
| Comparative Example 7 | 91.4 | 309 |

Gold-coated samples of examples 17 through 20 and comparative examples 6 and 7 were tested according to test procedure 2. Results of the testing are included in table 18. The minimum sampling time before $CO_2$ addition was 36 minutes. The minimum sampling time following $CO_2$ addition was 47 minutes.

TABLE 18

| | Before $CO_2$ Addition | | | | After $CO_2$ Addition | | | |
|---|---|---|---|---|---|---|---|---|
| | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 17 | <0.5 | 41.9 | <0.5 | 43.7 | <0.5 | 41.6 | <0.5 | 41.7 |
| Example 18 | <0.5 | 44.9 | <0.5 | 47.8 | <0.5 | 44.4 | <0.5 | 45 |
| Example 19 | <0.5 | 43.6 | <0.5 | 46 | <0.5 | 42.9 | <0.5 | 43.3 |
| Example 20 | <0.5 | 43 | <0.5 | 44.4 | 128.9 | 38.4 | 136.5 | 38.5 |
| Comparative Example 6 | 4.3 | 43.4 | 6.23 | 45.4 | 151 | 39.7 | 269 | 40.1 |
| Comparative Example 7 | <0.5 | 43.3 | <0.5 | 44.9 | 651 | 37.7 | 787 | 38 |

Examples 21-26

Varying the Amount of Iron-Oxo Domains on Nanoparticulate Titania from Hydroysis/Oxidation of a Ferrous Salt

TABLE 19

| | Solution A Contents | Solution B Contents |
|---|---|---|
| Example 21 | 1.0 g $FeSO_4 \cdot 7H_2O$ | 0.288 g NaOH |
| Example 22 | 2.5 g $FeSO_4 \cdot 7H_2O$ | 0.72 g NaOH |
| Example 23 | 5.0 g $FeSO_4 \cdot 7H_2O$ | 1.44 g NaOH |
| Example 24 | 7.5 g $FeSO_4 \cdot 7H_2O$ | 2.16 g NaOH |
| Example 25 | 10.0 g $FeSO_4 \cdot 7H_2O$ | 2.88 g NaOH |
| Example 26 | 20.0 g $FeSO_4 \cdot 7H_2O$ | 5.76 g NaOH |

(Ferrous sulfate heptahydrate: J. T. Baker, Phillipsburg, New Jersey)

For examples 21-26, the reagent amounts are summarized in table 19. In each case a nanoparticle titania dispersion was prepared by mixing 65.0 g of Hombikat UV100 titania (Sachtleben Chemie GmbH, Duisburg, Germany) in 500 g of deionized water using an IKA T18 high energy mixer (IKA Works, Inc., Wilmington, N.C.) fitted with a 19 mm dispersing tool. Solution A and Solution B were added drop-wise to this stirred dispersion of titania over about 40 minutes. The rate of the addition of these two solutions was adjusted so as to add both solutions slowly and at the same rate. In all cases the dispersions were allowed to settle and the treated particles were removed by filtration. The materials were washed with about 600 ml deionized water and dried in an oven at 100° C.

The treated particles were calcined by raising the temperature from room temperature to 400° C. over 3 hours, holding at 400° C. for 1 hour, then cooling with the furnace.

Portions of the samples of examples 21, 22 and 23 were separated and tested according to peroxide color test 1. These materials were light tan in color but could be tested with peroxide color test 1. The modified nanoparticulate materials of Examples 21, 22 and 23 were rated as positive. The samples were observed to induce slow decomposition of the excess peroxide as evidenced by the slow generation of gas bubbles after the addition of the hydrogen peroxide.

11.0 g of the thermally treated samples were each dispersed in 70.0 g of deionized water using the IKA high energy mixer. The dispersions were sprayed onto separate beds of 300 ml (about 121 g) 12×20 Kuraray GG carbon particles (Kuraray Chemical Company, Ltd., Osaka, Japan) using a finger-actuated, sprayer set to provide a fine mist of the dispersions. The beds of carbon particles were turned using a spatula after every two sprays to ensure a uniform coating of the dispersion on the carbon particles. After the particles were coated onto the larger carbon particles, the coated dispersions were dried at 130° C. in air.

The treated titania on carbon samples of Examples 21 through 26 were further treated with gold under sputter condition 1. Sample weight, base pressure, and gold target weight loss are given in Table 20.

TABLE 20

| | Sample Weight (g) | Base Pressure (Torr) | Gold Target Weight Loss (g) |
|---|---|---|---|
| Example 21 | 127 | 0.000053 | 3.6 |
| Example 22 | 126.73 | 0.00019 | 3.37 |
| Example 23 | 126.27 | 0.00024 | 3.42 |
| Example 24 | 127.44 | 0.000024 | 3.24 |
| Example 25 | 126.64 | 0.00027 | 3.32 |
| Example 26 | 127.69 | 0.00019 | 3.47 |

SEM examination of a portion of the gold treated particles of examples 23 and 25 revealed that the carbon granules were coated with a semi-continuous coating of the surface modified, nanoparticulate titania. The titania was observed to be present mostly (greater than about 50% by volume for example 25 and greater than about 70% by volume for example 23) in the form of 0.1 to 1.5 micron aggregates that were agglomerated to form a porous coating on the carbon. Example 25 was observed to contain a larger percentage of larger agglomerates than what was observed for example 23. The coatings were estimated to contain 0.2 to about 1 micron pores at a volume percent of 35 to 50% of the coating. Larger surface pores, 3 to 8 microns in diameter, were present in both samples that provided a rough texture to the outer portion of the coating.

After gold treatment, the Examples 21 through 25 were tested as a CO oxidation catalyst according to test procedure 1. The results of this test are included in Table 21.

TABLE 21

| | Average CO Conversion (%) | Average CO Concentration (ppm) |
|---|---|---|
| Example 21 | 95.1 | 177 |
| Example 22 | 94.4 | 203 |
| Example 23 | 94.0 | 215 |
| Example 24 | 94.8 | 185 |
| Example 25 | 93.8 | 222 |

Gold-coated samples of Examples 21 through 26 were tested according to test procedure 2. Results of the testing are included in table 22. The sampling time before $CO_2$ addition was 36 minutes. The sampling time following $CO_2$ addition was 47 minutes.

TABLE 22

| | Before $CO_2$ Addition | | | | After $CO_2$ Addition | | | |
|---|---|---|---|---|---|---|---|---|
| | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 21 | <0.5 | 40.3 | <0.5 | 43.5 | 167 | 34.9 | 221 | 35.6 |
| Example 22 | <0.5 | 46.3 | <0.5 | 49.9 | <0.5 | 45.7 | <0.5 | 46.6 |
| Example 23 | <0.5 | 38 | <0.5 | 39.5 | 437 | 32.9 | 555 | 33.4 |
| Example 24 | <0.5 | 38 | <0.5 | 39.5 | 49 | 35.8 | 102 | 36.3 |
| Example 25 | <0.5 | 40.7 | <0.5 | 43.3 | 107 | 37.9 | 145 | 38.5 |
| Example 26 | <0.5 | 42.2 | <0.5 | 45.1 | 5.3 | 37.4 | 21.0 | 38.3 |

Example 27

Calcium-Oxo Domains on Nanoparticulate Titania via Thermal Decomposition of a Calcium Oxalate Precipitated onto the Nanoparticulate Titania via Formation of an Insoluble Calcium Oxalate Salt A solution containing calcium ions was prepared by dissolving 5.0 g of $Ca(CH_3CO_2)_2.H_2O$ (MP Biomedicals, Aurora, Ill.) in 100 ml of deionized water to form "solution A". A sodium oxalate solution was prepared by mixing 1.0 g of sodium oxalate (Fisher Scientific, Fair Lawn, N.J.) in 100. g water. A nanoparticle titania dispersion was prepared by mixing 65.0 g of Hombikat UV100 titania (Sachtleben Chemie GmbH, Duisburg, Germany) in 500 g of deionized water using an IKA T18 high energy mixer (IKA Works, Inc., Wilmington, N.C.) fitted with a 19 mm dispersing tool. While rapidly mixing the Hombikat titania, Solution A and Solution B were added dropwise into the nanoparticle titania dispersion at the same rate. The addition was complete over a period of about 30 minutes. After the addition, the dispersion was allowed to settle and was filtered to yield a filter cake that was washed repeatedly with deionized water. The washed sample was dried in an oven at 130° C. overnight. The dried sample was calcined according to the following schedules:

The sample was calcined in air by heating the sample in air in a furnace from room temperature to 400° C. over a period of 3 hours. The sample was held at 400° C. for 1 hour and was then allowed to cool with the furnace.

A portion of the treated nanoparticles of example 27 was separated and tested according to peroxide color test 1. The modified nanoparticulate material of Example 27 was rated as positive in this color test.

11.0 g of the thermally treated sample was dispersed in 70.0 g of deionized water using the IKA high energy mixer. This dispersion was sprayed onto a bed of 300 ml (about 124 g) 12×20 Kuraray GG carbon particles (Kuraray Chemical Company, Ltd., Osaka, Japan) using a finger-actuated, sprayer set to provide a fine mist of the dispersion. The bed of carbon particles was turned using a spatula after every two sprays to ensure a uniform coating of the dispersion on the carbon particles. After the particles were coated onto the larger carbon particles, the coated dispersion was dried at 130° C. in air.

The carbon particles carrying the modified nanoparticulate titania were treated with gold under sputter condition 1. The sample weight was 122.45 g, the base pressure was 0.00022 Torr, and the target weight loss was 3.49 g.

After gold treatment, the sample was tested as a CO oxidation catalyst according to test procedure 1. The results of this test are included in Table 23.

TABLE 23

| | Average CO Conversion (%) | Average CO Concentration (ppm) |
|---|---|---|
| Example 27 | 92.2 | 282 |

A gold-coated sample of Example 27 was tested according to test procedure 2. Results of the testing are included in Table 24.

TABLE 24

| | Before $CO_2$ Addition | | | | After $CO_2$ Addition | | | |
|---|---|---|---|---|---|---|---|---|
| | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 27 | <0.5 | 44.2 | <0.5 | 46.3 | 2.7 | 43.6 | 5.9 | 44.4 |

Examples 28-33 and Comparative Examples 8-9

Cerium-Containing-Oxo Domains on Nanoparticulate Titania—Effect of Composition and Firing Atmosphere

TABLE 25

|  | Solution A Contents | Solution B Contents | Firing Atmosphere |
|---|---|---|---|
| Example 28 | 8.0 Cerium nitrate solution | 1.68 g NaOH | Air |
| Example 29 | 8.0 Cerium nitrate solution | 1.68 g NaOH | $N_2/H_2$ |
| Example 30 | 5.9 g Cerium nitrate solution 5.0 g Zirconyl acetate solution | 1.21 g NaOH | Air |
| Example 31 | 5.9 g Cerium nitrate solution 5.0 g Zirconyl acetate solution | 1.21 g NaOH | $N_2/H_2$ |
| Example 32 | 8.0 g Cerium nitrate solution 1.0 g La$(NO_3)_3 \cdot 6H_2O$ | 1.68 g NaOH | $N_2/H_2$ |
| Comparative Example 8 | 8.0 g Cerium nitrate solution 1.0 g La$(NO_3)_3 \cdot 6H_2O$ | 1.68 g NaOH | Air |
| Example 33 | 5.0 g Cerium nitrate solution 5.0 g Zirconyl acetate solution 1.0 g La$(NO_3)_3 \cdot 6H_2O$ | 1.49 g NaOH | $N_2/H_2$ |
| Comparative Example 9 | 5.0 g Cerium nitrate solution 5.0 g Zirconyl acetate solution 1.0 g La$(NO_3)_3 \cdot 6H_2O$ | 1.49 g NaOH | Air |

(Cerium nitrate solution: 20% by weight Ce, Shepherd Chemical, Norwood, Ohio; Zirconyl acetate solution: 22% ZrO$_2$, Magnesium Elecktron Inc., Flemington, New Jersey; La(NO$_3$)$_3 \cdot$6H$_2$O: Alfa Aesar, Ward Hill, Massachusetts)

"Solution A" was prepared by dissolving the contents shown above in table 25 for each example in 100 g of deionized water. A sodium hydroxide solution ("Solution B") was prepared by dissolving the requisite amount of sodium hydroxide as shown in the table above in 100. g deionized water. For each example a nanoparticle titania dispersion was prepared by mixing 30.0 g of Hombikat UV100 titania (Sachtleben Chemie GmbH, Duisburg, Germany) in 200 g of deionized water using an IKA T18 high energy mixer (IKA Works, Inc., Wilmington, N.C.) fitted with a 19 mm dispersing tool. Solution A and Solution B were added dropwise to this stirred dispersion of titania over about 30 minutes. The rate of the addition of these two solutions was adjusted so as to add both solutions slowly and at the same rate. Additional sodium hydroxide solution was prepared as in Solution B and this was added to the mixture dropwise until the pH of the solution was 8-9. After the addition, the dispersion was allowed to settle and the treated particles were removed by filtration. After filtration each of the resulting materials was washed with about 500 ml deionized water and dried in an oven at 100° C.

The treated particles were calcined in the requisite atmosphere as shown in the table by raising the temperature from room temperature to 400° C. over 3 hours, holding at 400° C. for 1 hour, then cooling with the furnace.

The crystallite size of the calcined, surface-modified nanoparticulate titania for a portion of the calcined sample of example 29 was determined by x-ray line broadening analysis and the crystallites were found to be about 14.5 nm in size. The only crystalline phase observed by XRD was anatase.

11.0 g of each of the thermally treated samples were dispersed in 70.0 g of deionized water using the IKA high energy mixer. This dispersions were sprayed onto a bed of 300 ml (about 124 g) 12×20 Kuraray GG carbon particles (Kuraray Chemical Company, Ltd., Osaka, Japan) using a finger-actuated, sprayer set to provide a fine mist of the dispersion. The beds of carbon particles were turned using a spatula after every two sprays to ensure a uniform coating of the dispersion on the carbon particles. After the particles were coated onto the larger carbon particles, the coated dispersions were dried at 100° C. in air.

Comparative Example 10

Negative Effects of Reactive Cerium Surface

A dispersion was prepared by mixing 75.0 g of Hombikat UV100 titania (Sachtleben Chemie GmbH, Duisburg, Germany) along with 20.0 g of zirconyl acetate (22% by weight ZrO$_2$, Magnesium Elektron, Inc., Flemington, N.J.), 20.0 g of cerium nitrate solution (20% by weight Ce, Shepherd Chemical, Norwood, Ohio), 5.0 g of lanthanum nitrate (La(NO)$_3$.6H$_2$O, Alfa Aesar, Ward Hill, Mass.) in 500 g of deionized water using an IKA T18 high energy mixer (IKA Works, Inc., Wilmington, N.C.) fitted with a 19 mm dispersing tool. A sodium hydroxide solution was prepared by dissolving 15.0 g of sodium hydroxide (J. T. Baker, Inc., Phillipsburg, N.J.) in 500 g of deionized water. While stirring the sodium hydroxide solution rapidly using the IKA T18 mixer, the dispersion containing the nanoparticle titania along with the metal salts was slowly added. After mixing the product was separated by filtration and washed repeatedly with deionized water until the pH was between 8 and 9. The filtered product was dried at 120° C. in an oven and then calcined by raising the temperature from room temperature to 400° C. over 3 hours, holding at 400° C. for 1 hour, then cooling with the furnace.

11.0 g of the thermally treated sample was dispersed in 70.0 g of deionized water using the IKA high energy mixer. This dispersion was sprayed onto a bed of 300 ml (about 121 g) 12×20 Kuraray GG carbon particles (Kuraray Chemical Company, Ltd., Osaka, Japan) using a finger-actuated, sprayer set to provide a fine mist of the dispersion. The bed of carbon particles was turned using a spatula after every two sprays to ensure a uniform coating of the dispersion on the carbon particles. After the particles were coated onto the larger carbon particles, the coated dispersion was dried at 100° C. in air.

The crystallite size of the calcined, surface-modified nanoparticulate titania of comparative example 10 was determined by x-ray line broadening analysis and was found to be about 9.5 nm. The only crystalline phase observed by XRD was anatase.

The calcined support materials of Examples 28-33 and Comparative Examples 8-10 were treated with gold. Sputter conditions, sample weight, base pressure, and gold target weight loss are given in Table 26.

TABLE 26

|  | Sputter Condition | Sample Weight (g) | Base Pressure (Torr) | Gold Target Weight Loss (g) |
|---|---|---|---|---|
| Example 28 | 2 | 121.71 | 0.0001 | 6.5 |
| Example 29 | 2 | 114.24 | 0.00017 | 6.55 |
| Example 30 | 2 | 122.09 | 0.000098 | 6.97 |
| Example 31 | 2 | 128.81 | 0.000098 | 7.02 |
| Example 32 | 2 | 130 | 0.00014 | 6.45 |
| Comparative Example 8 | 2 | 129.17 | 0.0001 | 6.98 |
| Example 33 | 2 | 128.72 | 0.00012 | 6.57 |
| Comparative Example 9 | 2 | 118.49 | 0.00012 | 6.63 |
| Comparative Example 10 | 1 | 126.19 | 0.00013 | 3.43 |

SEM examination of a portion of the gold treated particles of examples 29 revealed that the carbon granules were coated with a semi-continuous coating of the surface modified, nanoparticulate titania. The titania was observed to be present mostly in the form of 0.1 to 1.5 micron aggregates (greater than 60% by volume) that were agglomerated to form a porous coating on the carbon. The coatings were estimated to contain 0.2 to about 1 micron pores at a volume percent of 35 to 50% of the coating. Larger surface pores, 3 to 8 microns in diameter, were present in both samples that provided a rough texture to the outer portion of the coating.

After gold treatment, the samples were tested as a CO oxidation catalyst according to test procedure 1. The results of this test are included in Table 27.

TABLE 27

|  | Average CO Conversion (%) | Average CO Concentration (ppm) |
|---|---|---|
| Example 28 | 98.0 | 73 |
| Example 29 | 96.1 | 140 |
| Example 30 | 97.5 | 89 |
| Example 31 | 97.9 | 75 |
| Example 32 | 97.3 | 97 |
| Comparative Example 8 | 96.9 | 111 |
| Example 33 | 98.1 | 68 |
| Comparative Example 9 | 97.1 | 103 |
| Comparative Example 10 | 95.2 | 174 |

Gold-coated samples of Examples 28 through 33 and comparative examples 8 through 10 were tested according to test procedure 2. Results of the testing are included in table 28. The minimum sampling time before $CO_2$ addition was 36 minutes. The sampling time following $CO_2$ addition was 28 minutes.

TABLE 28

|  | Before $CO_2$ Addition | | | | After $CO_2$ Addition | | | |
|---|---|---|---|---|---|---|---|---|
|  | $CO_{avg}$ (ppm) | $T_{avg}$ (°C.) | $CO_{max}$ (ppm) | $T_{max}$ (°C.) | $CO_{avg}$ (ppm) | $T_{avg}$ (°C.) | $CO_{max}$ (ppm) | $T_{max}$ (°C.) |
| Example 28 | <0.5 | 43.2 | <0.5 | 44.4 | 4.5 | 39.5 | 3.6 | 40.3 |
| Example 29 | <0.5 | 41.7 | <0.5 | 50 | <0.5 | 44.3 | <0.5 | 46 |
| Example 30 | <0.5 | 40.8 | 0.5 | 42.7 | <0.5 | 40.6 | <0.5 | 41.4 |
| Example 31 | <0.5 | 44.0 | <0.5 | 46.8 | 71 | 40.2 | 152 | 41 |
| Example 32 | <0.5 | 41.2 | <0.5 | 43.4 | 1.4 | 41 | 3.2 | 41.4 |
| Comparative Example 8 | <0.5 | 36.8 | <0.5 | 38.3 | 1185 | 32.1 | 1955 | 33.6 |
| Example 33 | <0.5 | 39 | <0.5 | 40.8 | 93 | 35.1 | 190 | 35.8 |
| Comparative Example 9 | <0.5 | 39.7 | <0.5 | 42.2 | 377 | 35.2 | 605 | 36 |
| Comparative Example 10 | <0.5 | 40.7 | <0.5 | 42.4 | 169 | 35 | 182 | 35 |

Example 34

Aluminum-Oxo Domains on Nanoparticulate Titania

A solution of aluminum nitrate ("Solution A") was prepared by dissolving 5.0 g of aluminum nitrate nonahydrate (Mallinckrodt, Paris, Ky.) in 100. g of deionized water. A sodium hydroxide solution ("Solution B") was prepared by dissolving 1.60 g of sodium hydroxide in 100. g deionized water. A nanoparticle titania dispersion was prepared by mixing 65.0 g of Hombikat UV100 titania (Sachtleben Chemie GmbH, Duisburg, Germany) in 500 g of deionized water using an IKA T18 high energy mixer (IKA Works, Inc., Wilmington, N.C.) fitted with a 19 mm dispersing tool. Solution A and Solution B were added dropwise to this stirred dispersion of titania over about 30 minutes. The rate of the addition of these two solutions was adjusted so as to add both solutions slowly and at the same rate. After the addition, the dispersion was allowed to settle and the treated particles were removed by filtration. The material was washed with about 500 ml deionized water and dried in an oven at 100° C.

The treated particles were calcined in air by raising the temperature from room temperature to 400° C. over 3 hours, holding at 400° C. for 1 hour, then cooling with the furnace. A portion of the treated nanoparticles of example 34 was separated and tested according to peroxide color test 1. The modified nanoparticulate material of Example 34 was rated as positive in this color test. A portion of the treated nanoparticles of example 34 was further tested according to hydrogen peroxide color test 2. The peroxide surface activity was found to be 0.1132.

11.0 g of the thermally treated sample was dispersed in 70.0 g of deionized water using the IKA high energy mixer. This dispersion was sprayed onto bed of 300 ml (about 124 g) 12×20 Kuraray GG carbon particles (Kuraray Chemical Company, Ltd., Osaka, Japan) using a finger-actuated, sprayer set to provide a fine mist of the dispersion. The bed of carbon particles was turned using a spatula after every two sprays to ensure a uniform coating of the dispersion on the carbon particles. After the particles were coated onto the larger carbon particles, the coated dispersion was dried at 100° C. in air.

The calcined support material was treated with gold under sputter condition 1. The sample weight was 129.04 g, the base pressure was 0.00022 Torr, and the target weight loss was 3.43 g.

After gold treatment, the sample was tested as a CO oxidation catalyst according to test procedure 1. The results of this test are included in Table 29.

TABLE 29

|  | Average CO Conversion (%) | Average CO Concentration (ppm) |
|---|---|---|
| Example 34 | 94.9 | 182 |

A gold-coated sample of Example 34 was tested according to test procedure 2. Results of the testing are included in Table 30.

TABLE 30

| | Before $CO_2$ Addition | | | | After $CO_2$ Addition | | | |
|---|---|---|---|---|---|---|---|---|
| | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 34 | <0.5 | 41.0 | <0.5 | 44.4 | 17.2 | 37.2 | 54.7 | 38.6 |

Example 35

Aluminum-Oxo Domains on Nanoparticulate Titania Deposited Via Dilution Hydrolysis A solution of aluminum nitrate was prepared by dissolving 2.0 g of aluminum nitrate nonahydrate (Mallinckrodt, Paris, Ky.) in 100. g of deionized water. A nanoparticle titania dispersion was prepared by mixing 65.0 g of Hombikat UV100 titania (Sachtleben Chemie GmbH, Duisburg, Germany) in 500 g of deionized water using an IKA T18 high energy mixer (IKA Works, Inc., Wilmington, N.C.) fitted with a 19 mm dispersing tool. The aluminum nitrate solution was added dropwise to this stirred dispersion of titania over about 30 minutes. After the addition, the dispersion was allowed to settle and the treated particles were removed by filtration. The material was washed with about 200 ml deionized water and dried in an oven at 130° C.

The treated particles were calcined by raising the temperature from room temperature to 400° C. over 3 hours, holding at 400° C. for 1 hour, then cooling with the furnace.

11.0 g of the thermally treated sample was dispersed in 70.0 g of deionized water using the IKA high energy mixer. This dispersion was sprayed onto a bed of 300 ml (about 124 g) 12×20 Kuraray GG carbon particles (Kuraray Chemical Company, Ltd., Osaka, Japan) using a finger-actuated, sprayer set to provide a fine mist of the dispersion. The bed of carbon particles was turned using a spatula after every two sprays to ensure a uniform coating of the dispersion on the carbon particles. After the particles were coated onto the larger carbon particles, the coated dispersion was dried at 100° C. in air.

The calcined support material was treated with gold under sputter condition 1. The sample weight was 129.07 g, the base pressure was 0.00015 Torr, and the target weight loss was 3.41 g.

After gold treatment, the sample was tested as a CO oxidation catalyst according to test procedure 1. The results of this test are included in table 31.

TABLE 31

| | Average CO Conversion (%) | Average CO Concentration (ppm) |
|---|---|---|
| Example 35 | 96.0 | 144 |

A gold-coated sample of Example 35 was tested according to test procedure 2. Results of the testing are included in Table 32.

TABLE 32

| | Before $CO_2$ Addition | | | | After $CO_2$ Addition | | | |
|---|---|---|---|---|---|---|---|---|
| | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 35 | <0.5 | 39.8 | <0.5 | 41.9 | <0.5 | 39.9 | <0.5 | 40.2 |

Examples 36-43

Varying the Amount of Iron-Oxo Domains on Nanoparticulate Titania Deposited by Thermally-Driven Hydrolysis of Iron (III) Nitrate Solutions of iron (III) nitrate (J. T. Baker, Inc., Phillipsburg, N.J.) were prepared by dissolving the requisite amount of iron (III) nitrate in 100. g of deionized water. The amounts of iron (III) nitrate for each sample are summarized in the table 33 below. Nanoparticle titania dispersions were prepared by mixing 65.0 g of Hombikat UV100 titania (Sachtleben Chemie GmbH, Duisburg, Germany) in 500 g of deionized water using an IKA T18 high energy mixer (IKA Works, Inc., Wilmington, N.C.) fitted with a 19 mm dispersing tool. The nanoparticle titania dispersions were heated to 80-90° C. The iron (III) nitrate solutions were added dropwise to the stirred and heated dispersions of titania over about 30 minutes. After the additions, the dispersions were allowed to settle and the treated particles were removed by filtration. The materials were each washed with about 500 ml deionized water and dried in an oven at 130° C.

TABLE 33

| | Iron (III) Nitrate Amount |
|---|---|
| Example 36 | 1.0 g |
| Example 37 | 2.5 g |
| Example 38 | 5.0 g |
| Example 39 | 7.5 g |
| Example 40 | 10.0 g |
| Example 41 | 15.0 g |
| Example 42 | 20.0 g |
| Example 43 | 25.0 g |

The treated particles were calcined in air in individual crucibles by raising the temperature from room temperature to 400° C. over 3 hours, holding at 400° C. for 1 hour, then cooling with the furnace.

The crystallite size of the calcined, surface-modified nanoparticulate titanias for a portion of the samples of examples 36-39 and 41-43 was determined by x-ray line broadening analysis and the results are shown in table 34. The only crystalline phase observed by XRD was anatase.

TABLE 34

|  | Crystallite Size |
|---|---|
| Example 36 | 12.3 nm |
| Example 37 | 14.0 nm |
| Example 38 | 12.3 nm |
| Example 39 | 12.4 nm |
| Example 41 | 12.5 nm |
| Example 42 | 12.1 nm |
| Example 43 | 11.6 nm |

These crystallite size results reveal the relative insensitivity of the final crystallite size of the nanoparticulate titania on the amount of reagent used to form the metal-oxo domains and on the thermal treatment.

11.0 g of each of the thermally treated samples was dispersed in 70.0 g of deionized water using the IKA high energy mixer. The dispersions were sprayed onto individual beds of 300 ml (about 124 g) 12×20 Kuraray GG carbon particles (Kuraray Chemical Company, Ltd., Osaka, Japan) using a finger-actuated, sprayer set to provide a fine mist of the dispersion. Each bed of carbon particles was turned using a spatula after every two sprays to ensure a uniform coating of the dispersion on the carbon particles. After the particles were coated onto the larger carbon particles, the coated dispersions were dried at 130° C. in air.

The calcined support materials were treated with gold under sputter condition 1. Sample weight, base pressure, and gold target weight loss are given in Table 35.

TABLE 35

|  | Sample Weight (g) | Base Pressure (Torr) | Gold Target Weight Loss (g) |
|---|---|---|---|
| Example 36 | 126.2 | 0.00025 | 3.38 |
| Example 37 | 126.78 | 0.00019 | 3.39 |
| Example 38 | 125.65 | 0.00017 | 3.56 |
| Example 39 | 125.81 | 0.000051 | 3.61 |
| Example 40 | 126.85 | 0.0002 | 3.53 |
| Example 41 | 129.3 | 0.00002 | 3.73 |
| Example 42 | 129.42 | 0.00028 | 3.44 |
| Example 43 | 129.44 | 0.00016 | 3.45 |

After gold treatment, the samples were tested as a CO oxidation catalyst according to test procedure 1. The results of this test are included in Table 36.

TABLE 36

|  | Average CO Conversion (%) | Average CO Concentration (ppm) |
|---|---|---|
| Example 36 | 94.6 | 194 |
| Example 37 | 95.4 | 166 |
| Example 38 | 95.2 | 171 |
| Example 39 | 95.2 | 174 |
| Example 40 | 95.9 | 148 |
| Example 41 | 95.9 | 148 |
| Example 42 | 95.3 | 168 |
| Example 43 | 95.1 | 175 |

Gold-coated samples of Examples 36 through 43 were tested according to test procedure 2. Results of the testing are included in table 37. The sampling time before $CO_2$ addition was 36 minutes. The sampling time following $CO_2$ addition was 47 minutes.

TABLE 37

|  | Before $CO_2$ Addition | | | | After $CO_2$ Addition | | | |
|---|---|---|---|---|---|---|---|---|
|  | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 36 | <0.5 | 38.5 | <0.5 | 41.3 | 225 | 33.3 | 347 | 34.2 |
| Example 37 | <0.5 | 41.7 | <0.5 | 44.2 | 8.4 | 38.6 | 24.6 | 40.6 |
| Example 38 | <0.5 | 39.5 | <0.5 | 43.1 | 4.8 | 38.4 | 19.4 | 39.1 |
| Example 39 | <0.5 | 40.1 | <0.5 | 43.3 | <0.5 | 36.7 | <0.5 | 37.5 |
| Example 40 | <0.5 | 42.7 | <0.5 | 45.1 | <0.5 | 39.9 | <0.5 | 40.2 |
| Example 41 | <0.5 | 43.5 | <0.5 | 46 | <0.5 | 42.1 | <0.5 | 44.8 |
| Example 42 | <0.5 | 43.7 | <0.5 | 46.6 | <0.5 | 42.9 | <0.5 | 43.9 |
| Example 43 | <0.5 | 44.8 | <0.5 | 47.5 | <0.5 | 42.7 | <0.5 | 43.2 |

Examples 44-47

Thermal Modification of the Nanoparticle Surface

Each of examples 44-47 involve thermal treatment of the nanoparticle titania to modify its reactivity. In each case a 65 g sample of Hombikat UV100 titania was calcined by raising the temperature from room temperature to the target temperature over 3 hours, holding at the target temperature for 1 hour, then cooling with the furnace. In the case of examples 44 and 45, the target temperature was 400° C. In the case of example 44, the calcining atmosphere was air; in the case of example 45, the calcining atmosphere was nitrogen. In the case of example 46 the calcining atmosphere was air and the target temperature was 550° C. In the case of example 47, the calcining atmosphere was nitrogen and the target temperature was 550° C.

A portion of the calcined, nanoparticulate titanias of examples 44, 45 and 46 was tested according to hydrogen peroxide color test 1. The calcined, nanoparticulate titanias of examples 44 and 45 were found to be positive with example 45 being more positive, that is, less yellow, than example 44. The calcined nanoparticle titania of example 46 was found to be strongly positive according to color test 1. The calcined, nanoparticle titania of example 46 was further tested according to hydrogen peroxide color test 2 and the surface peroxide activity was found to be 0.0539.

11.0 g of each of the thermally treated samples was dispersed in 70.0 g of deionized water using the IKA high energy mixer. The dispersions were sprayed onto individual beds of 300 ml (about 124 g) 12×20 Kuraray GG carbon particles (Kuraray Chemical Company, Ltd., Osaka, Japan) using a finger-actuated, sprayer set to provide a fine mist of the dispersion. Each bed of carbon particles was turned using a spatula after every two sprays to ensure a uniform coating of the dispersion on the carbon particles. After the particles were coated onto the larger carbon particles, the coated dispersions were dried at 130° C. in air.

The calcined support materials were treated with gold under sputter condition 1. Sample weight, base pressure, and gold target weight loss are given in Table 38.

TABLE 38

|  | Sample Weight (g) | Base Pressure (Torr) | Gold Target Weight Loss (g) |
| --- | --- | --- | --- |
| Example 44 | 125.12 | 0.00024 | 3.32 |
| Example 45 | 128.85 | 0.00022 | 3.33 |
| Example 46 | 129.47 | 0.00029 | 3.27 |
| Example 47 | 127.83 | 0.0002 | 3.46 |

After gold treatment, samples of Example 44 through 46 were tested as a CO oxidation catalyst according to test procedure 1. The results of this test are included in Table 39.

TABLE 39

|  | Average CO Conversion (%) | Average CO Concentration (ppm) |
| --- | --- | --- |
| Example 44 | 95.2 | 173 |
| Example 45 | 97.4 | 93 |
| Example 46 | 96.0 | 145 |

Gold-coated samples of Examples 44 through 47 were tested according to test procedure 2. Results of the testing are included in table 40. The sampling time before $CO_2$ addition was 36 minutes. The sampling time following $CO_2$ addition was 47 minutes.

TABLE 40

|  | Before $CO_2$ Addition | | | | After $CO_2$ Addition | | | |
| --- | --- | --- | --- | --- | --- | --- | --- | --- |
|  | $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| Example 44 | <0.5 | 39.1 | <0.5 | 41.3 | <0.5 | 37.4 | <0.5 | 38.1 |
| Example 45 | <0.5 | 39.2 | <0.5 | 40.7 | <0.5 | 37.9 | <0.5 | 38.6 |
| Example 46 | <0.5 | 44 | <0.5 | 47.3 | <0.5 | 41.6 | <0.5 | 42.6 |
| Example 47 | <0.5 | 45.3 | <0.5 | 48.1 | <0.5 | 43.7 | <0.5 | 45.5 |

Example 48

Zinc-Oxo Domains on Nanoparticulate Titania 201.43 g of 12×20 mesh Kuraray GG carbon (Kuraray Chemical Company, Ltd., Osaka, Japan) was placed in a 1-gallon metal paint can. 22.61 g of ST-31 titania (Ishihara Sangyo Kaisha, Ltd., Osaka, Japan) was weighed into a 250 mL beaker. 160.41 g of deionized water were added and the contents of the beaker were then mixed using a Turrax T18 mixer (IKA-Werke GmbH & Co., Staufen, DE) at setting 3 for 4 minutes. The can was then placed on motorized rollers (Bodine Electric Company of Chicago, Ill.), raised to a 45° angle, and rotated at 24 rpm. The ST-31 titania dispersion was then pumped through a finger-actuated spray nozzle (a common household plastic spray bottle) onto the carbon until half of the dispersion was gone at which time the carbon was dried gently with a heat gun until the carbon appeared to be loose and dry. The spraying then continued until all of the dispersion was sprayed onto the GG. The carbon was then dried with the heat gun for 3 minutes and then placed into an aluminum pan. The pan and carbon were placed into an oven set to 120° C. for 16 hours. The sample was coated with gold and tested as described below.

Example 49

Use of the Catalyst of Example 48 to Remove CO from a Feed Stock to a Fuel Cell 3.0 g of the catalyst from example 48 was used to clean CO from a fuel cell gas stream containing hydrogen, carbon dioxide, carbon monoxide and nitrogen in the presence of water vapor as described below.

One membrane electrode assembly (MEA) was used during the experiments. The MEA was assembled from the following components:

Membrane—The membrane was cast by 3M from a solution of DuPont Nafion® 1000 equivalent weight ionomer (E. I. du Pont de Nemours and Company, Wilmington, Del.). The membrane thickness was 1.1 mils.

Electrodes—Both the anode and cathode electrode were made from 50% Pt/C catalyst commercially available from NECC (type SA50BK) (N. E. Chemcat Corporation, Tokyo, Japan) and an aqueous solution of 1100 equivalent weight Nafion® ionomer. The electrode contains approximately 71% Pt/C catalyst and 29% ionomer. The metal loading of the electrode is 0.4 mg Pt/cm$^2$.

Gas Diffusion Layer (GDL)—Both the anode and cathode gas diffusion layers (GDLs) consisted of a nonwoven carbon paper (Ballard® AvCarb™ P50, Ballard Material Products, Inc., Lowell, Mass.) impregnated with an aqueous solution containing 5% (by weight) polytetrafluoroethylene (PTFE) as provided by dilution of a 60 wt. % solution of Dupont 30 B PTFE emulsion with deionized water. A micro-layer consisting of 20% PTFE and 80% Vulcan carbon (Cabot Corporation, Boston, Mass.) is then coated from an aqueous dispersion as described in U.S. Pat. No. 6,703,068 B2 onto the PTFE treated nonwoven carbon paper followed by sintering at 380° C. to make the GDL.

The MEA was assembled from the various components listed above. First, the catalyst layers were transferred to the membrane via a decal lamination process. Two 50 cm$^2$ electrodes were cut from a sheet and aligned on the membrane. The assembly was then fed into a laminator with the roll temperature set to 101.7° C. with the pressure set to 12.4 MPa. Second, the GDLs were attached to the catalyst-coated membrane via a static bond process to make the MEA. The conditions of the static bond were 132.2° C. for 10 minutes at 1361 kg/50 cm² and 30% GDL compression via hard stop.

A/cm². The anode flow varied from 400 to 600 sccm, depending on the inlet gas composition. The cathode air flow was set to 417 sccm. The inlet gas compositions (dry basis) to the Au catalyst and the output voltage of the MEA are shown in Table 41.

TABLE 41

| Gas ID | $H_2$ (%) | $N_2$ (%) | $CO_2$ (%) | CO (%) | $O_2$ (%) | Fuel Cell Voltage 0.2 A/cm² (mV) | Change in Fuel Cell Voltage Pure $H_2$ - Gas ID (mV) |
|---|---|---|---|---|---|---|---|
| 1 | 100.0 | | | | | 774 +/− 2 | NA |
| 2 | 30.0 | 70.0 | | | | 749 +/− 2 | 25 ($H_2$ dilution loss) |
| 9 | 39.5 | 39.5 | 20.7 | 0.005 | 0.3 | 749 +/− 2 | 25 |
| 10 | 38.1 | 40.9 | 20.0 | 0.005 | 1.0 | 747 +/− 2 | 27 |
| 11 | 29.7 | 45.4 | 20.8 | 1.3 | 2.8 | 747 +/− 1 | 27 |

Figure 4:
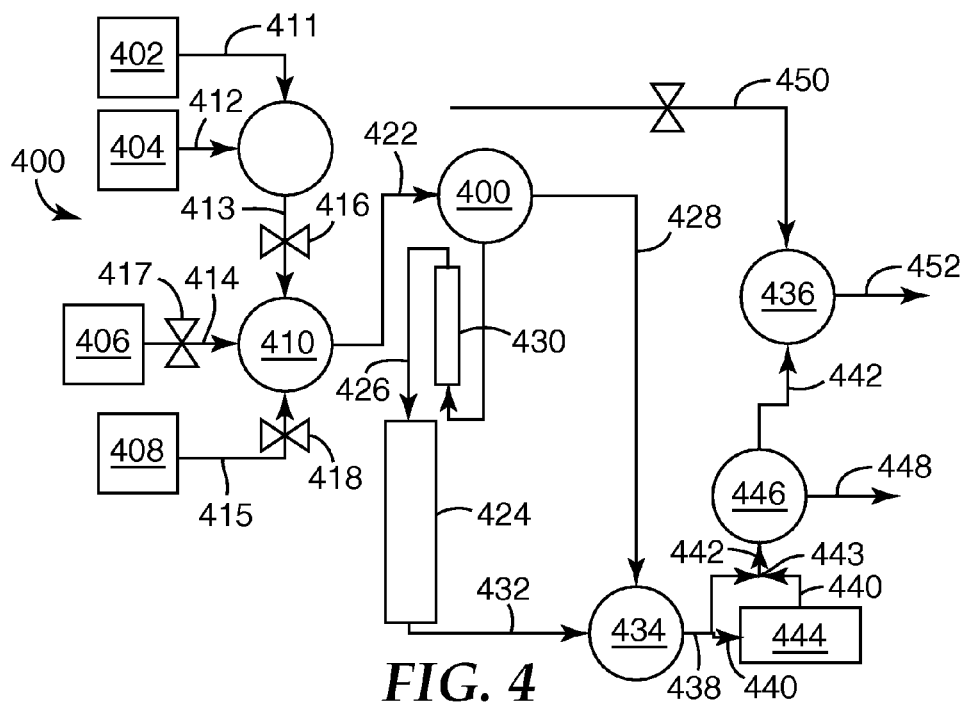
FIG. 4 is a schematic diagram of a PROX catalyst system of the invention that removes CO from a feed stock to a fuel cell useful for generating electricity to be used by, for example, a portable electronic device.

A diagram of the CO oxidation system 400 used in this example is shown in FIG. 4. The system is coupled to a nitrogen gas supply 402, a carbon dioxide supply 404, an air supply 406, and a reformate gas supply 408. The reformate includes 2% or 50 ppm of CO, as the case may be. The $N_2$, $CO_2$, Air and reformate gases are led to mixing tee 410 via lines 411, 412, 413, 414, and 415. Mass flow controllers 416, 417, and 418 help to control the flow of these gases. From the mixing tee 410, the feed is conveyed to switching valve 420 via line 422.

The switching valve 420 can be set to direct the feed to the packed bed column 424 containing the gold catalyst via line 426 or to a column by-pass line 428. The packed bed column 424 included a total of 3.0 g of the catalyst of example 48 held in the same catalyst holder 330 used in test procedure 2. The packed bed column 424 may be by-passed to compare how treated and untreated feeds impact performance of the MEA. A room temperature (~23° C. dew point), gas bubbler humidifier 430 is included in line 426 to humidify the feed upstream from the packed bed column 424.

The output of the packed bed column 424 via line 432 or the feed supplied via the by-pass line 428 are led into tee 434, which is fitted with check valves (not shown) to avoid backflow. From the tee 434, the gas flow is led to tee 436, also fitted with check valves (not shown) to avoid back flow. The flow is led to tee 436 via lines 438, 440, and 442. A portion of the feed to the MEA is fed through a gas chromatograph (GC) 444 on line 440 in order to confirm the composition of the feed stream before it reaches the MEA (not shown). After exiting the gas sampling valve of the GC 444, the feed conveyed through the GC 444 via line 440 is recombined with the main flow stream at juncture 445. This is the same GC with methanizer/FID described above in test procedure 2. A switching valve 446 on line 442 allows the feed to be vented through line 448 to by-pass the MEA.

An alternative supply path 450 allows a feed of pure $H_2$ from a suitable supply (not shown) to be fed to the MEA, if desired. Like the main feed is conveyed through line 442, the alternative feed also is conveyed to the tee 436. From tee 436, the main feed or the alternative feed, as the case may be, is led to the MEA (not shown) via line 452. The inlet gas streams to the MEA may be humidified to 100% RH using a humidifier (not shown).

The MEAs were equilibrated under $H_2$/Air at 800/1800 sccm operating under potentiodynamic scan (PDS) (initial voltage: 0.9V, minimum voltage 0.3V, interval 0.05V, time at each point 10 sec/pt)/potentiostatic scan (PSS) (static voltage 0.4V, time 10 min) control. To evaluate the effectiveness of the Au catalyst, the operating conditions were set to 0.2

The observed small decrease in the fuel cell voltage of 25 mV for Gas ID 2 compared to the control (Gas ID 1) is due to $H_2$ dilution. From the results for Gas ID's 9, 10, and 11, it is apparent that the Au catalyst was effective in removing CO from the reformate feed stream. Essentially no voltage loss was observed due to CO poisoning using either reformate composition; instead the voltage loss is consistent with the observed effect of hydrogen gas dilution. The temperature of the catalyst bed varied during the tests from room temperature (23° C.) to 50° C. depending on the gas composition. The concentration of CO measured downstream of the catalyst bed was less than the detection limit of the GC (0.5 ppm) for Gas IDs 9, 10, and 11.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making a catalyst system, comprising the steps of:
    a) providing a plurality of nanoparticles;
    b) incorporating the nanoparticles into a support, wherein the nanoparticles are present as clusters of aggregated nanoparticles; and
    c) using physical vapor deposition techniques to deposit catalytically active gold onto the support, wherein the nanoparticles have been subjected to a thermal treatment.

2. The method of claim 1, wherein the thermal treatment occurs at a temperature in a range from 200° C. to 600° C. for a time period from 30 seconds to 15 hours.

3. The method of claim 1, wherein the thermal treatment occurs at a temperature in a range from 200° C. to 600° C. for a time period from 3 minutes to 15 hours.

4. The method of claim 1, wherein the thermal treatment comprises thermally treating the nanoparticles in an oxidizing atmosphere.

5. The method of claim 1, wherein the thermal treatment comprises thermally treating the nanoparticles in a reducing atmosphere.

6. The method of claim 1, wherein a first portion of the thermal treatment occurs in an oxidizing atmosphere and a second portion occurs in a reducing atmosphere.

7. The method of claim 1, wherein the thermal treatment occurs before the nanoparticles are incorporated into the support.

8. The method of claim 1, wherein the thermal treatment occurs after the nanoparticles are incorporated into the support.

9. The method of claim 1, further comprising the step of supporting the nanoparticles onto a host.

10. The method of claim 9, wherein the host comprises a plurality of host particles.

11. The method of claim 1, further comprising the step of thermally treating the catalyst system after the gold is deposited.

12. The method of claim 1, wherein the nanoparticles comprise titania.

13. The method of claim 1, wherein the support comprises nanopores.

14. The method of claim 13, wherein the nanopores have a size in the range of 1 nm to 30 nm.

15. A method of preparing a catalyst, comprising the steps of:
   a) providing metal oxide nanoparticles;
   b) thermally treating the nanoparticles;
   c) incorporating the nanoparticles onto a host to provide a catalyst support in a manner such that the nanoparticles are present on a host surface as clusters of aggregated nanoparticles; and
   d) depositing catalytically active gold onto the catalyst support that incorporates said thermally treated nanoparticles.

* * * * *

UNITED STATES PATENT AND TRADEMARK OFFICE
CERTIFICATE OF CORRECTION

PATENT NO.       : 8,137,750 B2
APPLICATION NO.  : 11/674348
DATED            : March 20, 2012
INVENTOR(S)      : Larry A. Brey It is certified that error appears in the above-identified patent and that said Letters Patent is hereby corrected as shown below:

Title Page 2, item (56), Column 2 (Other Publications)
Line 6, delete "Dixoide" and insert -- Dioxide --, therefor.

Title Page 2, item (56), Column 2 (Other Publications)
Line 63, delete "acethylacetonate" and insert -- acetylacetonate --, therefor.

Column 2
Line 34 (Approx.), delete "CO($S_{CO}$)" and insert -- CO ($S_{CO}$) --, therefor.

Column 4
Line 20, delete ""[a]lthough" and insert -- "although --, therefor.

Column 4
Line 55, After "10/948,012," insert -- bearing Attorney Docket No. 58905US003, --.

Column 4
Line 66, delete "GOLD." and insert -- GOLD and bearing Attorney Docket No. 60028US003. --, therefor.

Column 5
Line 46, Delete "Schubert et at" and insert -- Schubert et al --, therefor.

Column 8
Line 15-16 (Approx.), After "10/948,012," insert -- bearing Attorney Docket No. 58905US003, --.

Column 11
Line 22, delete "100 $m^2$/g." and insert -- 100 $m^2$/g, --, therefor.

Signed and Sealed this
Twenty-sixth Day of June, 2012

David J. Kappos
*Director of the United States Patent and Trademark Office*

CERTIFICATE OF CORRECTION (continued)
U.S. Pat. No. 8,137,750 B2

Column 12
Line 28, Delete "know" and insert -- known --, therefor.

Column 22
Line 18, delete "On" and insert -- One --, therefor.

Column 22
Line 45, delete "et at" and insert -- et al --, therefor.

Column 26
Line 10, delete "coated" and insert -- coated. --, therefor.

Column 26
Line 55, delete "(vida infra)." and insert -- (vide infra). --, therefor.

Column 35
Line 25, before "shows" insert -- bearing Attorney Docket No. 60028US003 --, therefor.

Column 36
Line 1, delete "SR18610C" and insert -- SRI 8610C --, therefor.

Column 40
Line 45, delete "absorbtance" and insert -- absorptance --, therefor.

Column 53
Line 44, Delete "Hydroysis" and insert -- Hydrolysis --, therefor.

Column 57
Line 28 (Approx.), delete "Elecktron" and insert -- Elektron --, therefor.